(12) United States Patent
Corbin et al.

(10) Patent No.: US 10,303,215 B2
(45) Date of Patent: May 28, 2019

(54) MAGNETIC ATTACHMENT UNIT

(71) Applicant: Apple Inc., Cupertino, CA (US)

(72) Inventors: Sean S. Corbin, San Jose, CA (US);
Andrew D. Lauder, Oxford (GB)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/049,404

(22) Filed: Jul. 30, 2018

(65) Prior Publication Data

US 2019/0064878 A1 Feb. 28, 2019

Related U.S. Application Data

(63) Continuation of application No. 15/253,629, filed on Aug. 31, 2016, now Pat. No. 10,037,054, which is a
(Continued)

(51) Int. Cl.
*G06F 1/16* (2006.01)
*G06F 3/02* (2006.01)
(Continued)

(52) U.S. Cl.
CPC ............ *G06F 1/1632* (2013.01); *A45C 11/00* (2013.01); *A45C 13/002* (2013.01); *A45C 15/00* (2013.01); *A63B 71/0622* (2013.01); *B60R 11/0252* (2013.01); *G06F 1/1616* (2013.01); *G06F 1/1626* (2013.01); *G06F 1/1643* (2013.01); *G06F 1/1647* (2013.01); *G06F 1/1652* (2013.01); *G06F 1/1654* (2013.01); *G06F 1/1656* (2013.01); *G06F 1/1673* (2013.01); *G06F 1/1681* (2013.01); *G06F 3/0202* (2013.01); *G06F 3/0482* (2013.01);
(Continued)

(58) Field of Classification Search
CPC combination set(s) only.
See application file for complete search history.

(56) References Cited

U.S. PATENT DOCUMENTS 5,414,444 A 5/1995 Britz
5,555,491 A 9/1996 Tao
(Continued)

FOREIGN PATENT DOCUMENTS

CN 1213099 A 4/1999
CN 101408781 A 4/2009
(Continued)

OTHER PUBLICATIONS

Taiwanese Patent Application No. 101103152—Office Action dated Jun. 4, 2014.
(Continued)

*Primary Examiner* — Lisa Lea-Edmonds
(74) *Attorney, Agent, or Firm* — Dickinson Wright RLLP

(57) ABSTRACT

A magnetic attachment mechanism and method is described. The magnetic attachment mechanism can be used to releasably attach at least two objects together in a preferred configuration without fasteners and without external intervention. The magnetic attachment mechanism can be used to releasably attach an accessory device to an electronic device. The accessory device can be used to augment the functionality of usefulness of the electronic device.

20 Claims, 43 Drawing Sheets

Related U.S. Application Data continuation of application No. 14/622,419, filed on Feb. 13, 2015, now Pat. No. 9,494,980, which is a continuation of application No. 14/003,223, filed as application No. PCT/US2012/023025 on Jan. 27, 2012, now Pat. No. 8,988,876.

(60) Provisional application No. 61/438,220, filed on Jan. 31, 2011.

(51) Int. Cl.
| | |
|---|---|
| G06F 3/14 | (2006.01) |
| A45C 11/00 | (2006.01) |
| A45C 13/00 | (2006.01) |
| A45C 15/00 | (2006.01) |
| A63B 71/06 | (2006.01) |
| B60R 11/00 | (2006.01) |
| B60R 11/02 | (2006.01) |
| G06F 3/0482 | (2013.01) |
| G06F 3/0488 | (2013.01) |
| H04B 1/3822 | (2015.01) |

(52) U.S. Cl.
CPC ........ *G06F 3/04883* (2013.01); *G06F 3/1446* (2013.01); *H04B 1/3822* (2013.01); *A45C 2011/003* (2013.01); *A45C 2200/15* (2013.01); *A63B 2071/0658* (2013.01); *B60R 2011/0005* (2013.01); *B60R 2011/0017* (2013.01); *B60R 2011/0057* (2013.01)

(56) References Cited

U.S. PATENT DOCUMENTS

| | | |
|---|---|---|
| 5,847,698 A | 12/1998 | Reavey et al. |
| 5,992,807 A | 11/1999 | Tarulli |
| 6,151,206 A | 11/2000 | Kato et al. |
| 6,510,048 B2 | 1/2003 | Rubenson et al. |
| 6,628,244 B1 | 9/2003 | Hirosawa et al. |
| 6,793,251 B2 | 9/2004 | Stark |
| 6,842,332 B1 | 1/2005 | Rubenson et al. |
| 6,888,940 B1 | 5/2005 | Deppen |
| 7,016,492 B2 | 3/2006 | Pan et al. |
| 7,265,739 B2 | 9/2007 | Yim |
| 7,278,112 B2 | 10/2007 | Numano |
| 7,327,560 B1 | 2/2008 | Tabasso et al. |
| 7,489,503 B2 | 2/2009 | Maatta |
| 7,583,500 B2 | 9/2009 | Ligtenberg et al. |
| 7,589,959 B2 | 9/2009 | Ikeda |
| 7,675,511 B2 | 3/2010 | Hattori |
| 7,775,567 B2 | 8/2010 | Ligtenberg et al. |
| 7,821,780 B2 | 10/2010 | Choy |
| 8,125,759 B2 | 2/2012 | Fukuma et al. |
| 8,157,311 B2 | 4/2012 | Fowler |
| 8,250,278 B2 | 8/2012 | Tseng et al. |
| 8,289,115 B2 | 10/2012 | Cretella, Jr. et al. |
| 8,344,836 B2 | 1/2013 | Lauder et al. |
| 8,390,411 B2 | 3/2013 | Lauder et al. |
| 8,442,455 B2 | 5/2013 | Choi |
| 8,624,547 B2 | 1/2014 | Thorsell et al. |
| 8,934,229 B2 | 1/2015 | Thorson |
| 8,988,876 B2 | 3/2015 | Corbin et al. |
| 9,335,793 B2 * | 5/2016 | Rothkopf ............ A45C 13/002 |
| 9,494,980 B2 | 11/2016 | Corbin et al. |
| 2001/0028366 A1 | 10/2001 | Ohki et al. |
| 2001/0054647 A1 | 12/2001 | Keronen et al. |
| 2002/0190823 A1 | 12/2002 | Yap |
| 2003/0098857 A1 | 5/2003 | Gettemy et al. |
| 2003/0179880 A1 | 9/2003 | Pan et al. |
| 2004/0005184 A1 | 1/2004 | Kim et al. |
| 2004/0012191 A1 | 1/2004 | Stark |
| 2004/0044682 A1 | 3/2004 | Nakamura et al. |
| 2004/0070633 A1 | 4/2004 | Nakamura et al. |
| 2004/0108968 A1 | 6/2004 | Finke-Anlauff |
| 2004/0196210 A1 | 10/2004 | Nagatsuka et al. |
| 2004/0207568 A1 | 10/2004 | Ooshima et al. |
| 2005/0024341 A1 | 2/2005 | Gillespie et al. |
| 2005/0243504 A1 | 11/2005 | Wong et al. |
| 2006/0007645 A1 | 1/2006 | Chen et al. |
| 2006/0046792 A1 | 3/2006 | Hassemer et al. |
| 2006/0146488 A1 | 7/2006 | Kimmel |
| 2007/0133156 A1 | 6/2007 | Ligtenberg et al. |
| 2007/0155446 A1 | 7/2007 | Ho et al. |
| 2007/0176902 A1 | 8/2007 | Newman et al. |
| 2007/0236464 A1 | 10/2007 | Kojo |
| 2007/0247800 A1 | 10/2007 | Smith et al. |
| 2008/0117184 A1 | 5/2008 | Gettemy |
| 2008/0167095 A1 | 7/2008 | Kim et al. |
| 2008/0204987 A1 | 8/2008 | Sakata |
| 2008/0218491 A1 | 9/2008 | Wu |
| 2008/0225006 A1 | 9/2008 | Ennadi |
| 2009/0091881 A1 | 4/2009 | Lee et al. |
| 2009/0128504 A1 | 5/2009 | Smith |
| 2009/0128785 A1 | 5/2009 | Silverstein |
| 2009/0159763 A1 | 6/2009 | Kim |
| 2009/0172986 A1 | 7/2009 | Fuchsberg et al. |
| 2009/0256665 A1 | 10/2009 | Cheng |
| 2009/0315867 A1 | 12/2009 | Sakamoto et al. |
| 2010/0064244 A1 | 3/2010 | Kilpatrick, II et al. |
| 2010/0081377 A1 | 4/2010 | Chatterjee et al. |
| 2010/0117975 A1 | 5/2010 | Cho |
| 2010/0172090 A1 | 7/2010 | Chatterjee |
| 2010/0177476 A1 | 7/2010 | Hotelling et al. |
| 2010/0238620 A1* | 9/2010 | Fish ...................... G06F 1/1616 |
| | | 361/679.09 |
| 2010/0302179 A1 | 12/2010 | Ahn et al. |
| 2010/0306501 A1 | 12/2010 | Chang et al. |
| 2010/0308187 A1 | 12/2010 | Lin |
| 2010/0309143 A1 | 12/2010 | Zhang et al. |
| 2010/0321275 A1 | 12/2010 | Hinckley et al. |
| 2011/0047459 A1 | 2/2011 | Van Der Westhuizen |
| 2011/0098087 A1 | 4/2011 | Tseng |
| 2011/0099392 A1 | 4/2011 | Conway |
| 2011/0192857 A1 | 8/2011 | Rothbaum et al. |
| 2011/0199727 A1 | 8/2011 | Probst |
| 2011/0267757 A1 | 11/2011 | Probst et al. |
| 2012/0182740 A1 | 7/2012 | Vermeulen |
| 2012/0194448 A1* | 8/2012 | Rothkopf ............ A45C 13/002 |
| | | 345/173 |
| 2012/0259547 A1 | 10/2012 | Morlock et al. |
| 2012/0303851 A1 | 11/2012 | Tseng et al. |
| 2013/0173152 A1 | 7/2013 | Schilling et al. |
| 2016/0091331 A1 | 3/2016 | Schilling et al. |
| 2016/0100084 A1 | 4/2016 | Schofield et al. |
| 2016/0224238 A1 | 8/2016 | Rothkopf |
| 2017/0010633 A1 | 1/2017 | Corbin et al. |

FOREIGN PATENT DOCUMENTS

| | | |
|---|---|---|
| CN | 202548700 U | 11/2012 |
| CN | 202748695 U | 2/2013 |
| EP | 1276090 A1 | 1/2003 |
| JP | H04278658 A | 10/1992 |
| JP | H06141089 A | 5/1994 |
| JP | 2000186710 A | 7/2000 |
| JP | 2000250501 A | 9/2000 |
| JP | 2001331238 A | 11/2001 |
| JP | 2001337812 A | 12/2001 |
| JP | 2002244783 A | 8/2002 |
| JP | 2003058312 A | 2/2003 |
| JP | 2003194044 A | 7/2003 |
| JP | 2004038950 A | 2/2004 |
| JP | 2004078039 A | 3/2004 |
| JP | 2004118151 A | 4/2004 |
| JP | 2004287076 A | 10/2004 |
| JP | 2004302179 A | 10/2004 |
| JP | 2004354789 A | 12/2004 |
| JP | 2006053678 A | 2/2006 |
| JP | 2006287982 A | 10/2006 |
| JP | 2008052421 A | 3/2008 |
| JP | 2008071187 A | 3/2008 |
| JP | 2008090872 A | 4/2008 |
| JP | 2010108450 A | 5/2010 |

(56) References Cited

FOREIGN PATENT DOCUMENTS

| JP | 2010218102 A | 9/2010 |
|---|---|---|
| JP | 2010277592 A | 12/2010 |
| JP | 2011018085 A | 1/2011 |
| JP | 2012073824 A | 4/2012 |
| KR | 1020010037593 A | 5/2001 |
| KR | 1020050098375 A | 10/2005 |
| KR | 1020070038179 A | 4/2007 |
| KR | 1020100102090 A | 9/2010 |
| WO | 02056284 A1 | 7/2002 |
| WO | 2005029296 A1 | 3/2005 |
| WO | 2007037807 A1 | 4/2007 |
| WO | 2009049331 A2 | 4/2009 |

OTHER PUBLICATIONS

European Patent Application No. 12704478.2—Office Action dated Jun. 12, 2014.
European Patent Application No. 12702354.7—Office Action dated Jun. 18, 2014.
Chinese Application for Invention No. 201210021265.0—Office Action dated Jul. 15, 2014.
Japanese Patent Application No. 2013-551395—Office Action dated Aug. 18, 2014.
Korean Patent Application No. 10-2013-7023047—Office Action dated Sep. 26, 2014.
Japanese Patent Application No. 2013-551997—Office Action dated Sep. 29, 2014.
Chinese Application for Invention No. 201210021265.0—Office Action dated Feb. 7, 2014.
Kim, Min Seok, "The Real Notebook—Laptop Concept", http://www.yankodesign.com/2011/07/19/the-realnotebook/, Fujitsu, Jul. 19, 2011, pp. 1-20.
PCT Patent Application No. PCT/US2012/021378—International Search Report and Written Opinion dated Jul. 6, 2012.
PCT Application No. PCT/US2012/023025—International Search Report and Written Opinion dated Dec. 13, 2012.
Chinese Application for Invention No. 201210021402.0—First Office Action dated Jan. 23, 2014.
Korean Patent Application No. 10-2015-7034296—Office Action dated Jan. 25, 2016.
Australian Patent Application No. 2015230757—Patent Examination Report No. 1 dated Feb. 5, 2016.
Japanese Patent Application No. 2015-000495—First Office Action dated Feb. 15, 2016.
Australian Patent Application No. 2015230757—Patent Examination Report No. 2 dated Apr. 19, 2016.
Korean Patent Application No. 10-2016-7021299—Notice of Last Preliminary Rejection dated Apr. 28, 2017.
Australian Patent Application No. 2015268618—Examination Report dated May 17, 2017.
Korean Patent Application No. 10-2015-7026421—Office Action dated Apr. 19, 2017.
Japanese Patent Application No. 2016-124781—First Office Action dated Aug. 25, 2017.
Chinese Application for Invention No. 201510195110.2—First Office Action dated Sep. 15, 2017.
Korean Patent Application No. 10-2016-7021299—Notice of Last Preliminary Rejection dated Nov. 29, 2017.
Japanese Patent Application No. 2016-124781—First Office Action dated Dec. 15, 2017.
Chinese Application for Invention No. 201510195110.2—Second Office Action dated May 17, 2018.

* cited by examiner

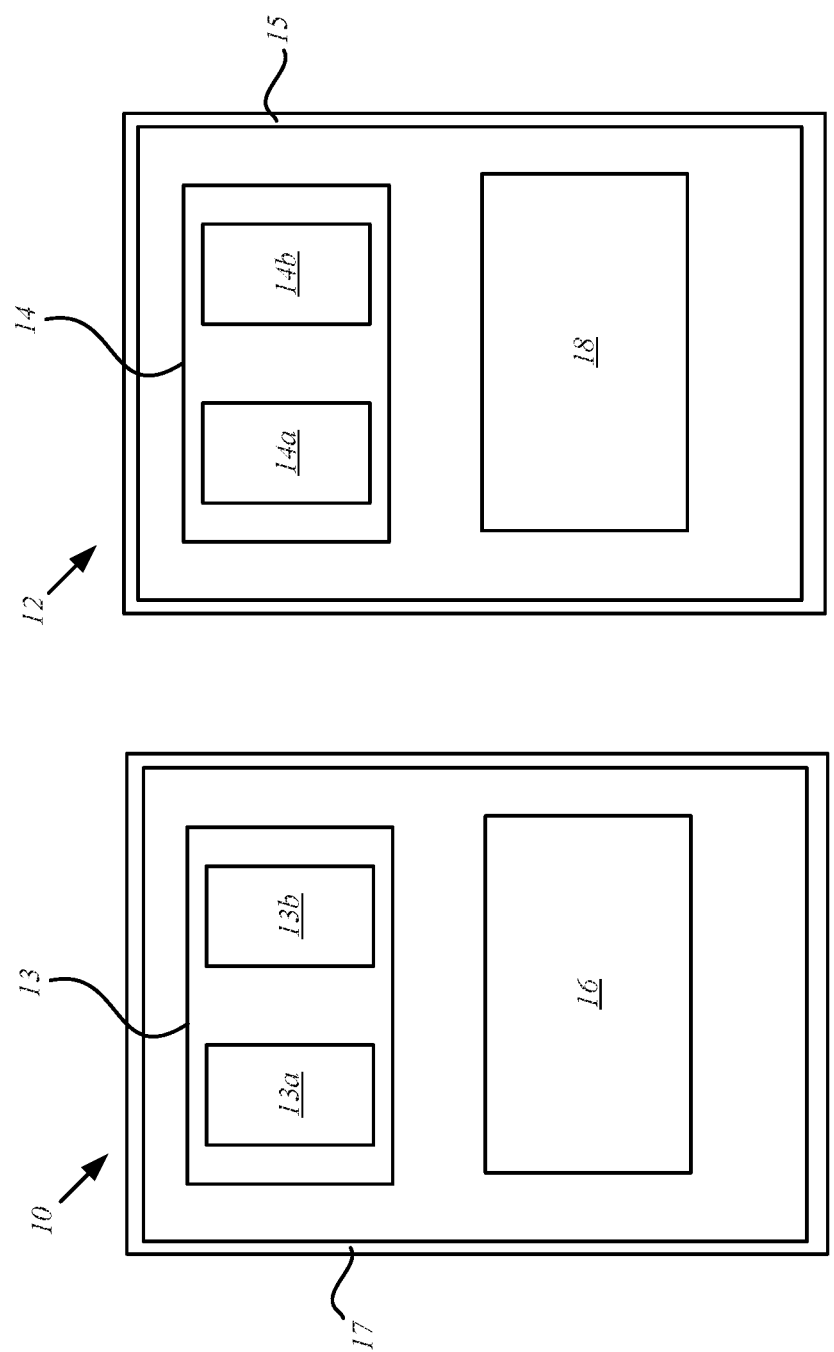

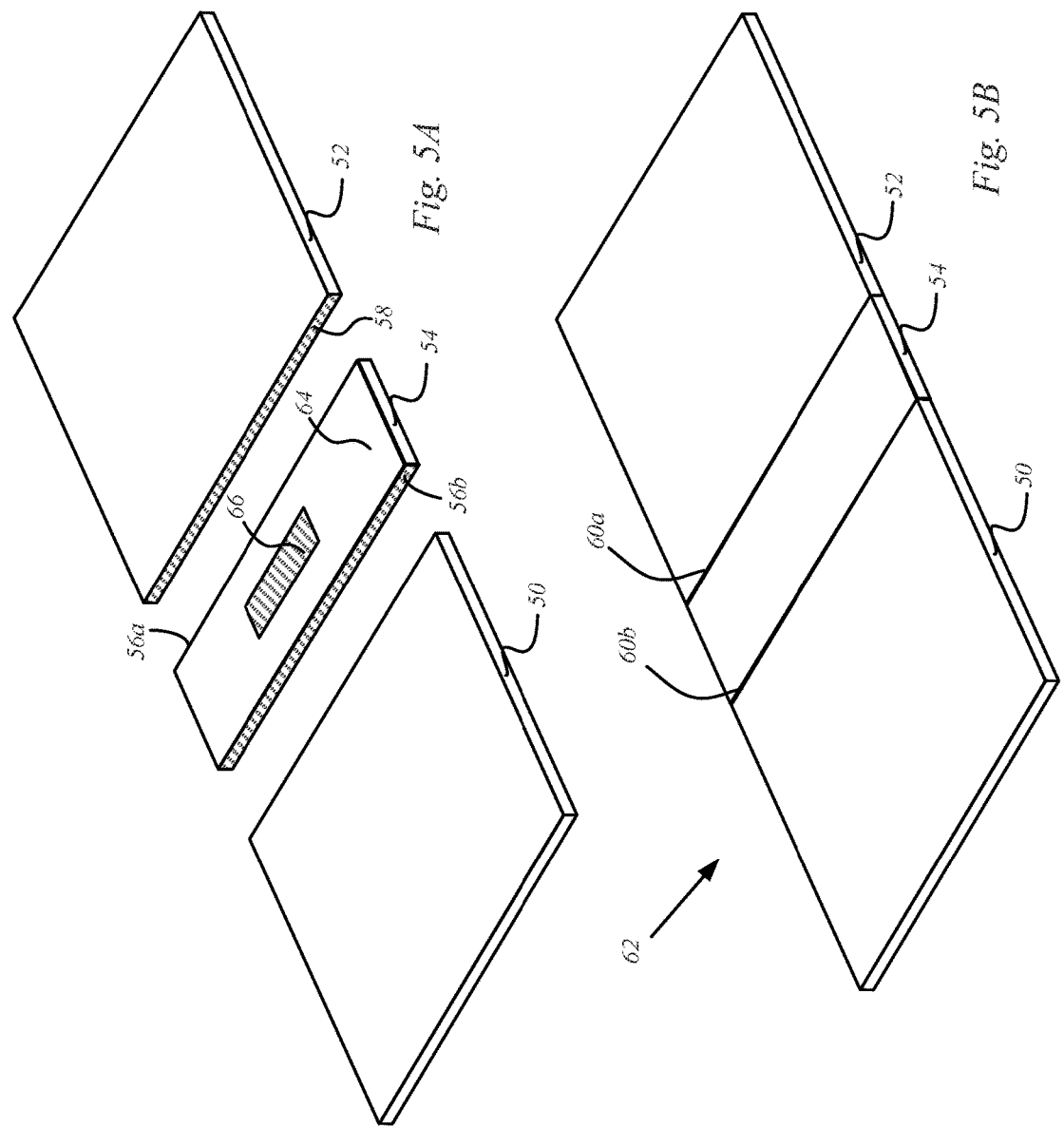

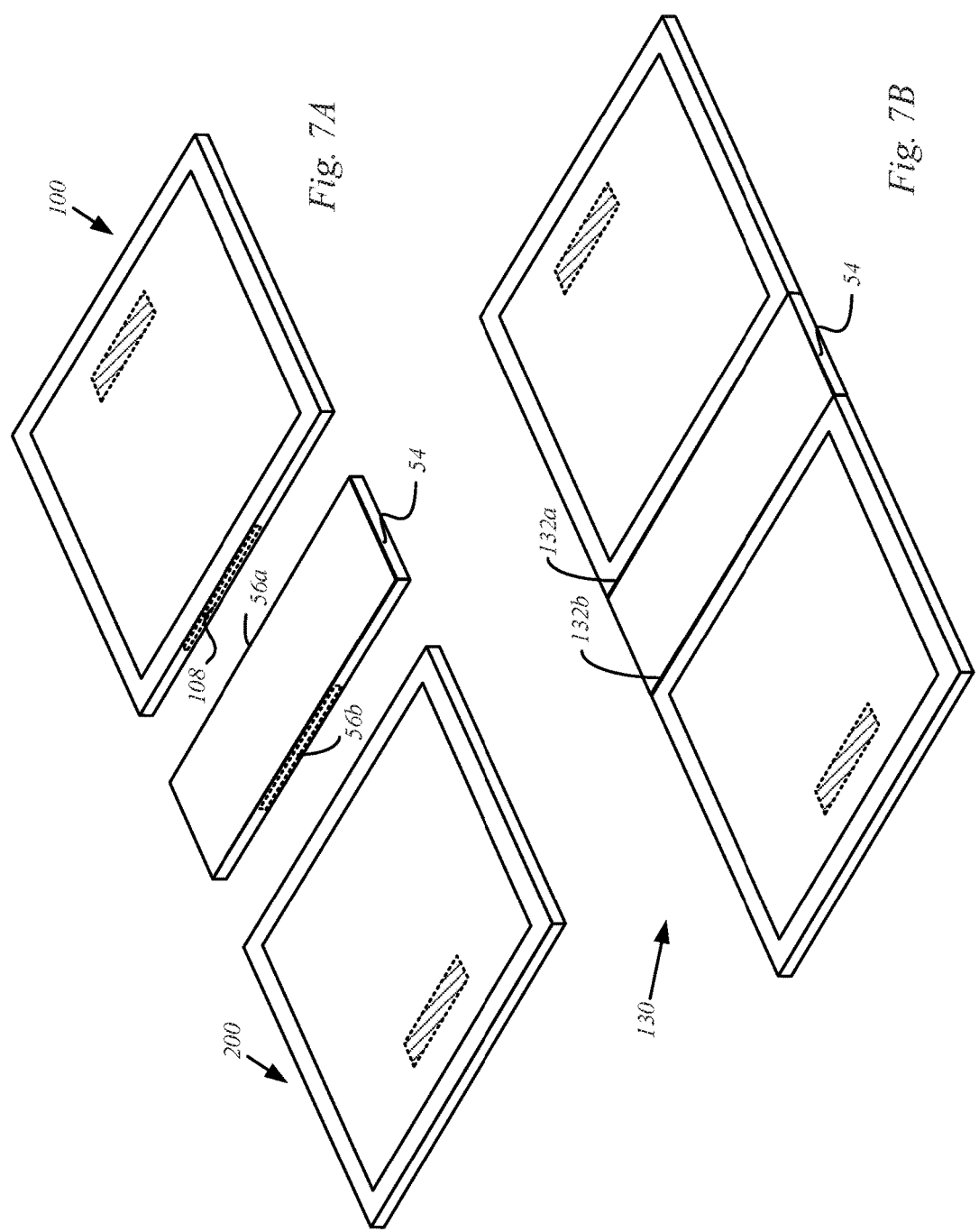

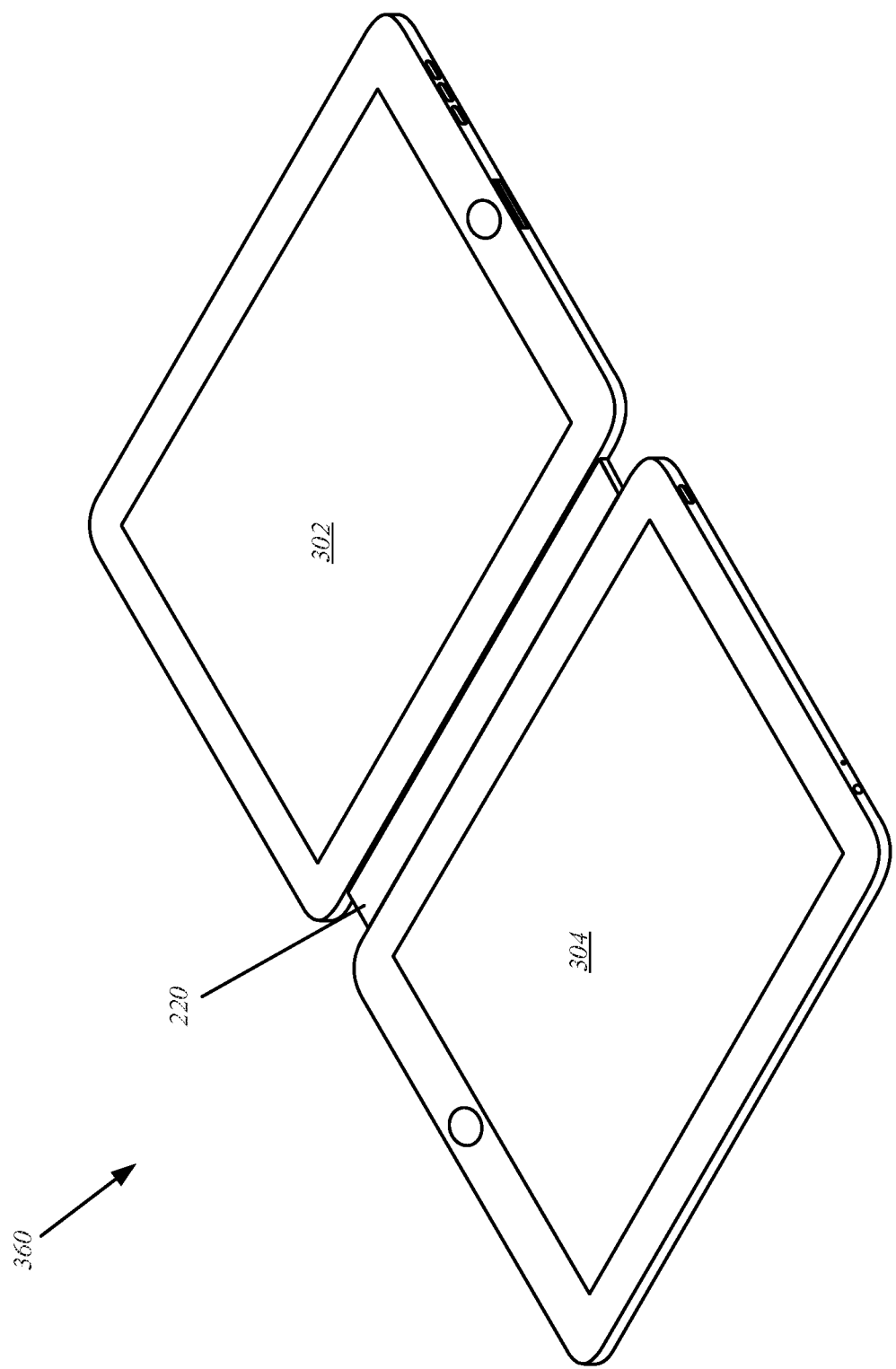

Table 1

| Magnetic Code | Status |
|---|---|
| {0,0,0,0,0,0} | No attachment |
| {1,1,1,1,1,1} | Hanging accessory |
| {1,0,0,0,0,1} | Stylus accessory |
| {1,1,0,0,1,1} | Docking attachment |

MAGNETIC ATTACHMENT UNIT

CROSS REFERENCES TO RELATED APPLICATIONS

This application is a continuation of U.S. application Ser. No. 15/253,629, filed Aug. 31, 2016, entitled "MAGNETIC ATTACHMENT UNIT," which is a continuation of U.S. application Ser. No. 14/622,419, filed Feb. 13, 2015, entitled "MAGNETIC ATTACHMENT UNIT", now U.S. Pat. No. 9,494,980 issued on Nov. 15, 2016, which is a continuation of U.S. application Ser. No. 14/003,223, filed Oct. 24, 2013, entitled "MAGNETIC ATTACHMENT UNIT", now U.S. Pat. No. 8,988,876 issued on Mar. 24, 2015, which is a national stage application under 35 U.S.C. § 371 and claims priority under 35 U.S.C. § 119(b) to PCT Application No. PCT/US2012/023025, filed Jan. 27, 2012, entitled "MAGNETIC ATTACHMENT UNIT", which claims the benefit of U.S. Provisional Application No. 61/438,220, filed Jan. 31, 2011, entitled "MAGNETIC ATTACHMENT UNIT AND METHODS OF USE", the contents of which are incorporated herein by reference in their entirety for all purposes.

FIELD

The described embodiments generally relate to portable electronic devices. More particularly, the present embodiments describe releasable attachment techniques well suited for portable electronic devices.

BACKGROUND

Recent advances in portable computing includes the introduction of hand held electronic devices and computing platforms along the lines of the iPad™ tablet manufactured by Apple Inc. of Cupertino, Calif. These handheld computing devices can be configured such that a substantial portion of the electronic device takes the form of a display used for presenting visual content leaving little available space for an attachment mechanism that can be used for attaching an accessory device.

Conventional attachment techniques generally rely upon mechanical fasteners that typically require at least an externally accessible attaching feature on the electronic device to mate with a corresponding attaching feature on the accessory device. The presence of the external attaching feature can detract from the overall look and feel of the handheld computing device as well as add unwanted weight and complexity as well as degrade the appearance of the hand held computing device.

Therefore a mechanism for releasably attaching together at least two objects is desired.

SUMMARY

This paper describes various embodiments that relate to a system, method, and apparatus for forming a cooperative system using magnetic attachment.

A magnetic attachment unit for magnetically attaching together a first object having a first magnetic attachment system and a second object having a second magnetic attachment system to form a cooperative system is described. The magnetic attachment unit includes at least a magnetic attachment system that is arranged to provide a first activation force for activating the first magnetic system and a second activation force for activating the second magnetic system. The activated first and second magnetic systems cooperate with the magnetic attachment system to releasably secure the first object and the second object together to form the cooperating magnetic system.

A magnetic attachment unit for magnetically attaching together at least individual first electronic and second electronic devices each having an associated magnetic attachment feature, the magnetically attached electronic devices communicating with each other to when magnetically attached to form a cooperative electronic system. The magnetic attachment unit includes a body having a first side and a second side opposite the first side, a first magnetic attachment system at a first side of the body comprising at least a first magnet arranged to provide a first activation force for activating a corresponding magnetic attachment feature in the first electronic device, and a second magnetic attachment system at a second side of the body comprising at least a second magnet arranged to provide a second activation force for activating a corresponding magnetic attachment feature in the second electronic device, wherein a magnetic attachment force generated between the activated first and second magnetic systems and the corresponding magnets in the magnetic attachment unit results in the first and second individual electronic devices to operable together as a cooperating electronic device.

A cover assembly is described that includes at least a hinge assembly detachably connected to a host unit and a cover assembly pivotally attached to hinge assembly having a size and shape in accordance with the host unit. The cover assembly includes at least a cover portion pivotally attached to the hinge portion at a first pivot, a flap portion separate from the cover portion pivotally attached to the hinge portion at a second pivot different from the first pivot such that the cover portion and the flap portion rotate about their respective pivot points separately in such that the cover forms a support structure that supports the host device at an inclined angle with respect to the flap portion.

A docking station includes at least a base portion arranged to provide support for a host device, the base portion includes an attachment unit, the attachment unit arranged to detachably secure the host device and the base portion, a user input portion, the user input portion arranged to receive a user input event, and a communication port, the communication port arranged to provide a communication path between the host device and the user input portion of the base portion, wherein information associated with the user input event at the user input portion is passed by way of the communication path provided by the communication port to the host device.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The invention will be readily understood by the following detailed description in conjunction with the accompanying drawings, wherein like reference numerals designate like structural elements, and in which:

FIG. 1 is a simplified block diagram of an article and an electronic device that can be releasably attached to each other in a desired and repeatable manner.

FIGS. 5A and 5B are simplified perspective views of an article in the form of electronic device that can be releasably attached to an electronic device via magnetic attachment unit.

FIGS. 7A-7B show magnetic attachment unit used to magnetically attach electronic devices to form cooperating system.

FIG. 13 shows magnetic attachment unit magnetically attaching tablet devices to form tablet array.

DETAILED DESCRIPTION

Figure 2A:
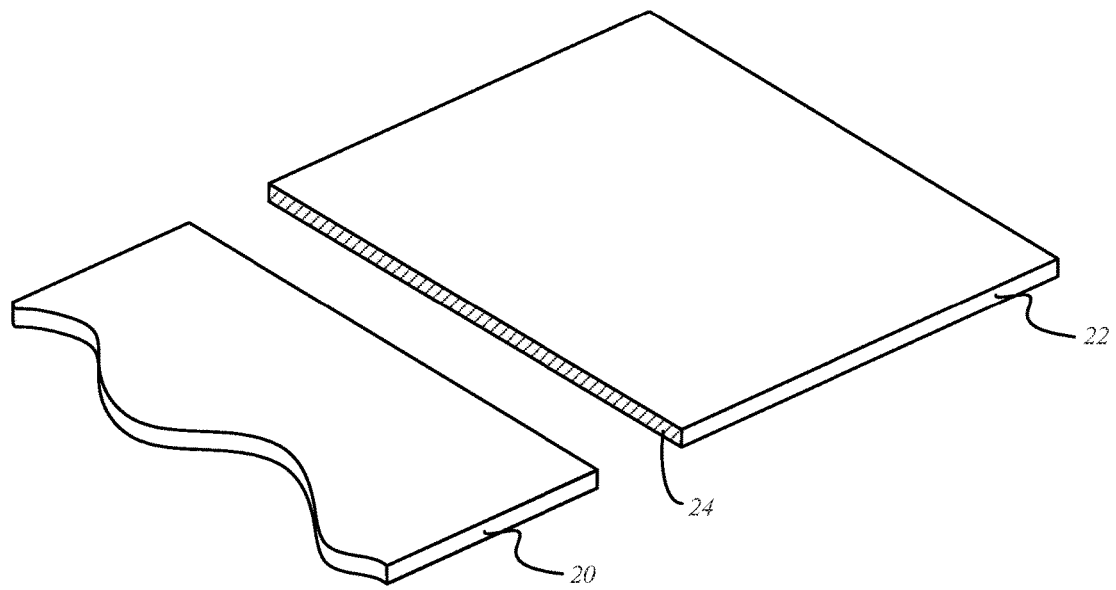
FIG. 2A is a simplified perspective view of an article that can be releasably attached to an electronic device via a side magnetic attachment system, in accordance with one described embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following description relates in general to a mechanism that can be used to attach together at least two suitably configured objects. In one embodiment, this can be accomplished without the use of conventional fasteners. Each of the objects can include an attachment feature arranged to provide a magnetic field having appropriate properties. When the attachment features are brought into proximity with each other, the magnetic fields can cooperatively interact based upon their respective properties and can result in the objects magnetically attaching to each other in a desired and repeatable manner. For example, due at least in part to the cooperative nature of the interaction of the magnetic fields, the objects can attach to each other in a pre-determined position and relative orientation without external intervention. For example, the cooperative magnetic interaction can result in the objects self-aligning and self-centering in a desired orientation.

The objects can remain in the magnetically attached state if and until a releasing force of sufficient magnitude is applied that overcomes the overall net attractive magnetic force. In some cases, however, it can be desirable to detach the objects serially (along the lines of a zipper) in which case, the releasing force only need be of sufficient magnitude to overcome the net magnetic attractive force of one pair of magnetic elements at a time. Connectors such as mechanical fasteners are not required to attach the objects together. Furthermore, to prevent undue interference to the magnetic interaction between the magnetic attachment features, at least a portion of the objects in the vicinity of the magnetic attachment features can be formed of magnetically inactive materials such as plastic or non-ferrous metals such as aluminum or non-magnetic stainless steel.

The objects can take many forms and perform many functions. When magnetically attached to each other, the objects can communicate and interact with each other to form a cooperating system. The cooperating system can perform operations and provide functions that cannot be provided by the separate objects individually. In another embodiment, at least one device can be used as an accessory device. The accessory device can be magnetically attached to at least one electronic device. The accessory device can provide services and functions that can be used to enhance the operability of the electronic device(s). For example, the accessory device can take the form of a protective case that can be magnetically attached to the electronic device and enclose the electronic device. The protective case can provide protection to certain aspects (such as a display) of the electronic device as well as to the electronic device as a whole. The magnetic attachment mechanism used to magnetically attach the protective case and the electronic device can assure that the protective case can only attach to the electronic device in a specific orientation. Moreover, the magnetic attachment mechanism can also assure proper alignment and positioning of the protective case and the electronic device.

In one embodiment, a first object and a second object can be magnetically attached to each other such that the first object can be configured to provide a support mechanism to the second object. The support mechanism can be mechanical in nature. For example, the first object can take the form of a stand that can be used to support the second object on a working surface such as a table. In one embodiment, the stand can take the form of an articulating stand arranged to present the second object in a number of angles and orientations.

In one embodiment, the first object can take the form of a dock arranged to magnetically attach to the second object in a particular manner. The dock can be electronic in nature in those cases where the second object is an electronic device. The dock can provide an electrical contact that can provide power from an external power supply to the electronic device. The electrical contact can also provide a mechanism by which information can be provided to the electronic device and as well as information provided from the electronic device. For example, the dock can include audio output devices such as speakers arranged to broadcast sound based upon an audio signal received from the electronic device.

In one embodiment, the first object can take the form of a hanging apparatus. As such, the first object can be used to hang the second object that can then be used as a display for presenting visual content such as a visual, still images like a picture, art work, and so on. The support mechanism can also be used as a handle for conveniently grasping or holding the second object. This arrangement can be particularly useful when the second object can present visual content such as images (still or visual), textual (as in an e-book) or has image capture capabilities in which case the second object can be used as an image capture device such as a still or visual camera and the first object can be configured to act as a support such as a tripod or handle. The handle can be fixed or flexible. In one embodiment, the hanging apparatus can take the form of hooks, suction cups, or any other appropriate hanging device. For example, the hanging apparatus can be used to secure the electronic device to a whiteboard. In one embodiment, the hanging apparatus in the form of a hook can be used to secure the electronic device to a seat cushion in an automobile, plane, or train. In this way, the electronic device can provide visual content for those seated in a position to view the display screen.

In one embodiment, the attachment can occur between a first and second object where the first object and second object are each electronic devices. The electronic devices can be magnetically attached to each other to form a cooperative electronic system in which the electronic devices can communicate with each other. In one embodiment, the first and second electronic devices can be attached to each other directly. In one embodiment, a magnetic attachment unit can be used to magnetically attach together the first and second electronic devices. Communication between the first and second electronic devices can occur before, during, and after the magnetic attachment is complete.

As part of this communication, information can be passed between the first and second electronic devices. The information can be processed in whole or in part at either the first or second electronic device depending upon the nature of the processing. In this way, the cooperative electronic system can take advantage of the synergistic effect of having multiple electronic devices magnetically attached and in communication with each other. In one implementation, the communication can be carried out wirelessly using any suitable wireless communication protocol such as Bluetooth (BT), GSM, CDMA, WiFi, and so on.

In one embodiment, the magnetic attachment unit can pass information between the first and second electronic devices. In one embodiment, information can be provided from the magnetic attachment unit and pass to one or both of the first and second electronic devices. For example, in one embodiment, the magnetic attachment unit can take the form of a magnetic binder that can be used to attach the first and second electronic devices in the form of an electronic book. As such, at least one electronic device can have a display suitable for presented visual content. Information, such as book content, can pass from the magnetic binder to the electronic device. The information can cause the electronic device to operate in a manner consistent with the information.

For example, when information provided to the first and or second electronic device is associated with a specific learning tutorial (such as math, languages, etc.), the information can cause one or both of the electronic devices to operate in a manner consistent with the tutorial, such as presenting lessons, work sheets, and so forth. For example, the first electronic device can present visual content consistent with the subject matter of the tutorial while the second electronic device can facilitate user interaction by presenting a user input such as a virtual keyboard, touch input, and so on.

In one embodiment, the second electronic device can take the form of a peripheral device such as a keyboard, touch pad, joystick, and so forth. This embodiment can be well suited for video games presented by the first electronic device. In one embodiment, the magnetic attachment unit can store the information required to initiate the video game whereas in another embodiment, the magnetic attachment unit can act as a trigger. The trigger acting to initiate a game resident on either or both the first and second electronic devices.

In one embodiment, the cooperative electronic system can take the form of an array of electronic devices rigidly connected to each other by way of the magnetic attachment unit. The magnetic attachment unit can include a plurality of magnetic attachment features. Each of the plurality of magnetic attachment features can magnetically interact with a corresponding magnetic attachment feature including in a corresponding electronic device. In one embodiment, the array of electronic devices can act as a single unified display (along the lines of a mosaic). In another embodiment, the array of electronic devices can provide a single or a set of functions (such as virtual keyboard).

As an example, a first and second electronic device can be magnetically coupled together by way of a magnetic attachment unit. The magnetic attachment unit can include a magnetic system. In one embodiment, the magnetic attachment unit can act as a trigger to activate a magnetic attachment system in each of the first and second electronic devices. In one embodiment, the activating can be a result of a keyed magnetic interaction between the magnetic system and each of the magnetic attachment systems. In one embodiment, the keyed magnetic interaction can take the form of an interaction between magnetic fields having properties based upon an arrangement of magnetic elements in the magnetic system and the magnetic attachment systems in the first and second electronic devices.

In one embodiment, the magnetic attachment unit can be formed of a bendable yet sturdy material. In this way, a portion of the magnetic attachment unit magnetically attached to the first electronic device can be bent in such a way that a display on the first electronic device is presented to a user at a comfortable viewing angle of about 70°-75° while the second electronic device remains flat on a supporting surface such as a table. In this way, the second electronic device can display an input (such as a virtual keyboard, GUI, and so on) that can be used to input data to the cooperative system. In one embodiment, the first electronic device can present visual content in accordance with the current state of the cooperative system.

For example, the second electronic device can present a virtual keyboard that can be used to provide input commands and/or data and such to the cooperative system by the magnetic attachment of the first and second electronic devices. In the case where the magnetic attachment unit is associated with a math tutorial, for example, information provided to the first and second electronic devices can cause a display of the first electronic device to present subject matter (math equations to solve, problems, etc.) for which the student can interact by using the virtual keyboard presented by a display of the second electronic device.

These and other embodiments are discussed below with reference to FIGS. 1-35. However, those skilled in the art will readily appreciate that the detailed description given herein with respect to these figures is for explanatory purposes only and should not be construed as limiting. For the remainder of this discussion, a first and second object each suitably configured to magnetically attach to each other in accordance with the described embodiments will be described. It should be noted, however, that any number and type of suitably configured objects can be magnetically attached to each other in a precise and repeatable manner. In particular, for simplicity and clarity, for the remainder of this discussion, the first object is presumed to take the form of an electronic device and in particular a handheld electronic device.

FIG. 1 is a simplified block diagram of article 10 and electronic device 12 that can be releasably attached to each other in a desired and repeatable manner. More specifically, article 10 and electronic device 12 can attach to each other at a pre-determined position and relative orientation without external intervention and without the use of mechanical fasteners. Article 10 and electronic device 12 can remain attached to each other if and until a releasing force is applied that overcomes the engagement between them. In some cases, however, it can be desirable to detach article 10 and electronic device 12 serially (along the lines of a zipper) in which case, a releasing force can be applied that can undo the engagement between article 10 and electronic device 12 about one attachment component at a time. For example, an attachment component can include a suitably matched pair of magnetic elements, one in article 10 and a second in electronic device 12.

Electronic device 12 can take many forms. For example, electronic device 12 can take the form of a portable electronic device. In some examples, the portable electronic device can include housing 15. Housing 15 can enclose and provide support for components of the portable electronic device. Housing 15 can also provide support for at least a large and prominent display occupying a substantial portion of a front face of the portable electronic device. The display can be used to present visual content. The visual content can include still images, visual, textual data, as well as graphical data that can include icons used as part of a graphical user interface, or GUI.

In some cases, at least a portion of the display can be touch sensitive. By touch sensitive it is meant that during a touch event, an object (such as a finger, stylus, and so on) can be placed in contact with or in proximity to an upper surface of the display. The particulars of the touch event (location, pressure, duration, and so forth) can be used to provide information to the portable electronic device for processing. In some embodiments, in addition to or in place of information being provided to the portable electronic device, information can be provided by the portable electronic device in a tactile manner using, for example, haptic actuators. It should be appreciated however that this configuration is by way of example and not by way of limitation as the electronic device can be widely varied. In one example, the portable electronic device is a tablet computer such as, for example, the iPad™ manufactured by Apple Inc. of Cupertino, Calif.

Article 10 can be widely varied and can take many forms such as, for example, an accessory or accoutrement of electronic device 12. As an accessory, article 10 can be configured as a cover, a stand, a dock, a hanger, an input/output device and so on. In a particularly useful form, article 10 can take the form of a protective cover that can include a member, such as a flap, that can be positioned over the display of the portable electronic device. Like the electronic device 12, the article 10 can also include housing 17 that can enclose and provide support for components of the article 10.

Either one or both of article 10 and electronic device 12 can include attachment features. For example, article 10 can include attachment system 13 and electronic device 12 can include corresponding attachment system 14. Attachment system 13 can cooperate with corresponding attachment system 14 to attach article 10 and electronic device 12 in a releasable manner. When attached to each other, article 10 and electronic device 12 can operate as a single operating unit. On the other hand, in the detached mode, article 10 and electronic device 12 can act separately, and if desired, as two individual parts. Attachment systems 13 and 14 can be configured in such a way that article 10 and electronic device 12 can attach to each other in a desired and repeatable manner. In other words, attachment systems 13 and 14 can repeatedly align article 10 and electronic device 12 together such that they are consistently in a pre-determined position relative to one another.

The attachment features can be widely varied. The attachment can be provided by various types of couplings including mechanical, electrical, static, magnetic, frictional, and/or the like. In one embodiment, the attachment cannot be seen from the outside of the article and/or electronic device. For example, the article and device can not include external visible attachment features that adversely affect the look and feel or ornamental appearance (e.g., snaps, latches, etc.), but rather attachment features that cannot be seen from the outside of the article or device and thus do not affect the look and feel or ornamental appearance of the article or device. By way of example, the attachment features can be provided by attraction surfaces that do not disturb the external surfaces of the article or device. In one embodiment, at least a portion of the attachment features utilize magnetic attraction to provide some or all of the attaching force.

The attachment systems can include one or more attachment features. If multiple features are used, the manner in which they secure can be the same or different. For example, in one implementation, a first attachment feature utilizes a first attachment means while a second attachment feature utilizes a second attachment means that is different than the first attachment means. For example, the first attachment means can utilize a friction coupling while the second attachment means can utilize magnetism. In another implementation, a first attachment feature utilizes a first attachment means while a second attachment feature utilizes the same or similar attachment means. For example, the first and second attachment means can be provided by magnets. Although, the attachment means can be similar it should be appreciated that the configuration of the features can be different depending on the needs of the system. Further, any number and configuration of attachment means can be used.

In the illustrated embodiment, the attachment systems 13 and 14 each include at least a first set of corresponding attachment features 13a/14a and a second set of corresponding attachment features 13b/14b. Attachment feature 13a can cooperate with corresponding attachment feature 14a to attach article 10 and electronic device in a releasable manner. In one particular implementation this is accomplished with magnetic attraction. Further, attachment feature 13b can cooperate with corresponding attachment feature 14b to further attach article 10 and electronic device in a releasable manner. In one particular implementation this is accomplished with magnetic attraction. By way of example, attachment features 13a/14a can be provided at a first location while attachment features 13b/14b can be provided at a second location.

In a specific example, attachment feature 14a can, in cooperation with attachment feature 13a, secure electronic device 12 to article 10. In another example, attachment feature 13b can secure article 10 to the electronic device 12 using attachment feature 14b. It should be noted that the attachment systems 13 and 14 of this example can be separate or they can cooperate together to produce the attachment. If they cooperate, attachment features 14a and 14b correspond to or mate with one or more attachment features 13a and 13b. In any case, the attachment features in any of these examples can be accomplished through mechanical, static, suction, magnetic attachment and/or the like.

The placement of the attachment systems and the attachment features within the attachment systems can be widely varied. Regarding electronic device 12, attachment system 14 can be placed on front, back, top, bottom, and/or sides. Attachment features 14a and 14b can be placed any location within attachment system 14. Accordingly, attachment features 14a and 14b can be placed anywhere relative to the housing and/or the display. In one example, the attachment features 14a and 14b can provide engagement along one or more of the sides of the housing (e.g., top, bottom, left, right). In another example, attachment features 14a and 14b can provide engagement at the back of electronic device 12. In yet another example, attachment features 14a and 14b can provide engagement at the front (e.g., where, if present, a display is located) of electronic device 12. In some cases, a combination of attachment features can be located at different regions of electronic device 12 as for example at the sides and front. In one embodiment, attachment system 14 including attachment features 14a and 14b do not disturb the surfaces of electronic device 12. Similarly, attachment system 13 and in particular attachment features 13a and 13b do not disturb the surfaces of article 10.

In accordance with one embodiment, the attachment features can include magnetic elements. The magnetic elements can be configured to help in positioning article 10 relative to electronic device 12 into a mating arrangement. The magnetic elements can further help to secure article 10 and electronic device 12 into a mating engagement. It should be noted that the engagement of article 10 and electronic device 12 can be reversed by the application of an appropriate releasing force that allows article 10 and electronic device 12 to separate back into individual objects. However, the magnetic elements can permit the article 10 and electronic device 12 to subsequently resume the mating engagement without the requirement of fasteners of any sort, mechanical or otherwise. In this way, the magnetic elements provide a repeatable and consistent engagement between article 10 and electronic device 12.

Article 10 and electronic device 12 can further include components 16 and 18 respectively. Components 16 and 18 typically depend on the configuration of article 10 and electronic device 12 and can, for example, be mechanical or structural components used to provide support or they can be operational/functional components that can provide a specific set of operations/functions. The components can be dedicated to their respective devices or they may be configured for coupling with aspects of the corresponding article or device (e.g., wired or wireless). Examples of structural components can include frames, walls, fasteners, stiffeners, movement mechanisms (hinge), etc. Examples of operational components can include processors, memory, batteries, antennas, circuitry, sensors, display, inputs, and so on. Depending on their desired configuration, the components can be external (i.e., exposed at the surface) and/or internal (e.g., embedded within housing).

Figure 2B:
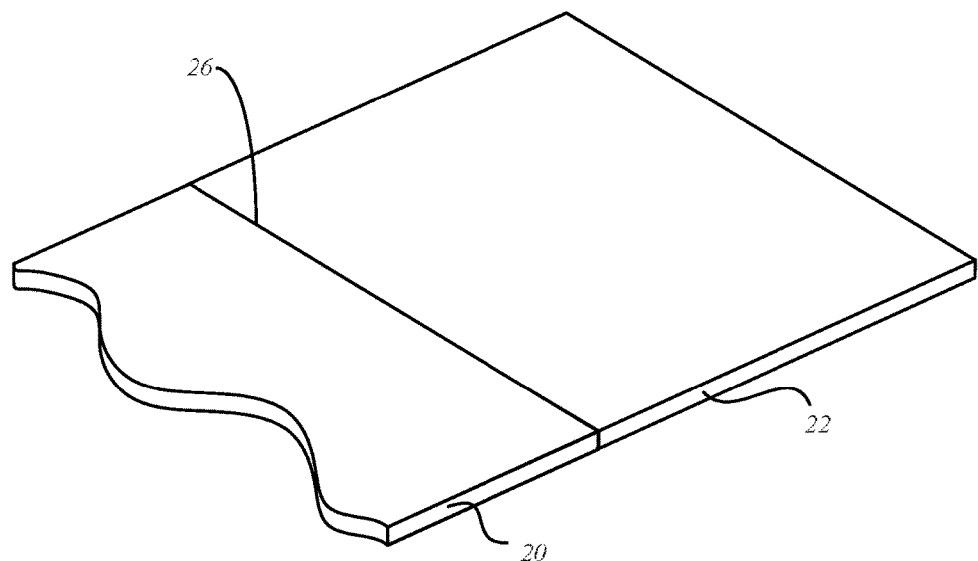
FIG. 2B shows the article and the electronic device of FIG. 2A attached in accordance with the side magnetic attachment system.

FIGS. 2A and 2B are simplified perspective views of article 20 that can be releasably attached to electronic device 22 via a magnetic attachment system, in accordance with one described embodiment. Article 20 and electronic device 22 can generally correspond to those discussed with regards to FIG. 1. In one embodiment, the magnetic attachment system can be embodied as magnetic surface 24 (shown by broken lines or shading) and more particularly as magnetic surface 24 at the sides of electronic device 22. Magnetic surface 24 can provide a magnetic field that can cooperate with a corresponding attachment feature in article 20 when placed in proximity to one another. The magnetic field can establish a net magnetic attractive force that can pull article 20 and electronic device 22 together into the mating engagement along engagement surface 26 as shown in FIG. 2B.

In other words, the magnetic field provided by magnetic surface 24 can have properties such that the net magnetic attractive force between article 20 and electronic device 22 is substantially perpendicular to engagement surface 26. Moreover, the magnetic field can result in the net magnetic attractive force between article 20 and electronic device 22 being applied uniformly along engagement surface 26. In order to release article 20 and electronic device 22, a releasing force can be applied to the two conjoined objects in order to overcome a net magnetic attractive force provided by the magnetic attachment system.

It also should be appreciated that although only one side wall is shown, in some cases different sidewalls and possibly a combination of sidewalls may be used depending on the needs of the attachment interface. It should be noted that the use of magnetic attachment precludes the need for mechanical attachments such as fasteners. Moreover, the lack of mechanical attachments and the uniformity of the overall magnetic attractive force can leave the surfaces of article 20 and electronic device 22 undisturbed helping to create an appearance of oneness by in which article 20 and electronic device 22 can appear as a single, unified entity. The uniformity in appearance can improve the overall aesthetic appeal of both article 20 and electronic device 22.

In one embodiment, a magnetic surface can be created by embedding magnetically attractable elements in the form of the magnetic attachment feature within the sidewalls of electronic device 22 and/or article 20. That is, the magnetically attractable elements can be disposed within article 20 and electronic device 22 as for example within the housing of electronic device 22. In this configuration, the housing can be formed of non-magnetic material such as plastic or non-ferrous metal such as aluminum. In this way, magnetic force lines can be configured to work through the walls of the housing. The magnetic attachment features do not disturb the physical appearance of the external surfaces of article 20 and electronic device 22. The magnetically attractable elements in article 20 and electronic device 22 can be arranged to produce magnetic fields that can cooperate with each other to generate a magnetic attractive force that attaches article 20 and electronic device 22 together in the mating engagement. The magnetic attractive force being configured to generate a magnetic attraction force normal to engagement surface 26 between electronic device 22 and article 20.

The magnetic attractive force between corresponding magnetic elements in article 20 and electronic device 22 can also be uniformly applied along engagement surface 26. The uniformity of the overall magnetic attractive force along engagement surface 26 can be a result of the uniformity of the separation distance between corresponding magnetic elements in article 20 and electronic device 22. The uniformity can also be a result of the consistency of magnetic flux density between corresponding magnetic elements in article 20 and electronic device 22. The uniformity of net magnetic attachment can be facilitated by the surfaces of article 20 and electronic device 22 each forming a well matched fit to each other. For example, one surface can be flat or have a concave geometry whereas the other surface can have a matching conforming convex geometry. In this way, by fitting tightly together, a separation distance between each of the corresponding magnetic elements in article 20 and electronic device 22 can be reduced to a minimum. The conformity of surface shapes can also enhance the overall look and feel of article 20 and electronic device 22 by reducing or eliminating the appearance of a seam at engagement surface 26. This seamless quality can provide an illusion of a single entity when article 20 and electronic device 22 are attached to each other.

In addition to enhancing the overall look and feel, the consistency of the separation distance between the magnetic elements can render the attachment force between article 20 and electronic device 22 uniform along engagement surface 26. In this way, the engagement force can be uniformly distributed across engagement surface 26 preventing buckling, weak spots, and so on that might otherwise affect the overall integrity of the engagement between article 20 and electronic device 22.

Figure 3A:
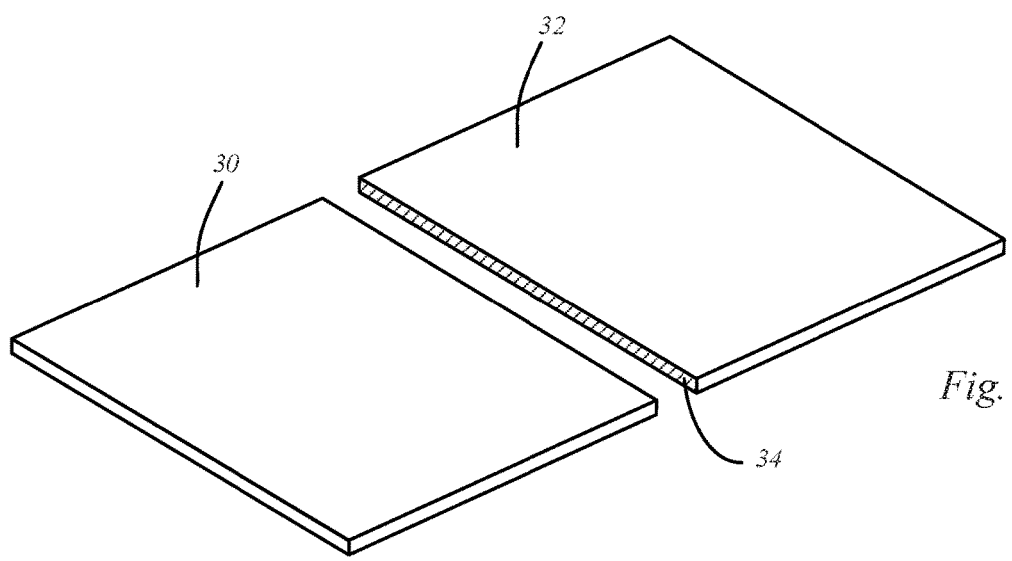
FIG. 3A is a simplified perspective view of a first electronic device that can be releasably attached to a second electronic device via a side magnetic attachment system, in accordance with one described embodiment.
Figure 3B:
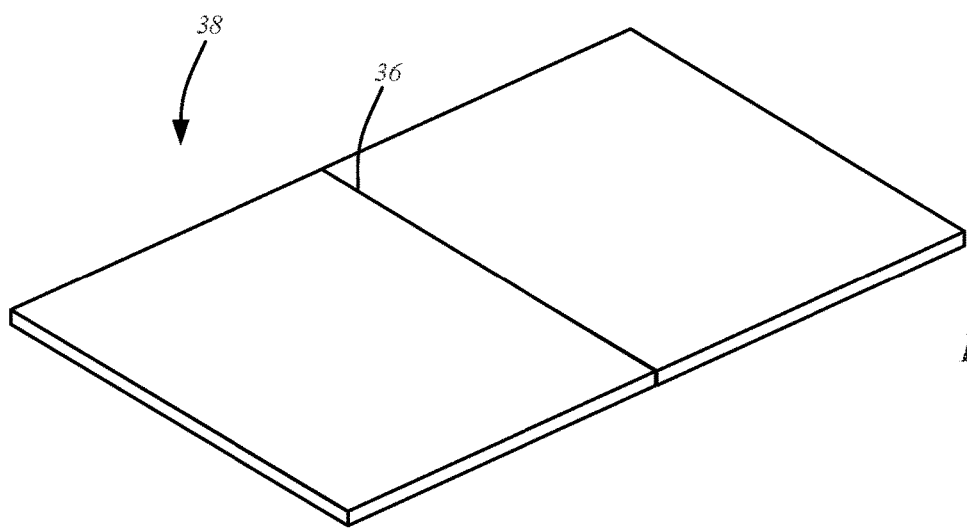
FIG. 3B shows the first electronic device and the second electronic device of FIG. 3A attached in accordance with the side magnetic attachment system to form a cooperating electronic system.

FIGS. 3A and 3B are simplified perspective views of article 20 that can take the form of electronic device 30 that can be directly and releasably attached to electronic device 32 via a magnetic attachment system in accordance with one described embodiment. In one embodiment, the magnetic attachment system can be embodied as magnetic surface 34 (shown by broken lines or shading) and more particularly as magnetic surface 34 at the sides of electronic device 32. Magnetic surface 34 can provide a magnetic field that can cooperate with a corresponding attachment feature in electronic device 30 when placed in proximity to one another. The magnetic field can establish a net magnetic attractive force that can pull electronic device 30 and electronic device 32 together into the mating engagement along engagement surface 36 to form cooperating system 38 as shown in FIG. 3B.

Figure 4A:
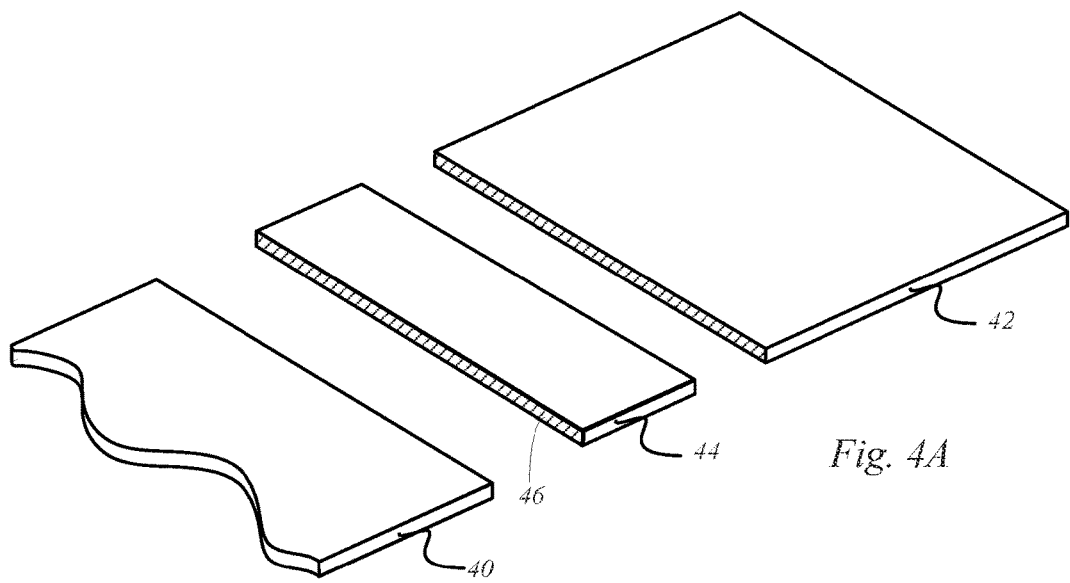
FIGS. 4A and 4B are simplified perspective views of an article that can be releasably attached to an electronic device via magnetic attachment unit and corresponding magnetic system.
Figure 4B:
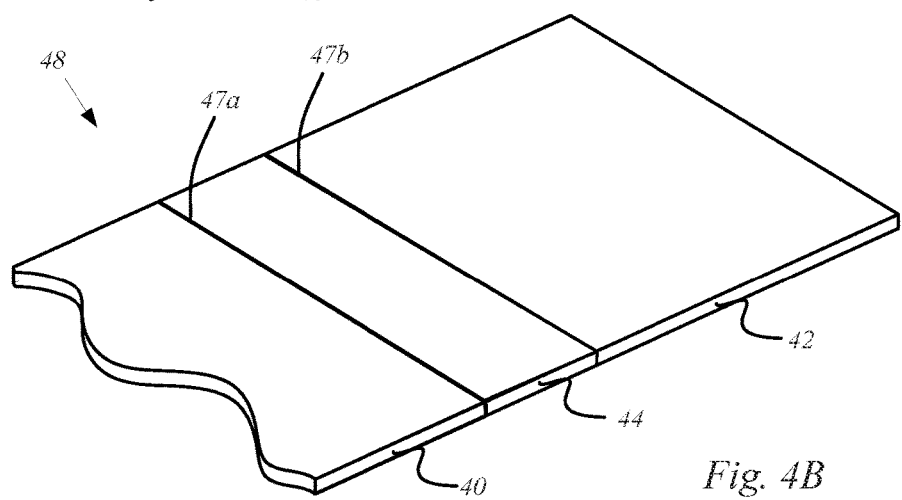

FIGS. 4A and 4B are simplified perspective views of article 40 that can be releasably attached to electronic device 42 via magnetic attachment unit 44 and corresponding magnetic system 46. It should be noted that this particular embodiment is similar to the embodiment described in FIGS. 2A, 2B except that magnetic attachment unit 44 is used to magnetically attach article 40 and electronic device 42 that were previously attached to each other directly at their respective side walls. In this way, attachment system 46 can include a plurality of magnetic attachment features arranged to provide suitable magnetic attachment for article 40 and electronic device 42, respectively.

FIG. 4B shows article 40 and electronic device 42 magnetically attached to each other by way of magnetic attachment unit 44 at engagement surfaces 47a and 47b to form cooperating system 48. As part of system 48, electronic device 42 and article 40 can cooperate with each other to provide features not available by article 40 or electronic device 42 separately. For example, article 40 can take the form of a hanging apparatus, docking apparatus, mounting apparatus and so forth that can provide features to a user not available by electronic device 42 separately. In one embodiment, article 40 can take the form of a docking system that can be magnetically attached to electronic device 42 by way of magnetic attachment unit 44. In one embodiment, the docking system can provide mechanical support for electronic device 42. In one embodiment, the docking system can act as to provide information to electronic device 42. In one embodiment, the information can be stored within a storage device embedded in magnetic attachment unit 44. In one embodiment, the information can be received at article 40 (by a WiFi connection, for example) and passed by way of magnetic attachment unit 44 to electronic device 42, and vice versa.

In one embodiment, article 40 can be used to hang electronic device 42. For example, article 40 can include hooks, fasteners, and so forth that can be used to grasp another object for support. Article 40 can be used to provide support for electronic device 42. For example, article 40 can take the form of an articulating support that can be magnetically attached to electronic device 42. The articulating nature of article 40 can be used to present electronic device 42 at various angles and orientations. It should be noted that due to the releasable nature of the magnetic attachment between magnetic attachment unit 44 and article 40 can be easily detached when electronic device 42 is to be used and subsequently re-attached when desired.

FIGS. 5A and 5B are simplified perspective views of article 40 in the form of electronic device 50 that can be releasably attached to an electronic device 52 via magnetic attachment unit 54. This embodiment is similar to that shown in FIGS. 4A and 4B in that magnetic attachment unit 54 can include multiple magnetically attractable elements. For example, magnetic elements can be placed within magnetic attachment unit 54 in such a way to create magnetic surfaces 56a and 56b suitable for activating magnetic attachment systems in electronic devices 50 and 52, respectively. For example, the activation of the magnetic attachment system in electronic device 52 can result in magnetic surface 58 being presented at the side wall of electronic device 52. Magnetic surface 58 can be used to magnetically attach magnetic attachment unit 54 and electronic device 52 at engagement surface 60a. In one embodiment, magnetic surface 56b can be created at an opposing side wall of magnetic attachment unit 54. In much the same way as with magnetic attachment unit 54, magnetic surface 56b can be used to activate a magnetic attachment system in electronic device 50 that creates a magnetic surface suitable for magnetically attaching magnetic attachment unit 54 to electronic device 50 at engagement surface 60b creating cooperating system 62 shown in FIG. 5B.

It should be noted, however, that although side to side magnetic attachment between electronic devices 50 and 52 are shown, in some embodiments, magnetic surfaces can be located on bottom surfaces and/or top surfaces of electronic devices 50 and 52. For example, magnetic elements of magnetic attachment unit 54 can be embedded behind top surface 64 of magnetic attachment unit 54 creating magnetic surface 66 for attaching to rear surfaces of electronic devices 50 or 52 forming a back to back arrangement. It should be noted that although not shown, additional magnetic elements can be embedded in a bottom surface of magnetic attachment unit 54.

FIG. 5B shows electronic device 50 and electronic device 52 magnetically attached to each to each other to form cooperating system 62. In this arrangement, electronic device 52 and electronic device 50 can cooperate with each other to provide features not available by electronic device 50 or electronic device 52 separately. For example, electronic device 50 can receive information in the form of, for example, an input command from a user and/or input data from, for example, a sensor. Electronic device 50 can process the information in whole or in part and pass the processed information to electronic device 52 for further processing In this way, cooperating system 62 can process the information in a more efficient manner preserving computational resources that provides an enhanced user experience over that expected from either electronic device 50 or 52 acting separately.

Cooperating system 62 can be formed by placing magnetic attachment unit 54 and electronic devices 50 and 52 in proximity to each other such that magnetic surfaces 56a and 56b on the sides of magnetic attachment unit 54 activate magnetic attachment systems in electronic devices 52 and 50, respectively. The activated magnetic systems, in turn, provide magnetic surfaces (such as magnetic surface 58) that interact with magnetic attachment unit 54 to create a net magnetic attractive force of sufficient magnitude and direction to maintain electronic device 50 and electronic device 52 in a mating engagement to form cooperating system 62.

In one embodiment, magnetic attachment unit 54 can be formed of rigid material. In one embodiment, magnetic attachment unit 54 can be bendable. In one aspect, the bendable nature of magnetic attachment unit 54 can be used to provide a user with a user interface such as a keyboard and a display that can be presented as a visually comfortable angle such as 75°.

Although the purpose of the magnetic elements is similar, i.e., attach article to electronic device, attach electronic device to electronic device, it should be appreciated that these mechanisms can widely vary. In some cases, the magnetic fields may be configured differently. By way of example, the side mounted magnetic surface may provide a first magnetic force and the front facing magnetic surface may provide a second magnetic force that is different than the first magnetic force. This may be in part due to different holding requirements as well as different surface areas, i.e., available space, and its effect on internal components of the electronic device. In one example, the side mounted magnetic surface provides a greater holding force for securing the article (or electronic device) to the electronic device (i.e., it is the primary securing force) while the front facing magnetic surface is the secondary securing force.

In one example, magnetic attachment unit 54 includes multiple sections that are semi-rigid and bend relative to one another so as to make magnetic attachment unit movable and flexible. In one embodiment, magnetic attachment unit 54 can be folded into one or more different configurations, and in some cases can be held in these configurations using a magnetic system similar to what is described above. These and other embodiments will be described in greater detail below. Moreover, it should be appreciated that the described embodiments are not limited to that specifically described herein and other configurations can be used including for example as an accessory device used as a hanging apparatus, as a support mechanism for the electronic device to improve viewing the display and as a support mechanism for or inputting touch events at a touch sensitive portion of the display, and so on.

The electronic device and article can take many forms. For the remainder of this discussion, the electronic device is described in terms of a handheld portable computing device. Accordingly, FIG. 6 shows a top perspective view of electronic device 100 in accordance with the described embodiments. Electronic device 100 can process data and more particularly media data such as audio, visual, images, etc. By way of example, electronic device 100 can generally correspond to a device that can perform as a smart phone, a music player, a game player, a visual player, a personal digital assistant (PDA), a tablet computer and the like. Electronic device 100 can also be hand held. With regards to being handheld, electronic device 100 can be held in one hand while being operated by the other hand (i.e., no reference surface such as a desktop is needed). Hence, electronic device 100 can be held in one hand while operational input commands can be provided by the other hand. The operational input commands can include operating a volume switch, a hold switch, or by providing inputs to a touch sensitive surface such as a touch sensitive display device or a touch pad.

Electronic device 100 can include housing 102. In some embodiments, housing 102 can take the form of a single piece housing formed of any number of materials such as plastic or non-magnetic metal which can be forged, molded, or otherwise formed into a desired shape. In those cases where electronic device 100 has a metal housing and incorporates radio frequency (RF) based functionality, a portion of housing 102 can include radio transparent materials such as ceramic, or plastic. Housing 102 can be configured to enclose a number of internal components. For example, housing 102 can enclose and support various structural and electrical components (including integrated circuit chips) to provide computing operations for electronic device 100. The integrated circuits can take the form of chips, chip sets, or modules any of which can be surface mounted to a printed circuit board, or PCB, or other support structure. For example, a main logic board (MLB) can have integrated circuits mounted thereon that can include at least a microprocessor, semi-conductor memory (such as FLASH), and various support circuits and so on. Housing 102 can include opening 104 for placing internal components and as necessary can be sized to accommodate display assembly for presenting visual content, the display assembly being covered and protected by protective layer 106. In some cases, the display assembly can be touch sensitive allowing tactile inputs that can be used to provide control signals to electronic device 100. In some cases, the display assembly may be a large prominent display area that covers a majority of the real estate on the front of the electronic device.

Electronic device 100 can include a magnetic attachment system that can be used to magnetically attach electronic device 100 to at least one other suitably configured object.

The magnetic attachment system can include a number of magnetic attachment features distributed within and in some cases connected to housing 102. For example, the magnetic attachment system can include first magnetic attachment feature located in proximity to side wall 102a and a second magnetic attachment feature located beneath cover glass 106. In one embodiment, the first magnetic attachment feature can operate in multiple states. For example, in an inactive state, the first magnetic attachment feature can provide first magnetic surface M1 at an exterior surface of side wall 102a. First magnetic surface M1 can be represent a magnetic field that has little or no effect on magnetically sensitive devices placed at the exterior surface of side wall 102a and is also not suitable for magnetic attachment. In other words, magnetic surface M1 is consistent with magnetic flux density B at side wall 102 that satisfies Eq. (1):

$$B \leq B_{threshold} \qquad \text{Eq. (1)}$$

where $B_{threshold}$ represents a value of magnetic flux density B corresponding to a value of magnetic flux leakage at side wall 102a that does not facilitate magnetic attachment at side wall 102a and does not substantially affect a magnetically sensitive device at side wall 102a.

Figure 6A:
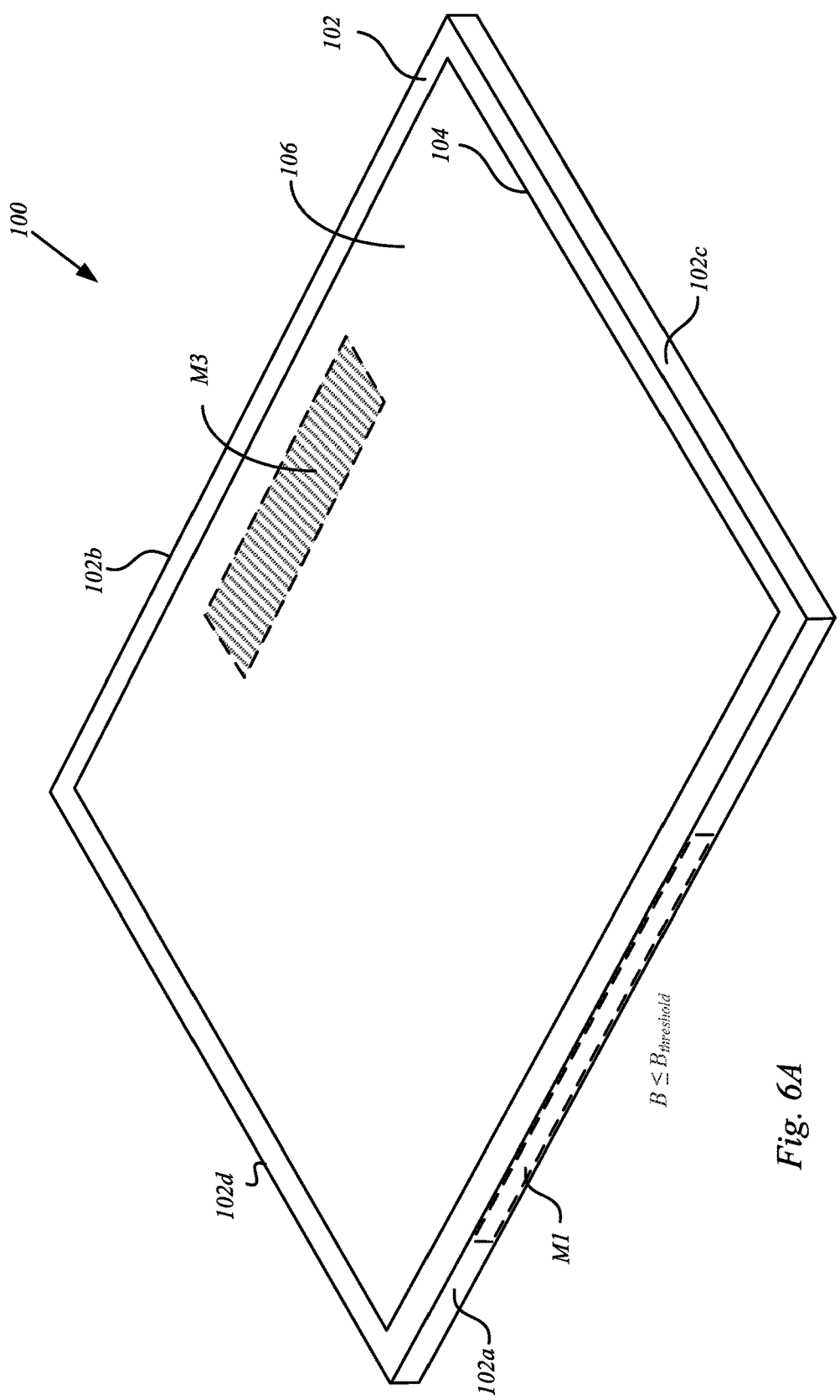
FIG. 6A shows a top perspective view of electronic device 100 in accordance with the described embodiments.
Figure 6B:
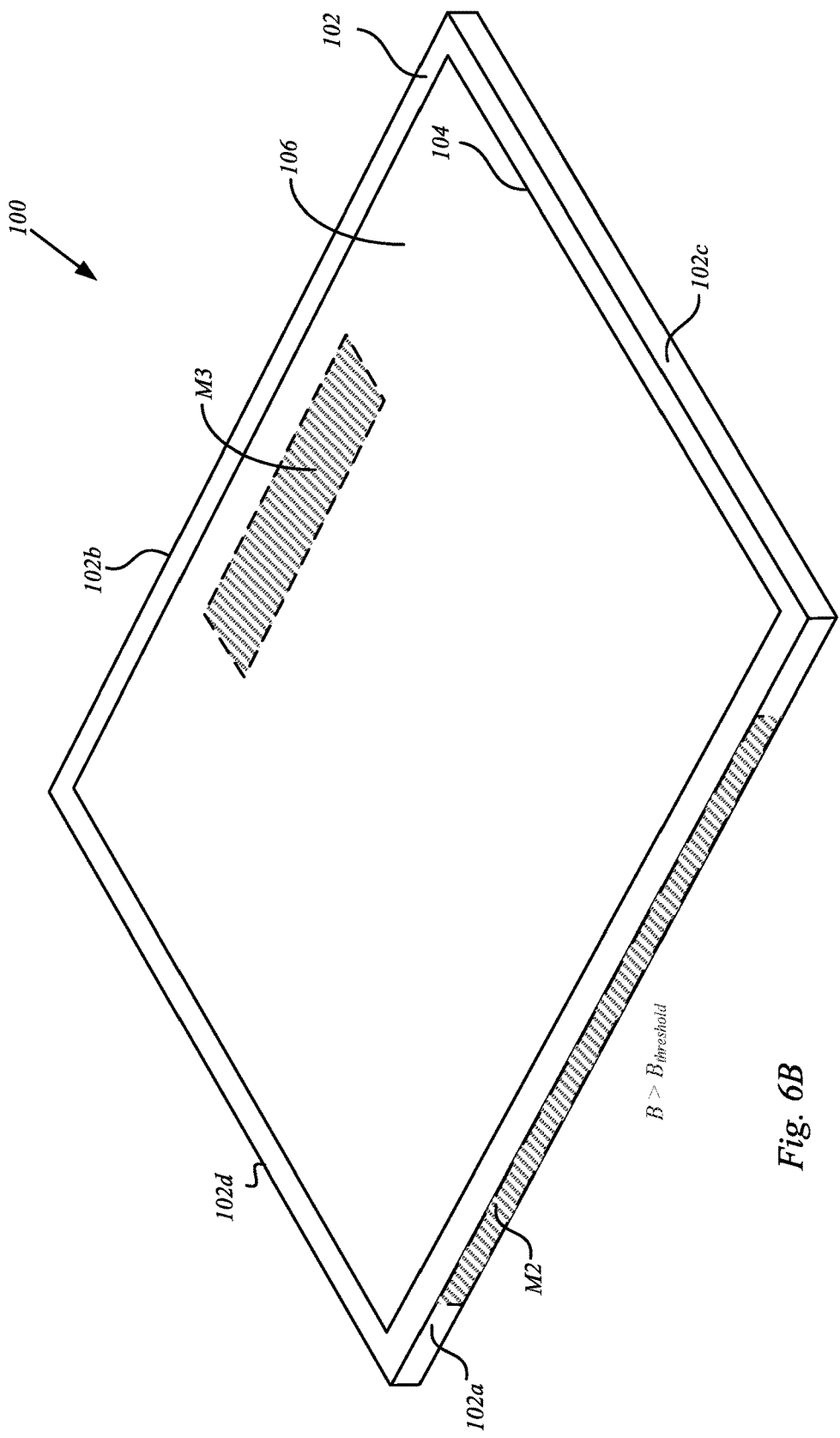
FIG. 6B shows activated magnetic attachment feature.

In an active state, however, the first magnetic attachment feature can provide second magnetic surface M2 at the exterior surface of side wall 102 as shown in FIG. 6B in cross hatch. Magnetic surface M2 is consistent with facilitating magnetic attachment at the exterior surface of side wall 102 that satisfies Eq. (2):

$$B > B_{threshold} \qquad \text{Eq. (2).}$$

In one embodiment, an external magnetic field having appropriate magnetic properties can cause the first magnetic attachment system to transition from the inactive state to the active state. In this way, the magnetic surface expressed at side wall 102a can change from magnetic surface M1 (shown in FIG. 6A) to magnetic surface M2 (shown in FIG. 6B). The external magnetic field can be provided by a magnetic attachment feature external to electronic device 100 that cooperates with the first magnetic attachment feature causing the operating state of the first magnetic attachment feature to change from inactive to active.

The second magnetic attachment feature can aid in the magnetic attachment of another device to electronic device 100 by providing magnetic surface M3 that satisfies Eq. (2).

In one embodiment, the second magnetic attachment feature operates has one operating state consistent with providing magnetic surface M3.

Although not expressly shown, it is understood that the various magnetic attachment features of the magnetic attachment system can be located at any appropriate location of housing 102. For example, magnetic attachment features can be located at an interior bottom surface of housing 102 or along sides 102c and 102d of housing 102.

As shown in FIGS. 7A-7B and referring back to the discussion above with regards to FIGS. 5A-5B, magnetic attachment unit 54 can be used to magnetically attach electronic devices 100 and 120 to form cooperating system 130 at engagement surfaces 132a and 132b. Cooperating system 130 can utilize resources from both electronic devices 100 and 120 singly or in combination. In one embodiment, electronic device 100 can present a virtual keyboard that can respond to a touch event by wirelessly sending corresponding information to electronic device 120. Electronic device 120 can use the information to provide a response. For example, a user can select from a list of icons presented by electronic device 100 a particular media item, or items. An identification of the selected media item(s) can be forwarded (either wirelessly or by way of a wired connection) to electronic device 120. In one embodiment, electronic device 120 can decode and present at least a portion of the selected media item.

Figure 8A:
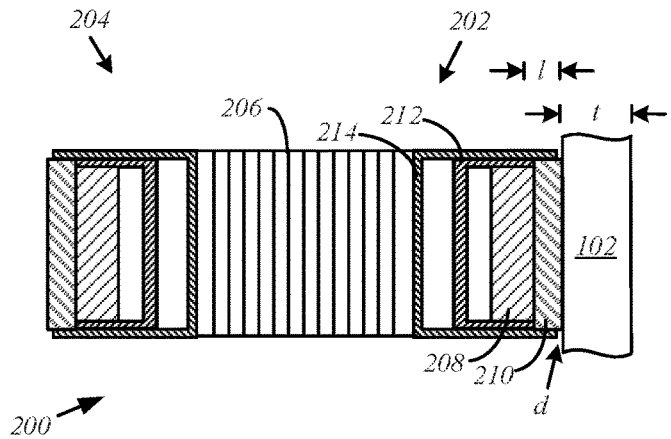
FIGS. 8A-8C show various embodiments of magnetic attachment unit that can be used to magnetically attach electronic device to an object having a suitably configured magnetic attachment system.
Figure 8B:
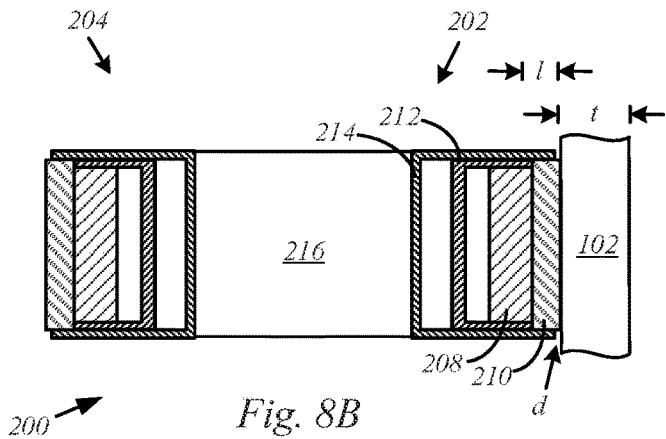
Figure 8C:
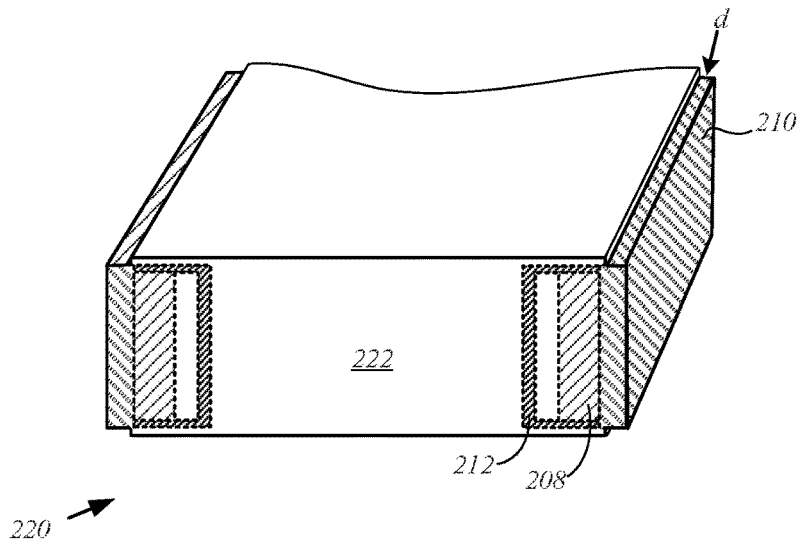

FIGS. 8A-8C show various embodiments of magnetic attachment unit 200 that can be used to magnetically attach electronic device 100 to an object having a suitably configured magnetic attachment system. The object can take the form of an accessory device. The object can take the form of an electronic device. In some cases, the accessory device can include electronic components that can communicate with electronic device 100, and vice versa. In any case, magnetic attachment unit 200 as can include magnetic attachment features 202 and 204 connected together by way of flexible member 206. In one embodiment, magnetic attachment features 202 and 204 can be fixedly attached to flexible member 206. In one embodiment, magnetic attachment features 202 and 204 can be pivotally connected to flexible member 206 thereby providing additional degrees of freedom for magnetic attachment unit 200.

FIG. 8A shows a cross sectional side view magnetic attachment features 202 and 204 in accordance with the described embodiments. In this particular illustration, magnetic attachment features 202 and 204 are magnetically attached to a portion of housing 102 having a substantially flat surface. It should be noted, however, that housing 102 can have a curved shape in which case, the shape of various components of magnetic attachment features 202 and 204 described below can take on a shape that conforms to the shape of housing 102. In this way, a separation distance between corresponding magnetic elements within housing 102 and magnetic attachment features 202 and 204 can be minimized thereby maximizing a net magnetic attractive force.

It should be noted that in the following description, magnetic attachment features 202 and 204 have substantially the same configuration. However, in some embodiments, magnetic attachment features 202 and 204 can differ somewhat in structure depending upon the nature and form of the objects being magnetically attached together. Therefore, for succinctness, magnetic attachment feature 202 will be described only.

Magnetic elements in electronic device 100 can magnetically interact with corresponding magnetic element 204. In one embodiment, magnetic element 208 can have thickness of about 2 mm and have a shape that substantially conforms to that of housing 102. The magnetic interaction between magnetic element 208 and those magnetic elements in electronic device 100 can create net magnetic attractive force consistent with a separation distance $x_{sep}$ is about equal to the total of the thickness t of housing 102 and thickness "l" of label 210. Thickness "l" can be on the order of about 0.2 mm. Label 210 can be used to protect the exterior surface of housing 102 against possible scratching and other cosmetic damage potentially caused by metal to metal contact between magnetic element 208 and housing 102. Both label 210 and magnetic element 208 can each be shaped to conform to the shape of housing 102. In this way, the distance between magnetic element 208 and the magnetic element in electronic device 100 can be reduced to about the thickness t of housing 102 and thickness 1 of label 210.

Magnetic shunt 212 can be glued to and enclose that portion of magnetic element 208 facing away from housing 102. Magnetic shunt 212 can be formed of magnetically active material such as steel or iron. The magnetically active material can redirect magnetic flux lines that would otherwise be directed away from magnetic elements in electronic device 100 towards housing 102 thereby increasing the total magnetic flux density B between magnetic attachment feature 202 and electronic device 100. Magnetic shunt 212 can, in turn, be glued to housing 214 of magnetic attachment feature 202. It should be noted, that in order to assure that only label 210 contacts housing 214 (to avoid metal to metal contact), label 210 is proud (i.e., protrudes) of housing 102 by about distance "d". Nominally, distance d can be on the order of about 0.1 mm.

FIG. 8B shows an embodiment of magnetic attachment feature 200 where magnetic attachment features 202 and 204 are coupled to rigid member 216. As noted above, magnetic attachment features 202 and 204 can be fixedly connected to rigid member 216. In one embodiment, magnetic attachment features 202 and 204 can be pivotally connected to rigid member 216.

FIG. 8C shows another embodiment of magnetic attachment unit in the form of magnetic attachment unit 220 where magnetic attachment features 202 and 204 are incorporated within connecting member 222 (that can be either rigid or flexible). In this configuration, there is no need for housing 214. Therefore, only magnetic element 208, label 210, and shunt 212 are required.

The remainder of this discussion will describe particular embodiments of devices that can use the magnetic attachment system. In particular, electronic device 100 will henceforth be described in terms of a tablet computing device such as the iPad™ manufactured by Apple Inc. of Cupertino, Calif.

In one embodiment, accessory device 120 can be used to enhance the overall functionality of electronic device 100. For example, accessory device 120 can be configured to act as a hanging apparatus. When magnetically attached to electronic device 100, accessory device 120 can be used to hang electronic device 100. In this way, electronic device 100 can be used as a display for presenting visual content such as art, movies, photos and so forth on a wall or suspended from a ceiling. As a hanging apparatus, accessory device 120 can be used to hang electronic device 100 from a wall or a ceiling. Electronic device 100 can be easily removed by simply exerting a releasing force sufficient to overcome the net magnetic attractive force $F_{NET}$. Accessory device 120 can be left in place and be used to reattach electronic device 100 (or another device) at a later time.

In one embodiment, accessory device 120 can also take the form of a holding mechanism for attaching objects that are not by themselves equipped to magnetically attach to electronic device 100. For example, accessory device 120 can be configured to carry a stylus or other such input device. The stylus can be used to provide inputs to the electronic device. In some cases, accessory device 120 can provide a signal to electronic device 100 indicating the presence of the stylus. The signal can cause electronic device 100 to enter into a stylus recognition state, for example. More particularly, when accessory device 120 is magnetically attached to electronic device 100, electronic device 100 can activate a stylus input state in order to recognize stylus type inputs. When accessory device 120 is removed, electronic device 100 can de-activate the stylus input state. In this way, the stylus can be conveniently attached/detached to electronic device 100 when needed.

Accessory device 120 can take the form of a support that can be used to enhance the functionality of electronic device 100. For example, accessory device 120 can be configured to act as a display stand on which a display of electronic device 100 can be viewed at a comfortable viewing angle such as 75°. In other words, when placed upon a horizontal surface such as a table or desk, accessory device 120 can support electronic device 100 in such a way that the visual content presented at the display can be viewed at about a viewing angle of approximately 75°.

Accessory device 120 can also take the form of a support that can be used to enhance the functionality of electronic device 100 in a keyboard state. In the keyboard state, accessory device 120 can be used to present a touch pad surface at an angle that is ergonomically friendly. In this way, input touch events can be applied (to a virtual keyboard, for example) at an angle that does not overtax a user's wrist, hands, arms, etc.

Figure 9:
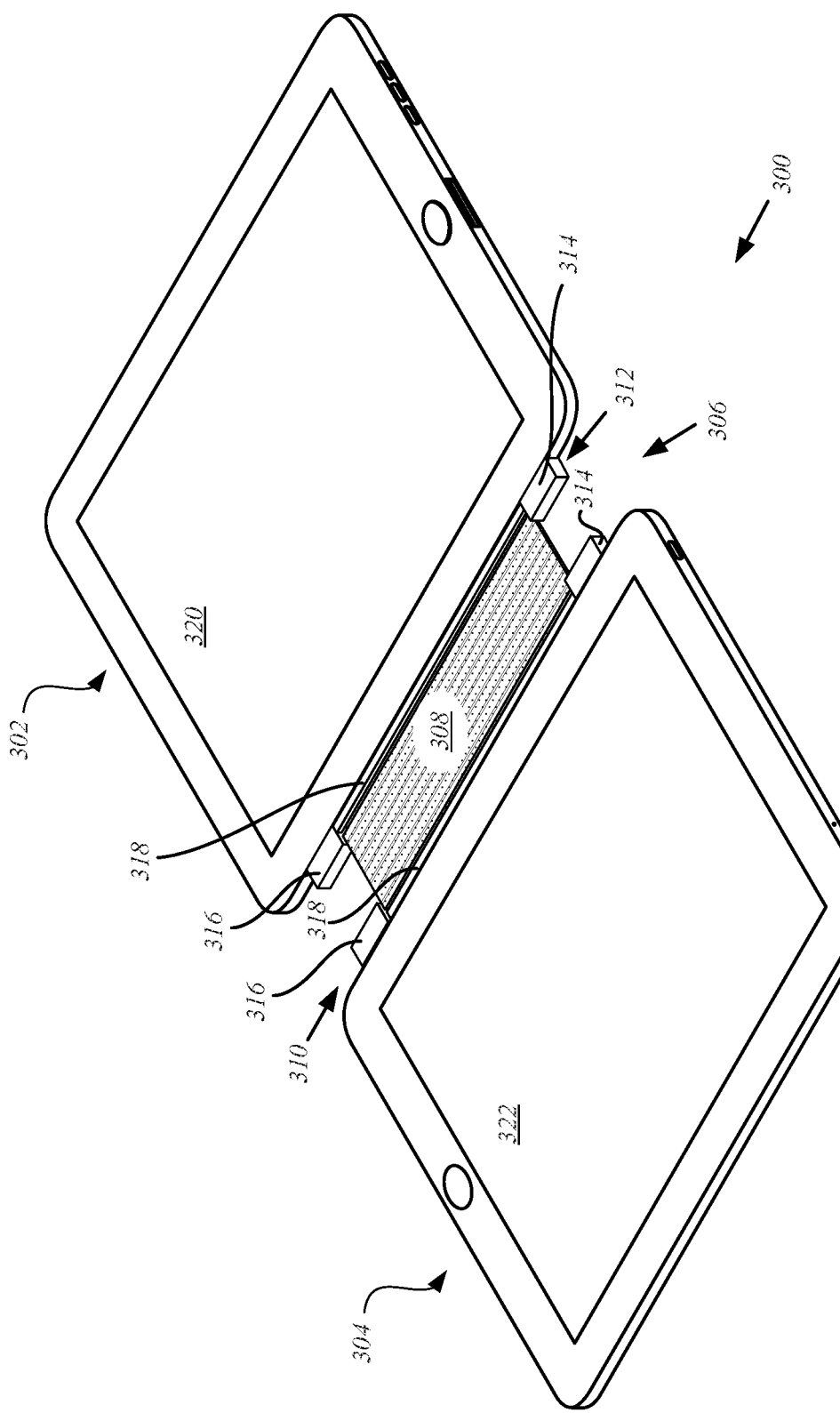
FIG. 9 illustrates an arrangement formed by magnetically attaching tablet device and tablet device by way of flexible magnetic attachment unit in an open configuration.

FIG. 9 illustrates an arrangement 300 formed by magnetically attaching tablet device 302 and tablet device 304 by way of flexible magnetic attachment unit 306 in an open configuration. Magnetic attachment unit 306 can include flexible connecting member 308 arranged to connect pivoting hinge assemblies 310 and 312 to each other, each of which are in turn magnetically connected to tablet device 304 and 302, respectively. The hinge assemblies can provide one or more pivots to allow magnetic attachment unit 306 to fold over while magnetic attachment unit 306 is magnetically attached to devices 302 and 304.

In one embodiment, hinge assembly 310 can include first hinge portion (also referred to as first end lug) 314 and a second hinge portion (or second end lug) 316 disposed opposite the first end lug. First end lug 314 can be rigidly connected to second end lug 316 by way of connecting rod (not shown) incorporated into connecting member 308 providing an additional pivoting axis. The connecting rod can be formed of metal or plastic strong enough to rigidly support tablet devices 302 and 304.

Hinge span 318 can include magnetic elements. The magnetic elements can be arranged to magnetically attach hinge span 318 to a magnetic attachment feature having a matching arrangement of magnetic elements in tablet devices 302 and 304. More specifically, the magnetic elements within hinge span 318 can activate a magnetic feature in tablet devices 302 and 304 rendering them capable of magnetically attaching to hinge span 318. Hinge span 318 can be formed of magnetically inactive material such as plastic or non-magnetic metal such as aluminum.

Arrangement 300 can be referred to as a book in that each tablet device 302 and 304 can present visual information in a book like manner. For example, as shown in FIG. 9, in the open configuration, arrangement 300 can resemble an open book in which display 320 of tablet device 302 can function like a page in an open book (as can display 322 of tablet 304). In one embodiment, a user can "flip" pages by simply swiping a touch sensitive surface of tablet device 302 (or that of tablet device 304) to flip forward using, for example, a left to right page flipping gesture. On the other hand, in order to flip a page (or pages) backwards, the user can swipe a touch sensitive surface on either tablet device 302 or 304 using, for example, a right to left page flipping gesture.

In any case, in the book mode shown in FIG. 9, tablet devices 302 and 304 must communicate with each other in order to provide a reasonable approximation of a book and a manner in which a book presents information. This communication can take the form of a wireless communication between tablet devices 302 and 304.

Figure 10:
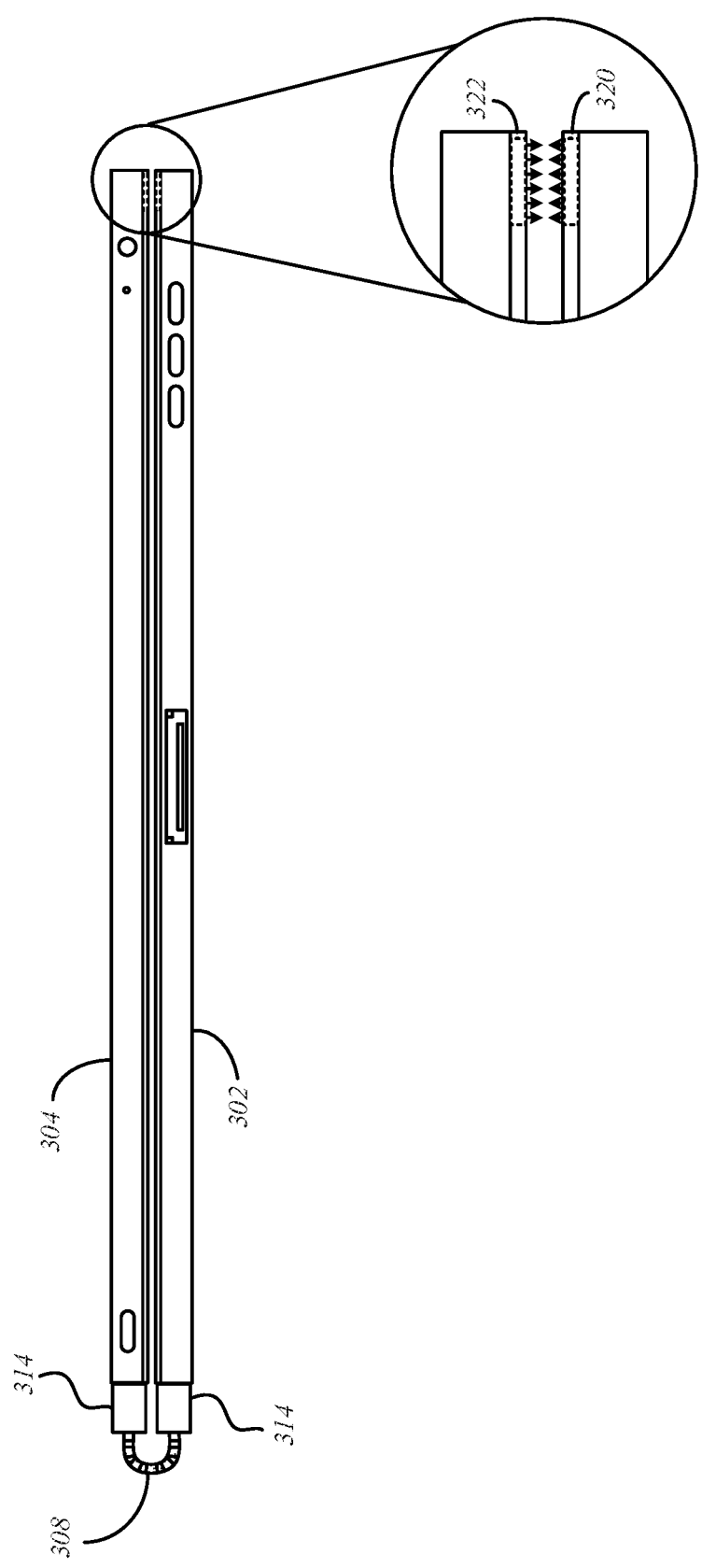
FIG. 10 shows arrangement in a closed configuration in which a tablet device uses the flexible nature of flexible connecting member to fold atop one another.

FIG. 10 shows arrangement 300 in a closed configuration in which tablet device 302 and 304 use the flexible nature of flexible connecting member 306 to fold atop one another. In one embodiment, magnetic elements beneath displays 320 and 322 can be arranged in such a way that prevents tablet devices 302 and 304 from touching each other. In one configuration, the magnetic elements can be arranged to interact in such a way as to create a net magnetic repulsion force between tablet device 302 and tablet device 304 preventing contact between them. In one embodiment, the magnetic elements can be arranged to create a net magnetic attractive force that can lock tablet device 302 and 304 together. In one embodiment, the magnetic elements can be arranged to provide little or no magnetic force in the closed configuration.

Figure 11A:
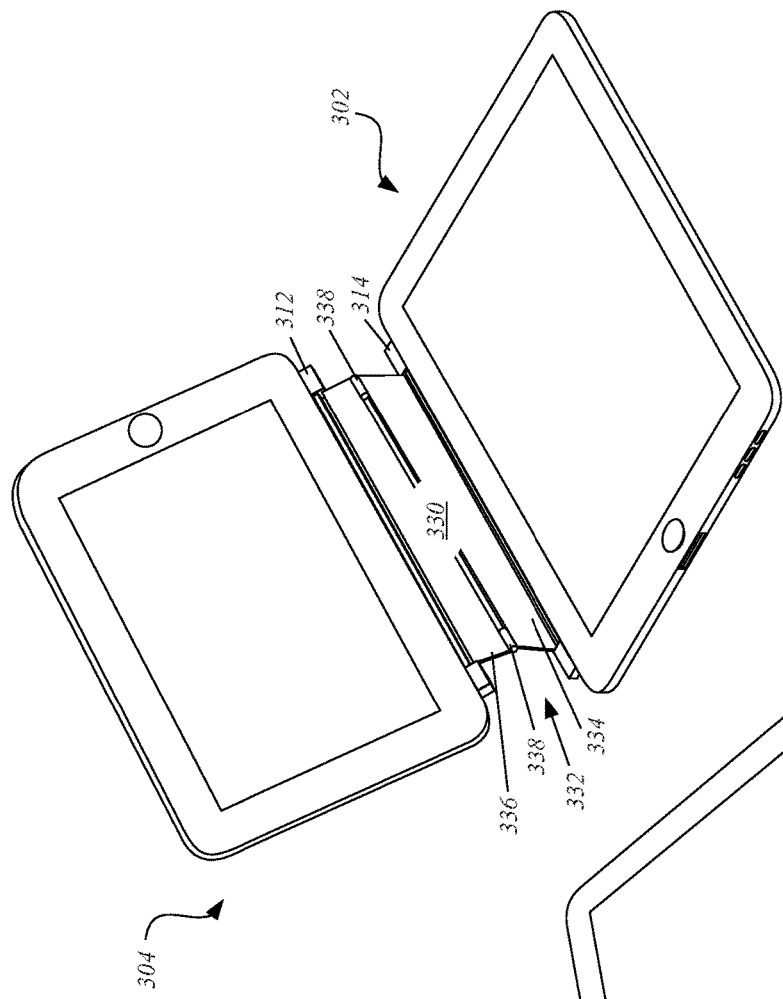
FIGS. 11A and 11B show tablet devices magnetically attached to each other by way of magnetic attachment unit.
Figure 11B:
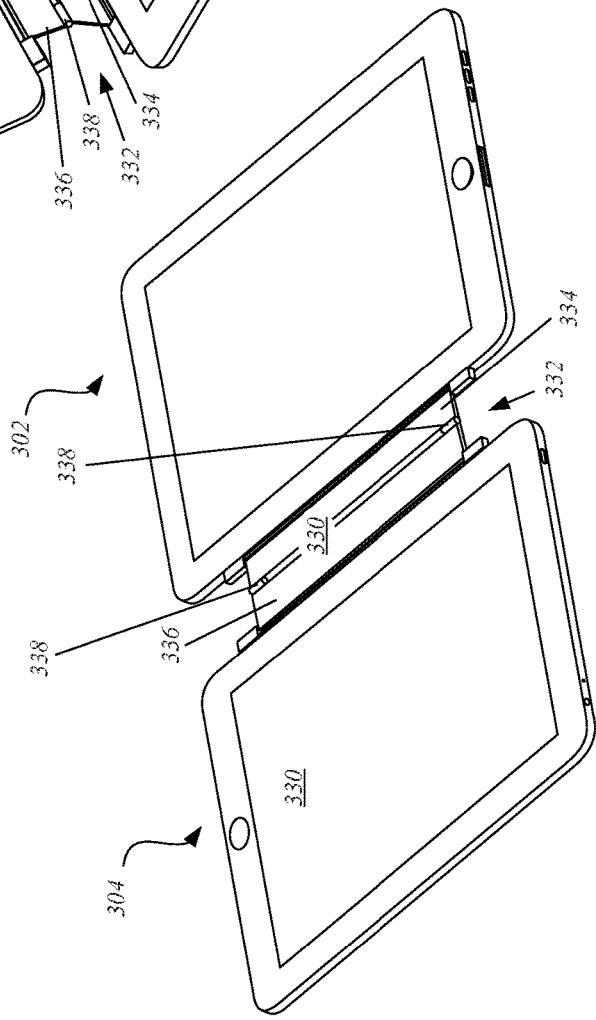

FIGS. 11A and 11B shows tablet devices 302 and 304 magnetically attached to each other by way of magnetic attachment unit 330. In one embodiment, magnetic attachment unit 330 can includes connecting member 332 formed of rigid portion 334 and 336 pivotally connected to each other by way of hinge (or clutch barrel) 338. As shown in FIG. 11A, tablet device 302 can be placed upon a flat supporting surface such as a table. Tablet device 304 can then be positioned in a vertical orientation relative to tablet device 302. In this way, tablet device 304 can act as a display for presenting visual content.

Figure 12B:
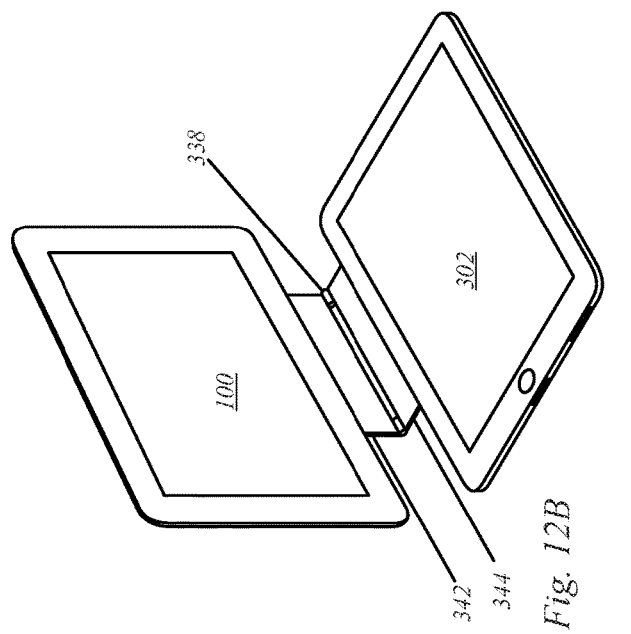
FIGS. 12A-12C show tablet device connected together by way of magnetic attachment unit.
Figure 12A:
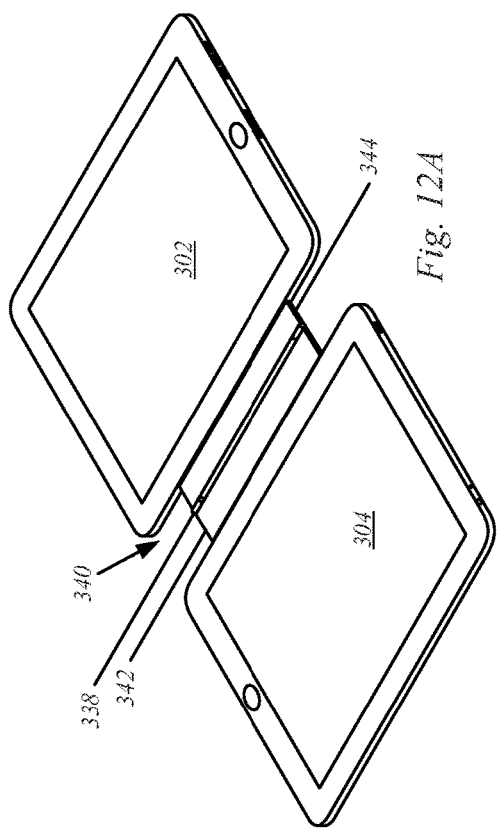
Figure 12C:
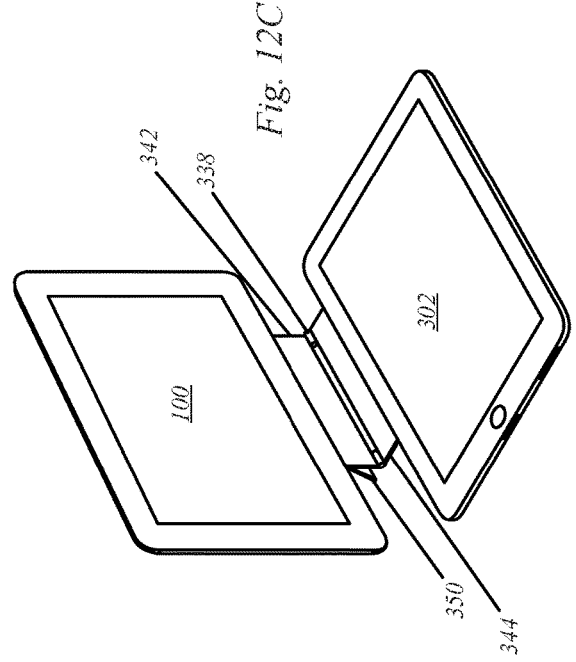

FIG. 12A shows tablet device 302 and 304 connected together by way of magnetic attachment unit 340. As shown, magnetic attachment unit 340 does not include hinge assemblies 318 and is thus fixedly attached to tablet devices 302 and 304. Magnetic attachment unit 340 can include rigid connecting members 342 pivotally connected to each other by way of clutch barrel, or hinge, 338. In this way, as shown in FIG. 12B, tablet device 302 can be placed upon a flat supporting surface such as a table and another electronic device (such as tablet 304) can be positioned to act as a display. As can be seen in FIGS. 12B and 12C, tablet device 304 can be replaced by electronic device 100 that is not necessarily a tablet device. For example, electronic device 100 can take the form of a simple display capable of being magnetically attached to magnetic attachment unit 340. In one embodiment, magnetic attachment unit 340 can actually be formed as part of electronic device 100. In this way, magnetic attachment unit 340 can include only a single magnetic attachment feature suitable for magnetically attaching to tablet device 302.

As shown in FIG. 12C, support structure 350 can be used to provide additional support for the upraised electronic device, regardless of whether the upraised electronic device takes the form of electronic device 100 or tablet device 304.

FIG. 13 shows magnetic attachment unit 220 magnetically attaching tablet devices 302 and 304 to form tablet array 360. Accordingly, tablet device 302 and 304 can communicate with each other by way of a wireless connection. In one embodiment, the wireless connection can take the form of a WiFi wireless communication where tablet devices 302 and 304 communicate with each other directly. In one embodiment, tablet devices 302 and 304 can communicate with each other in part by way of an external circuit, such as a wireless router, server computer, and so on. In one embodiment, magnetic attachment unit 220 can provide communication resources to assist in the communication between tablet devices 302 and 304. In one embodiment, magnetic attachment unit 220 can include processing as well as data storage resources that can be used to alter the operating state of either or both tablet devices 302 and 304. For example, when magnetic attachment unit 220 includes a data storage device (such as a FLASH memory), data in the storage device can be transferred to either or both tablet device 302 and 304. The transferred data can take the form of instructions that can be executed to alter the operating state of the respective tablet device.

Figure 14A:
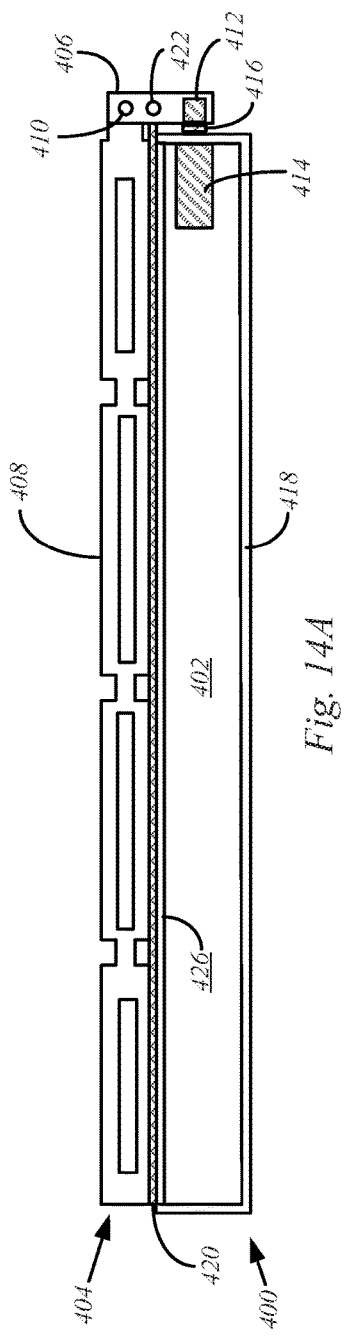
FIGS. 14A-14B show a cross section of system in accordance with an embodiment.

FIG. 14A shows a cross section of system 400 in accordance with an embodiment. System 400 can include tablet device 402 magnetically attached to cover assembly 404 by way of magnetic hinge assembly 406. Cover assembly 404 can include segmented cover 408 pivotally attached to hinge assembly 404 at pivot 410. Hinge assembly 406 can be magnetically attached to tablet device 402 by way of magnetic element 412 in hinge assembly 404 and magnetic attachment feature 414 in tablet device 402. Intervening layer 416 can act to prevent direct metal to metal contact between hinge assembly 406 and housing 418 of tablet device 402.

Figure 14B:
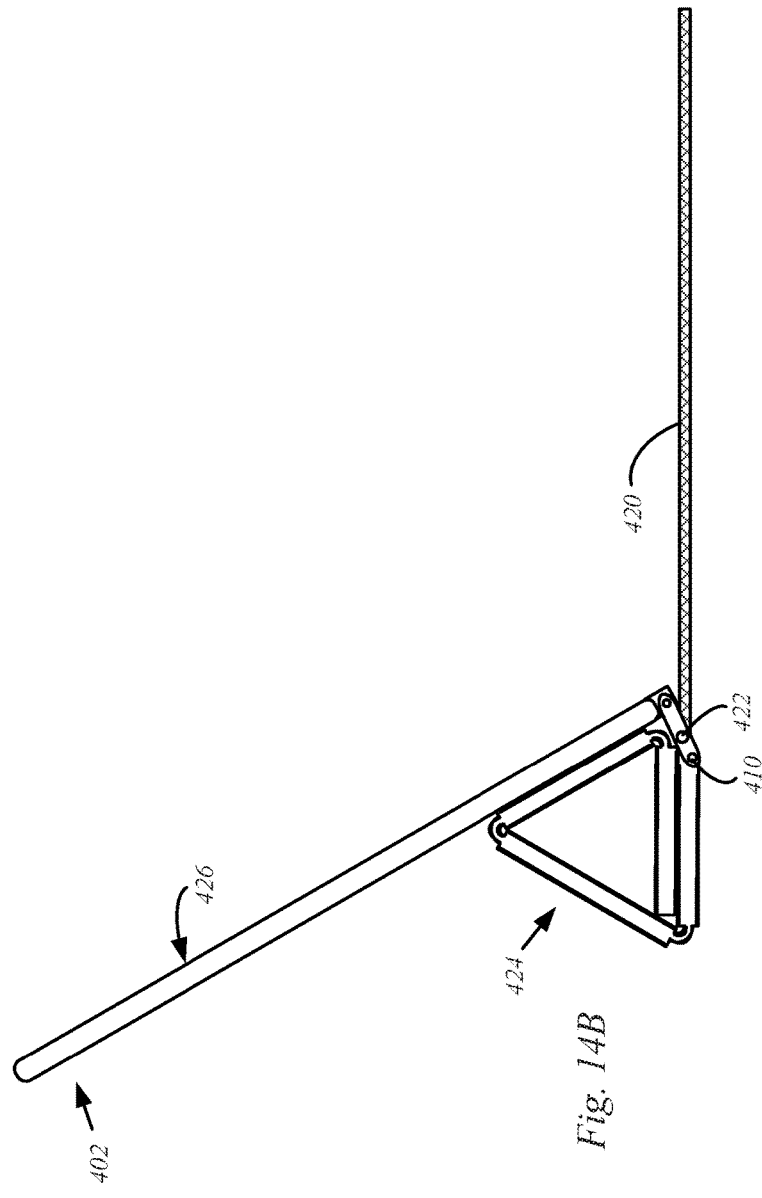

Cover assembly 404 can also include separate flap portion 420 pivotally attached to hinge assembly 406 at pivot 422. In this way, segmented cover 408 and flap portion 420 can be rotated about their respective pivots separately as shown in FIG. 14B where segmented cover 408 has been folded into support structure 424. Support structure 424 can be triangular in shape and be used to position tablet device 402 such that display 426 is presented at about an angle of 75°.

Figure 15:
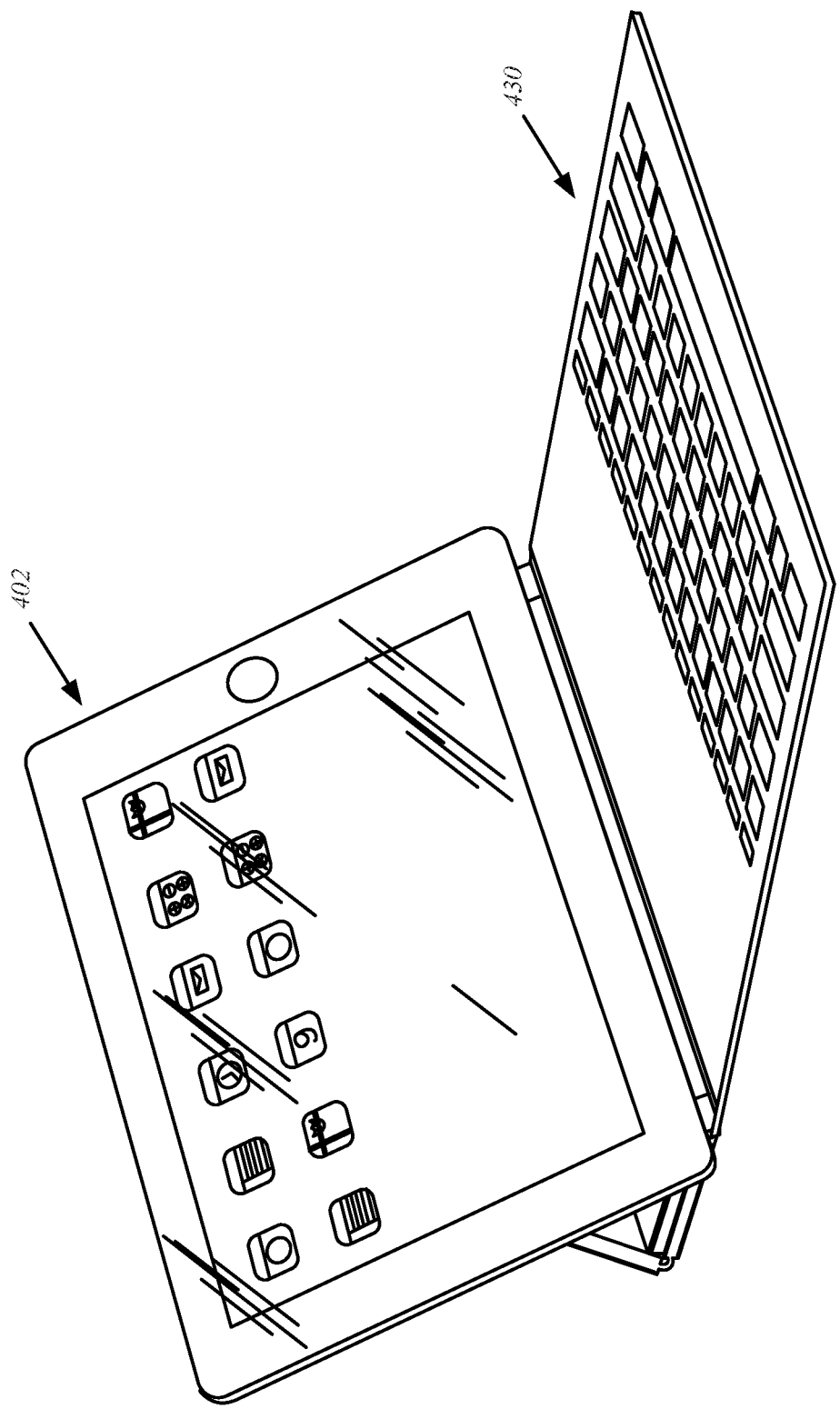
FIGS. 15-17 show various embodiments of flap portion of cover assembly.
Figure 16:
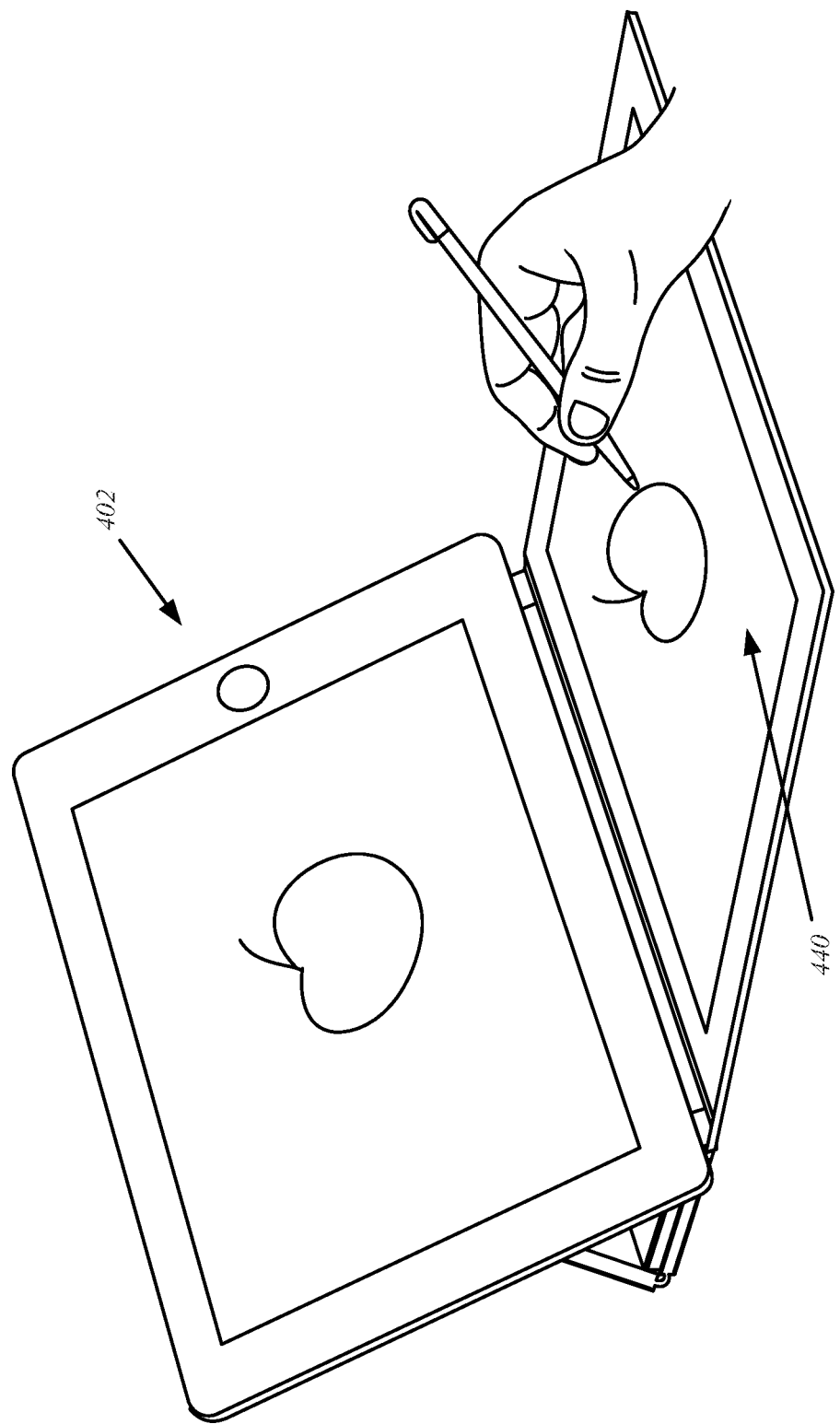

Flap portion 420 can be formed of flexible material such as fabric. In one embodiment, flap portion 420 can include various input devices. For example, as shown in FIG. 15, flap portion 420 can include keyboard 430. Keyboard 430 can be in communication with tablet device 402 using, for example, a wired connection. In one embodiment, keyboard 430 can be in wireless communication with tablet device 402. Accordingly, a user can pass information to tablet device 402 by pressing various input keys of fabric keyboard 430.

Figure 17:
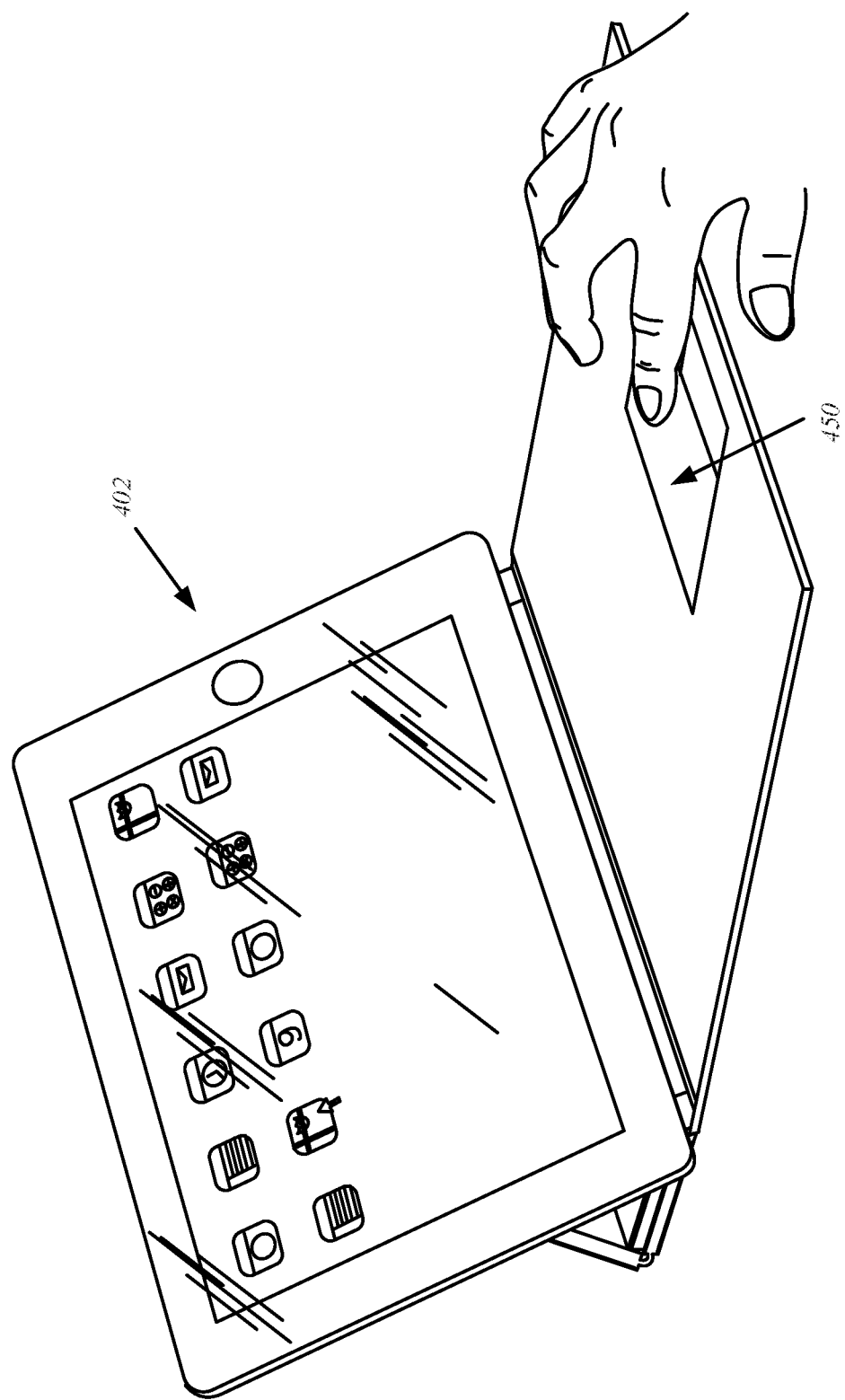
Figure 18B:
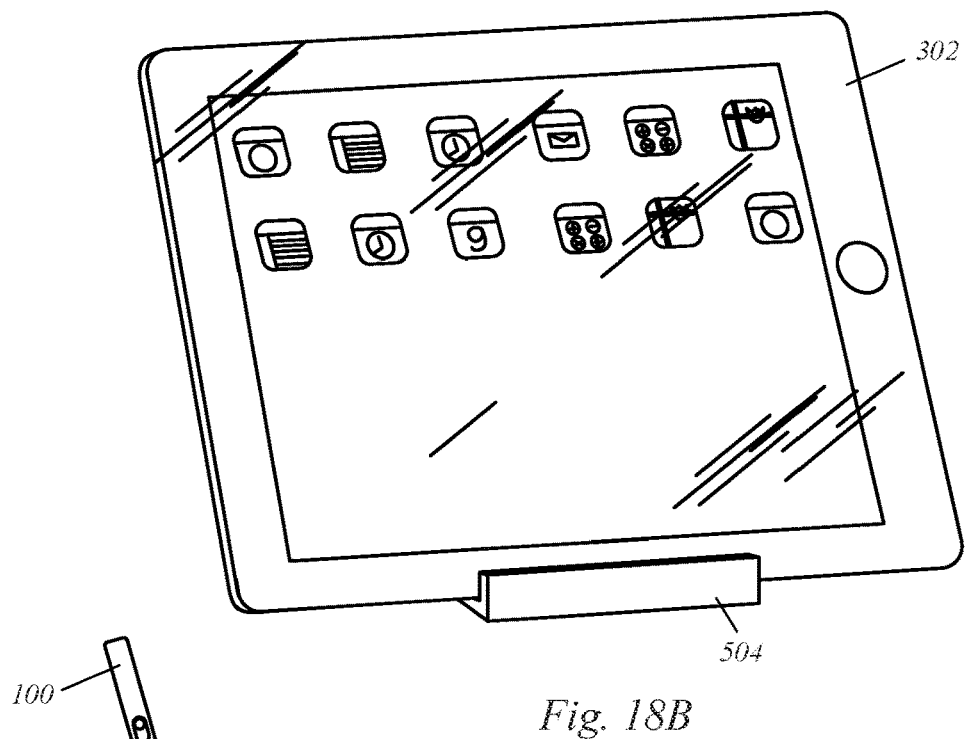
FIGS. 18A-18D show fixed magnetic docking station in accordance with the described embodiments.
Figure 18A:
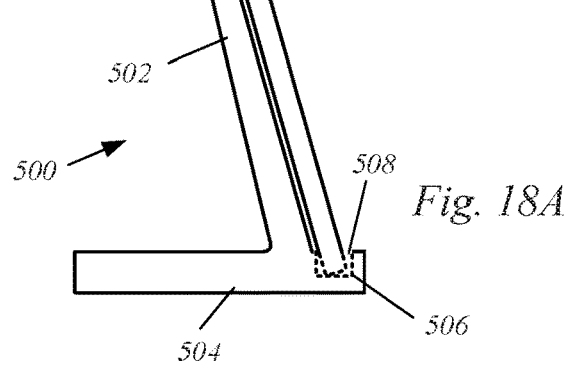
Figure 18D:
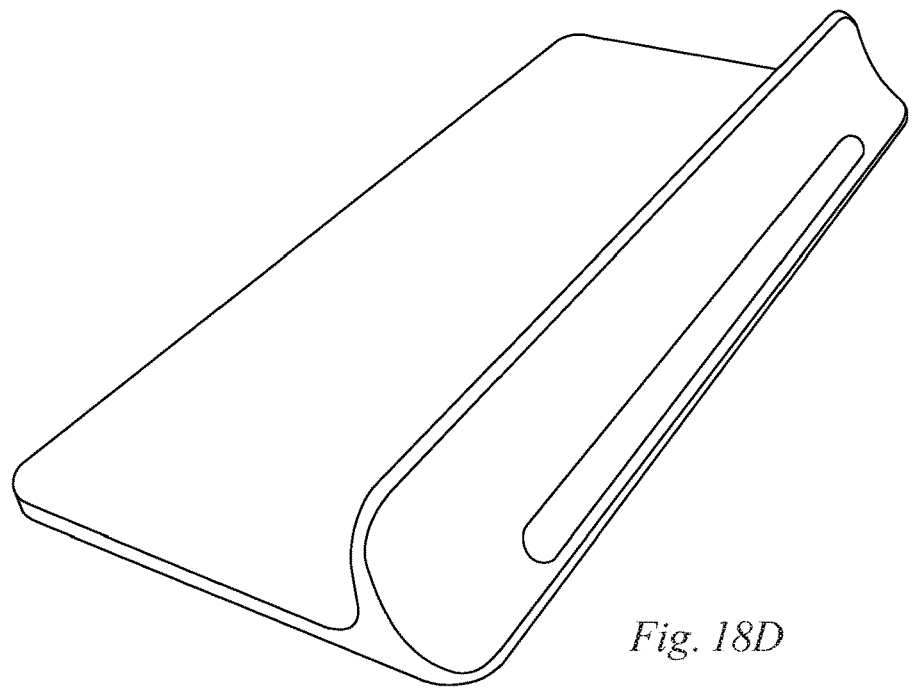
Figure 18C:
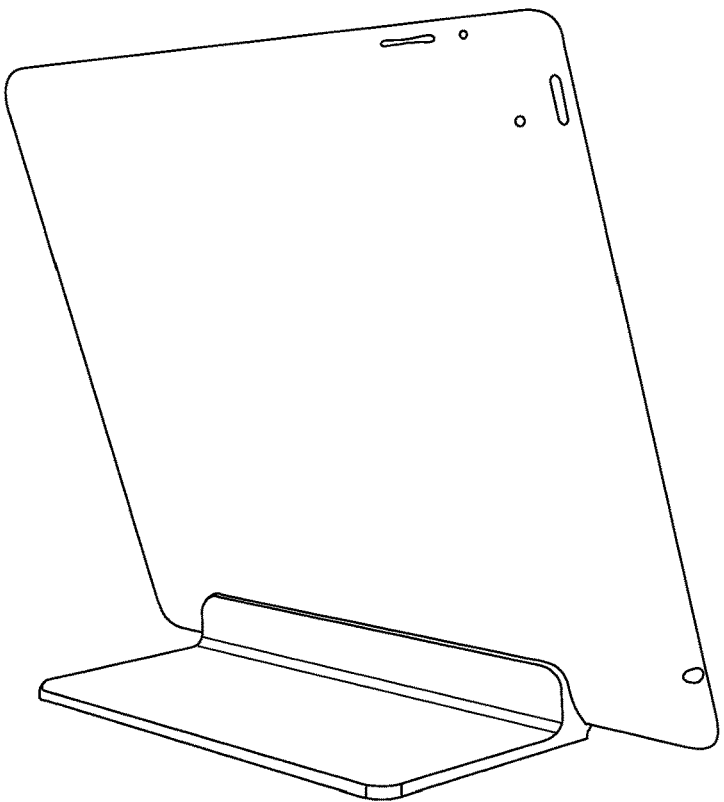

It should be noted that flap portion 420 can be configured to include any suitable type of input device. For example, in one embodiment shown in FIG. 16, flap portion 420 can take the form of input pad 440. Input pad 440 can be sensitive to touch events such as those provided by a stylus, pen, pencil, or even a human appendage such as a finger. Still further as shown in FIG. 17, flap portion 420 can include touch pad 450 that can be used to provide information to tablet device 402 by a user touching touch pad 450 in a prescribed manner.

FIGS. 18A-18D show magnetic docking station 500 in accordance with the described embodiments. Magnetic docking station 500 can include support 502 and base portion 504. Base portion 504 can include magnetic elements 506 arranged to activate magnetic attachment feature in electronic device 100. Therefore, placing of electronic device 100 into slot 508 of base portion 504 can result in magnetic elements 506 activating the magnetic attachment feature in electronic device 100. The activation can cause a net attractive magnetic force between magnetic elements 506 and electronic device 100 strong enough to secure electronic device 100 to docking station 500. In one embodiment shown in FIG. 17B, electronic device 100 can take the form of tablet device 302. In one embodiment, docking station 500 can provide electrical power to electronic device 100. In one embodiment, docking station 500 and electronic device 100 can communicate with each other wirelessly by way of a suitable wireless communication protocol such as WiFi, BlueTooth, and so forth. In one embodiment, docking station 500 can include docking port(s) that provide a wired communication channel between electronic device 100 and another electronic device connected to docking station 500 or in some cases an input device such as a keyboard, keypad, touch pad, etc. In the embodiment shown in FIGS. 18A-18D, docking station 500 is fixed in that electronic device 100 is presented at a substantially fixed angle and orientation with respect to a supporting surface, such as a table or desk on which an input device such as a keyboard can be located.

Figure 19A:
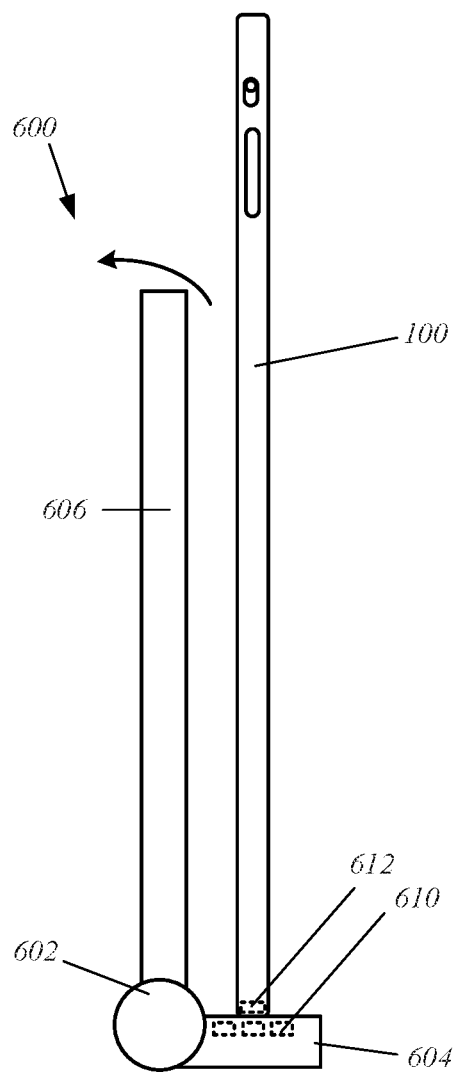
FIGS. 19A-19B show pivoting magnetic docking station in accordance with the described embodiments.
Figure 19B:
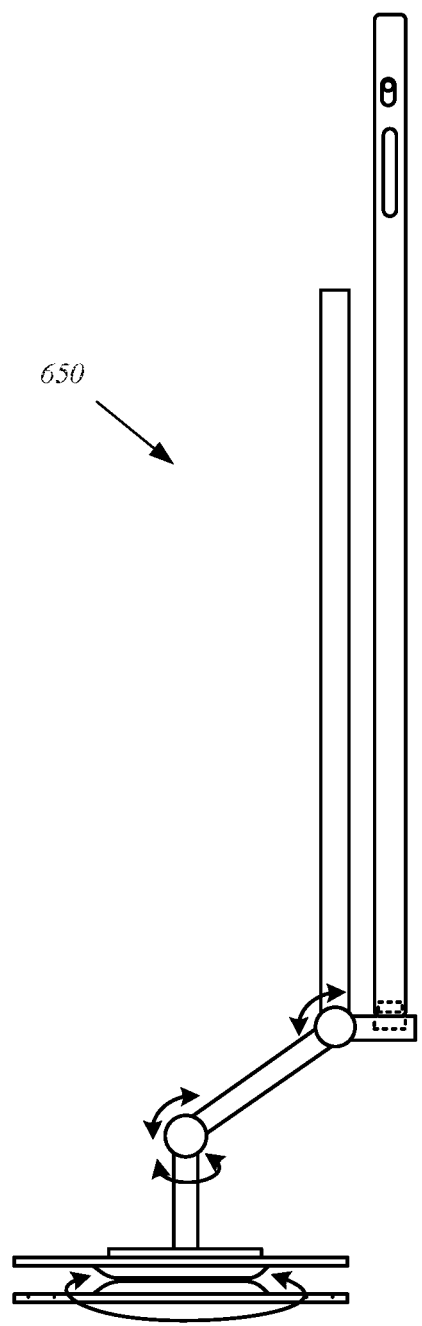

However, as shown in FIG. 19A, docking station 600 can be pivot about pivot point 602. In this way, electronic device 100 can be presented in any number of angles with respect to the supporting surface. Pivoting docking station 600 can include base portion 604 pivotally connected by way of pivot 602 to support 606. In one embodiment, magnetic elements 610 can activate magnetic attachment feature 612 in electronic device 100 to magnetically couple electronic device 100 to pivoting docking station 600. In one embodiment, magnetic elements 610 can be included in base portion 604. FIG. 19B shows an embodiment where electronic device 100 takes the form of tablet device 302. FIG. 19C shows articulating docking station 650 in accordance with an embodiment of the invention.

Figure 20A:
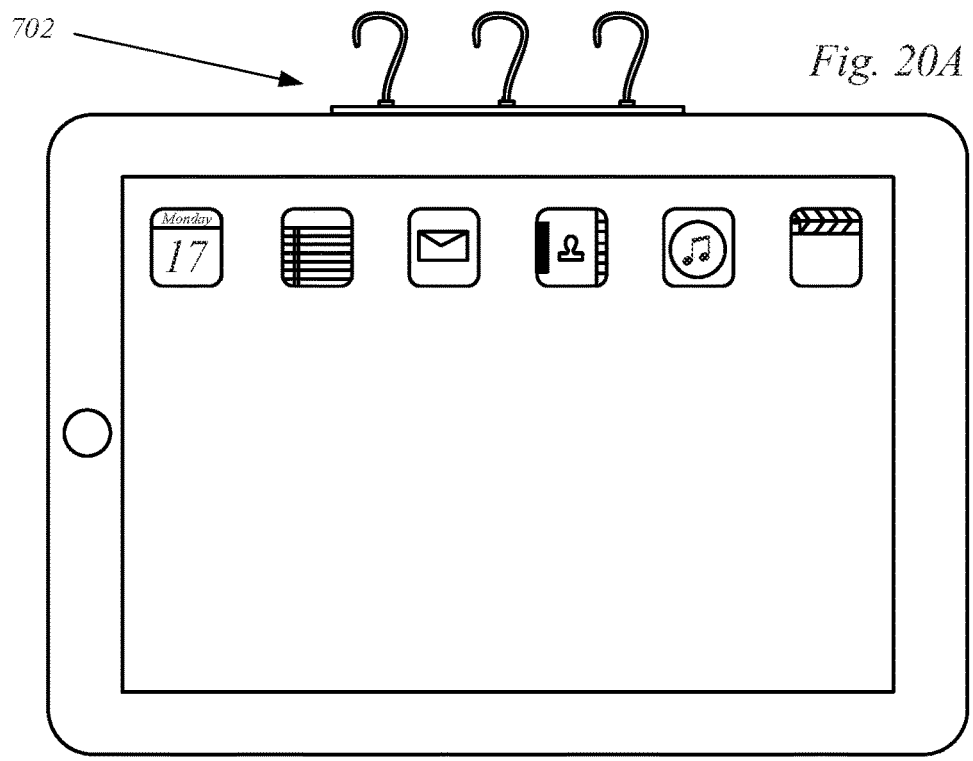
FIGS. 20A-20F show various hanging accessories in accordance with the described embodiments.
Figure 20B:
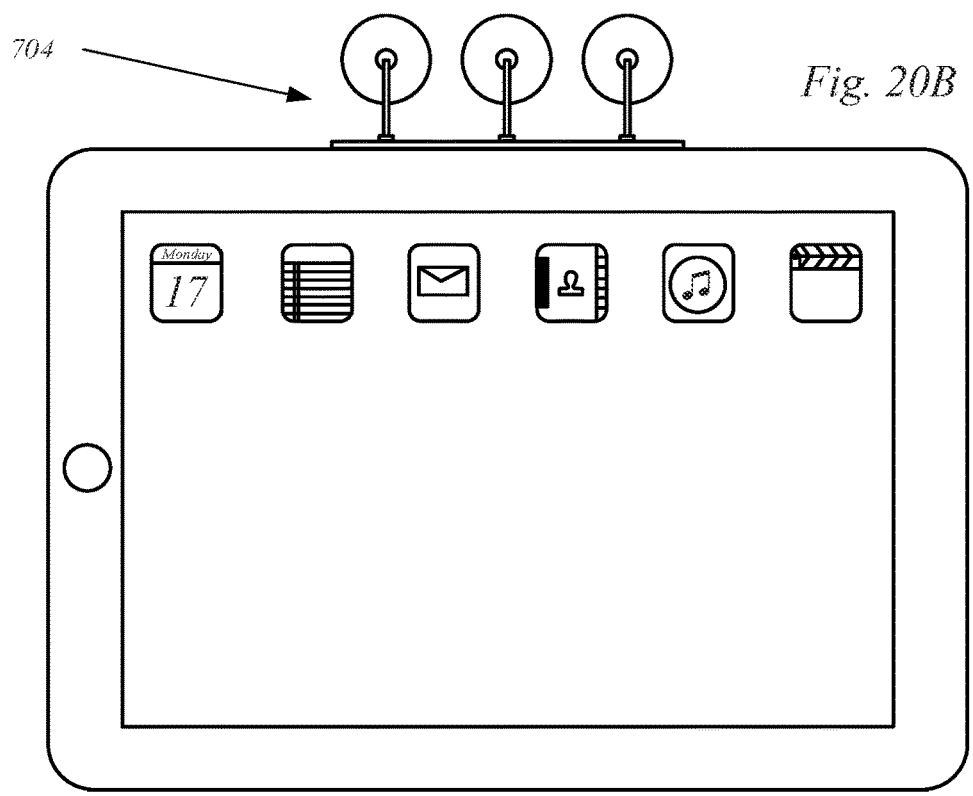

FIGS. 20A-20D show various hanging accessories 700 that can be magnetically attached to tablet device 302 in accordance with the described embodiments. It should be noted that as shown, the hanging accessories each are formed to include magnetic elements arranged to activate the magnetic attachment feature included in tablet device 302. This integrated arrangement can reduce the number of components required. In one embodiment, however, the hanging accessories can be magnetically attached to tablet device 302 using the magnetic attachment unit described above. In any case, the various hanging accessories can be used to hang or otherwise suspend tablet device 302 from any suitable surface. For example, FIGS. 20A and 20B show variations of hanging accessory 700 well suited for suspending tablet device 302 from a vertical wall. For example, hook accessory 702 and suction cup accessory 704 can be used to hang tablet device 302 from a vertical wall such as in an office cubicle in the case of hook accessory 702 and a refrigerator door, chalkboard, or whiteboard in the case of suction cup accessory 704 shown in FIG. 20B.

Figure 20C:
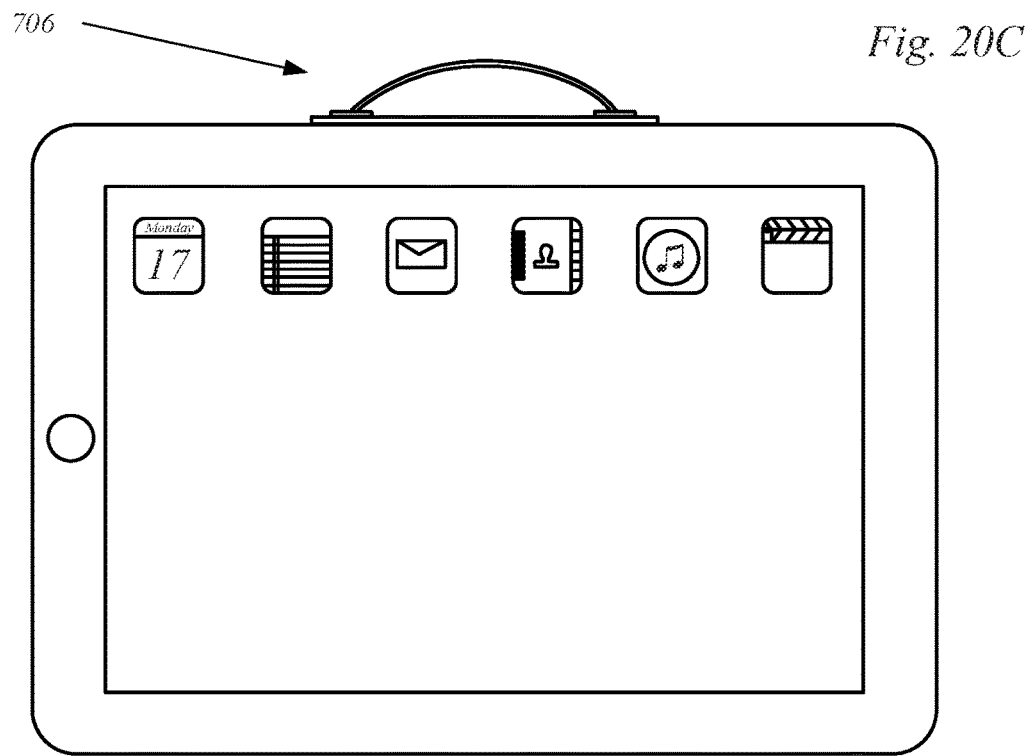
Figure 20D:
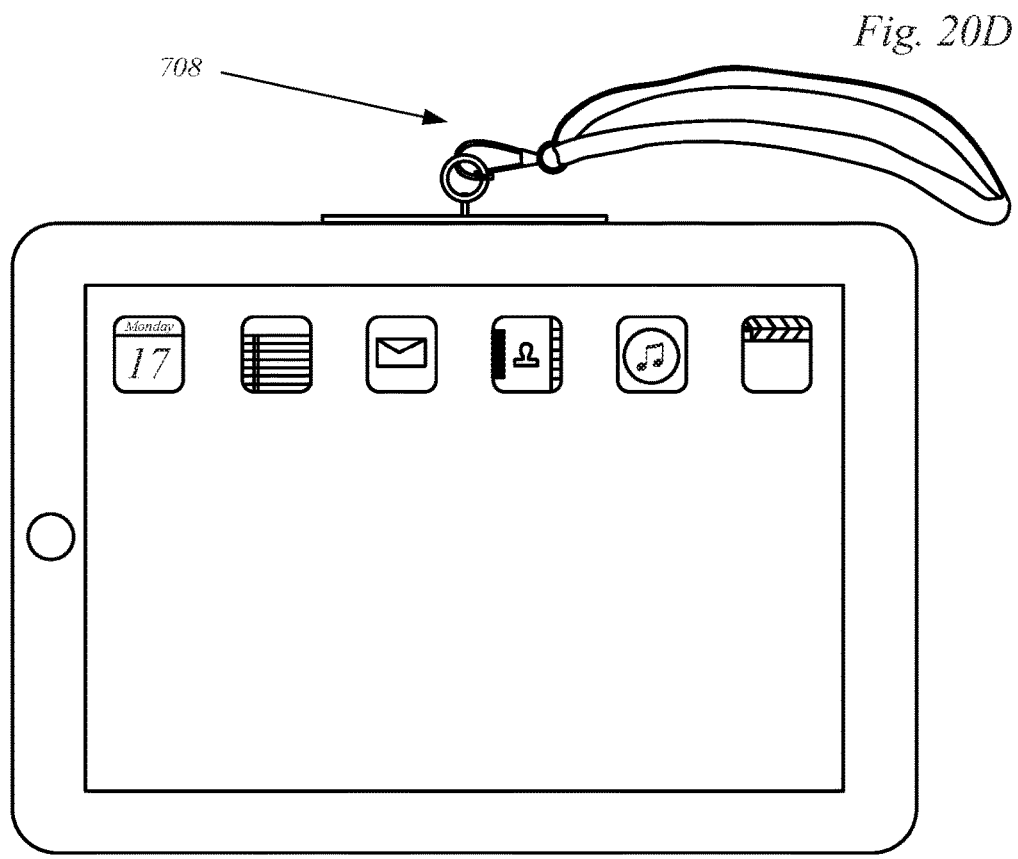

FIGS. 20C and 20D show embodiments of hanging accessory 700 that can allow a user to carry tablet device 302 about. For example, fixed handle accessory 706 can facilitate a user holding tablet device 302 firmly in one hand whereas strap accessory 708 can allow the user to carry tablet device 302 about in a more free flowing manner.

Figure 20E:
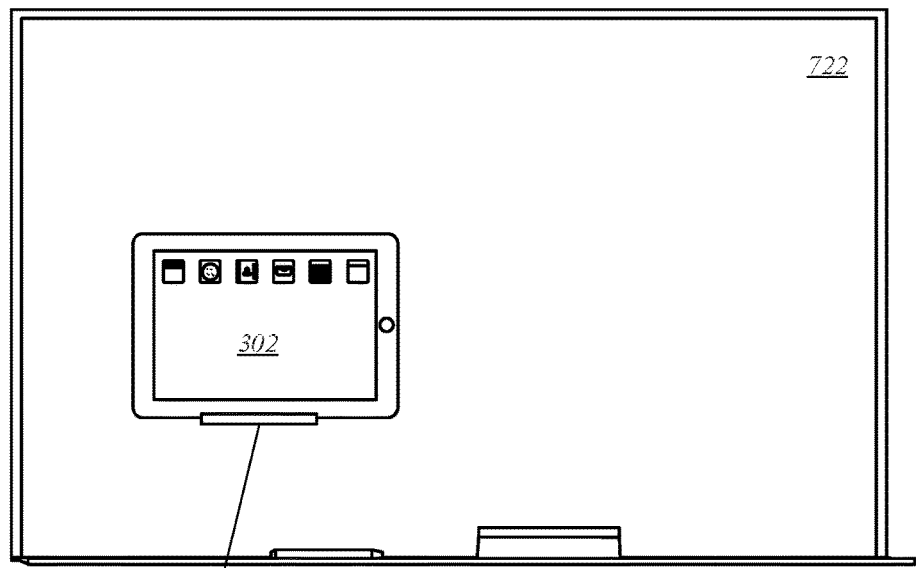
Figure 20F:
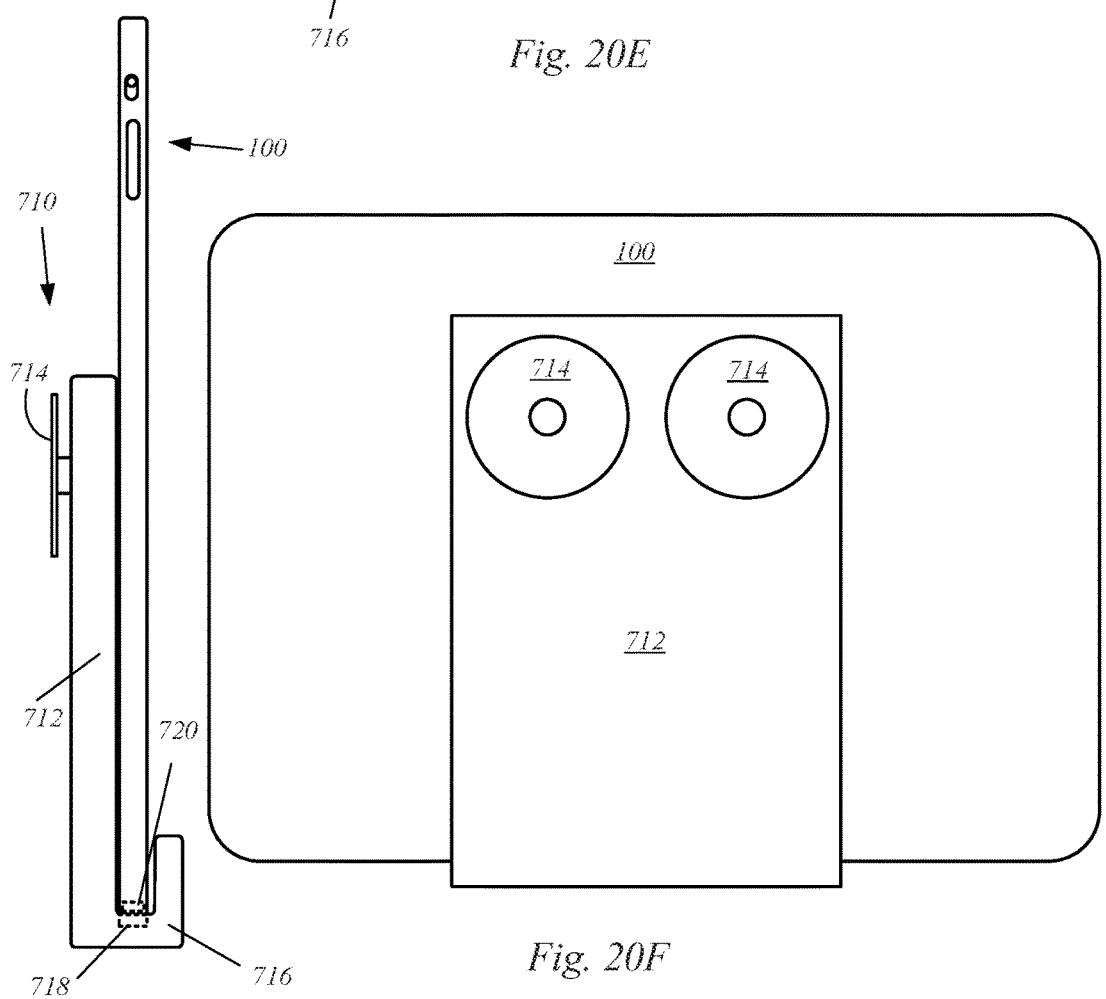

FIGS. 20E and 20F show an embodiment of hanging accessory 700 that can be used to hang electronic device 100 from a vertical surface unsuitable for hooks or other grasping accessories. Such surfaces include whiteboards, black boards, smooth metal surfaces, wood surfaces, and so forth. Accordingly, hanging accessory 710 can include support 712 to which is attached suction cups 714 (or equivalent) that can be used to removably adhere hanging accessory 710 to the above said surfaces. Hanging accessory 710 also includes base portion 716 that includes magnetic elements 718 used to activate the magnetic attachment feature 720 in electronic device 100. FIG. 20E shows an embodiment whereby electronic device 100 takes the form of tablet device 302 attached to whiteboard 722.

Figure 21A:
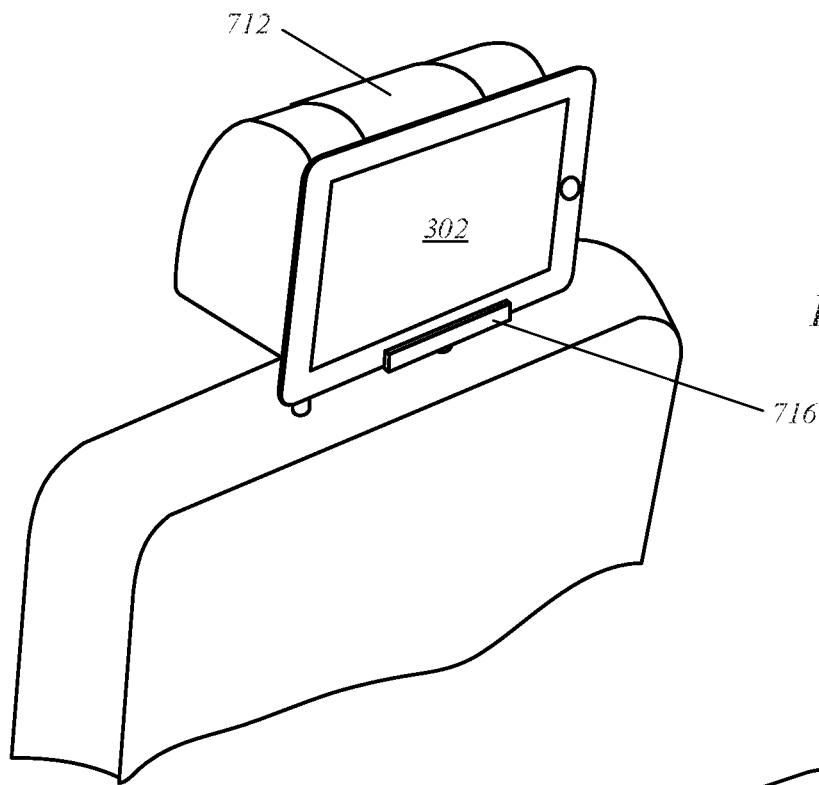
FIGS. 21A and 21B show additional hanging accessories in accordance with the described embodiments.
Figure 21B:
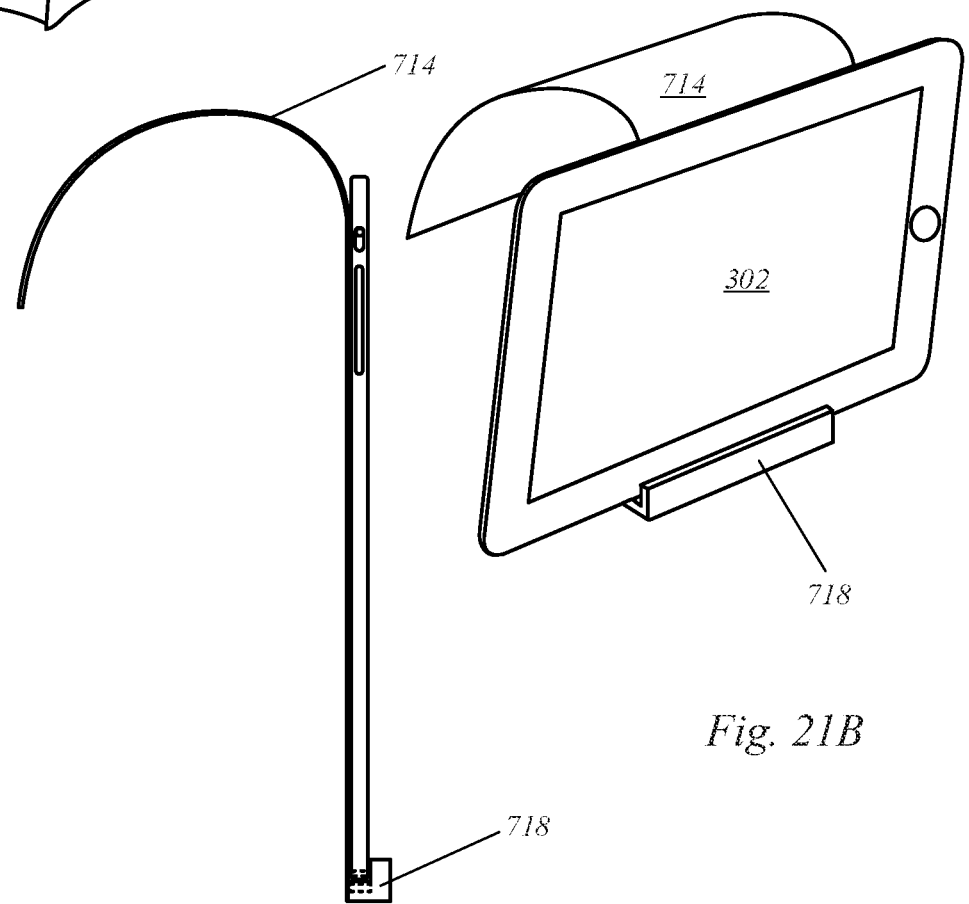

FIGS. 21A-21B show additional embodiments of hanging accessory 700 that can extend the usefulness and the range of applications for which tablet device 302 can be used. For example, FIG. 21A shows tablet device 302 mounted to a headrest of an automobile, for example, using clasp 712 that conforms to the shape of the headrest. In some embodiment, clasp 712 can be somewhat flexible in order to accommodate a variety of shapes and sizes of headrests. In another example, FIG. 21B shows clasp 714 that can be used to hang tablet device 302 from an airplane seat, for example, It should be noted that in both cases, tablet device 302 and be magnetically attached to both clasp 712 and 714 by way of magnetic elements embedded in base portions 716 and 718, respectively. In one embodiment, base portions 716 and 718 can be pivotally connected to clasps 712 and 714 in order to provide the viewer with an adjustable viewing angle.

Figure 22A:
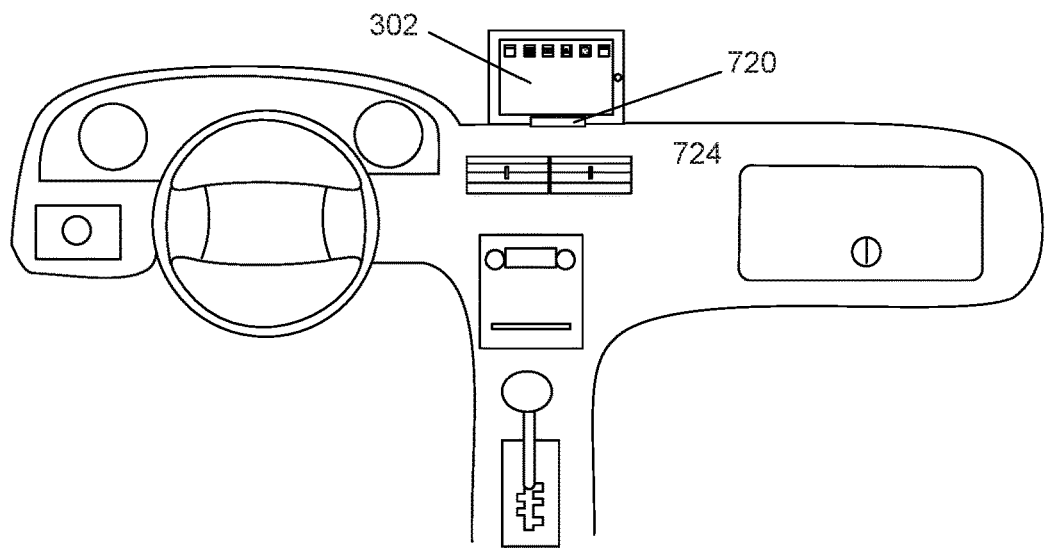
FIG. 22A shows a vehicle mount in accordance with the described embodiments.
Figure 22B:
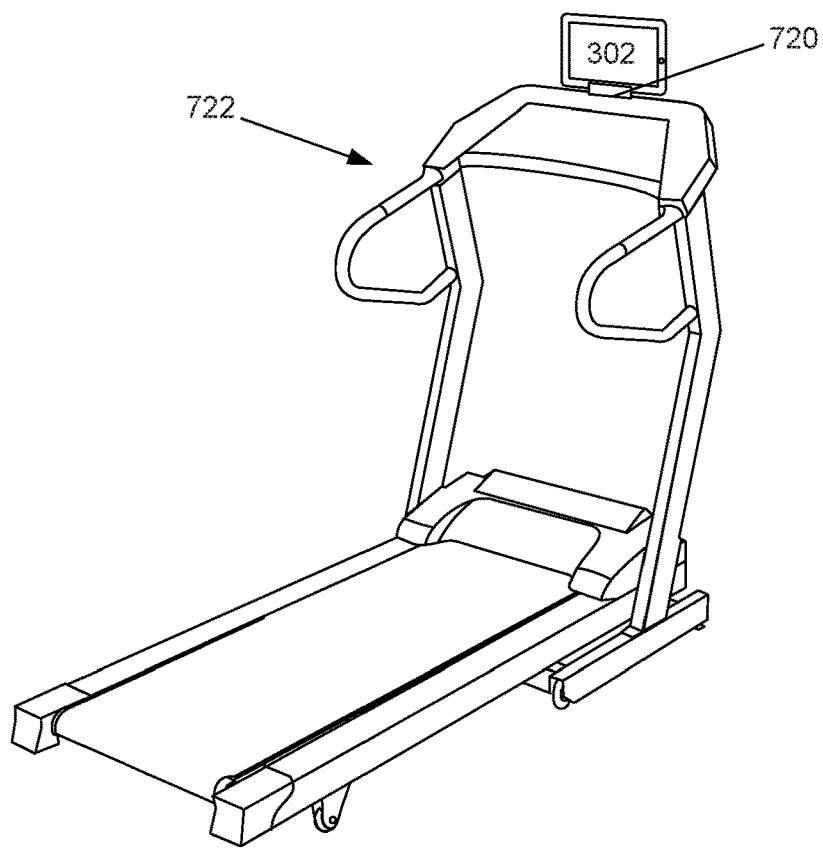
FIG. 22B shows a tread mill mount in accordance with the described embodiments.

In addition to hanging, or otherwise mounting, as shown in FIG. 22A, tablet device 302, mounting accessory 720 can be used to mount tablet device directly to an automobile dashboard, for example. In one embodiment, mounting accessory 720 can be secured to the dashboard 724 and can include magnetic elements that can be used to activate the magnetic attachment feature included in tablet device 302. In addition to mechanically securing tablet device 302 to the dashboard, mounting accessory 720 can be used to port power to tablet device 302, provide a connection to other electronic devices within the vehicle, and so on. For example, when tablet device 302 can wirelessly transmit audio and in some cases video data to an appropriate receiver circuit. In this way, media data can be ported from tablet device 302. In one embodiment, tablet device 302 can be used in conjunction with other electronic services available to the vehicle. For example, GPS based navigation can be displayed on tablet device 302, traffic warnings can be posted, vehicle information (gas level, charge level, etc.) can be posted and so on. In one embodiment, user input can be provided to tablet device 302. The user input can be used to alter an operating characteristic of the vehicle, media, and so forth. FIG. 22B shows mounting accessory 720 can be used to mount tablet device 302 to exercise equipment such as tread mill 722.

Figure 23B:
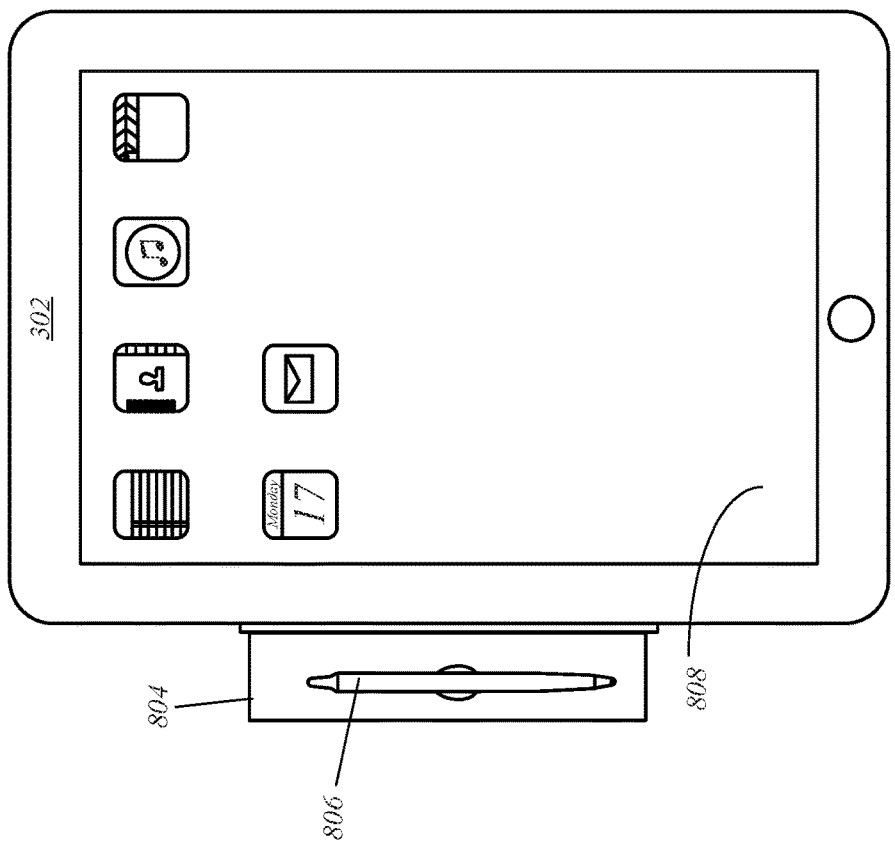
FIGS. 23A-23H show various accessories in accordance with the described embodiments.
Figure 23A:
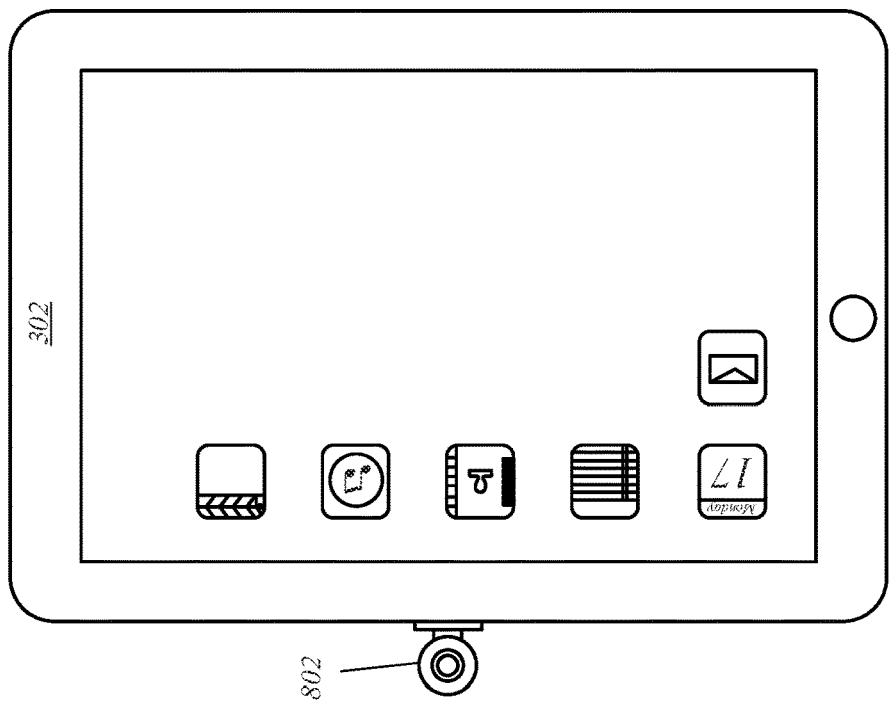

FIGS. 23A-23H show embodiments of tablet device 302 magnetically attached to various peripheral devices 800. For example, FIG. 23A shows camera 802 magnetically attached to tablet device 302. Camera 802 can operate in conjunction with or separately from image capture resources included in tablet device 302. FIG. 23B shows stylus holder 804 with stylus 806. In one embodiment, the operation of tablet device 302 can change to a stylus recognition mode when stylus holder 804 (or the presence of stylus 806). In the stylus recognition mode, the operation of tablet device 302 can be such that movements of stylus 806 upon display 808 can be recognized and acted upon by tablet device 302.

Figure 23D:
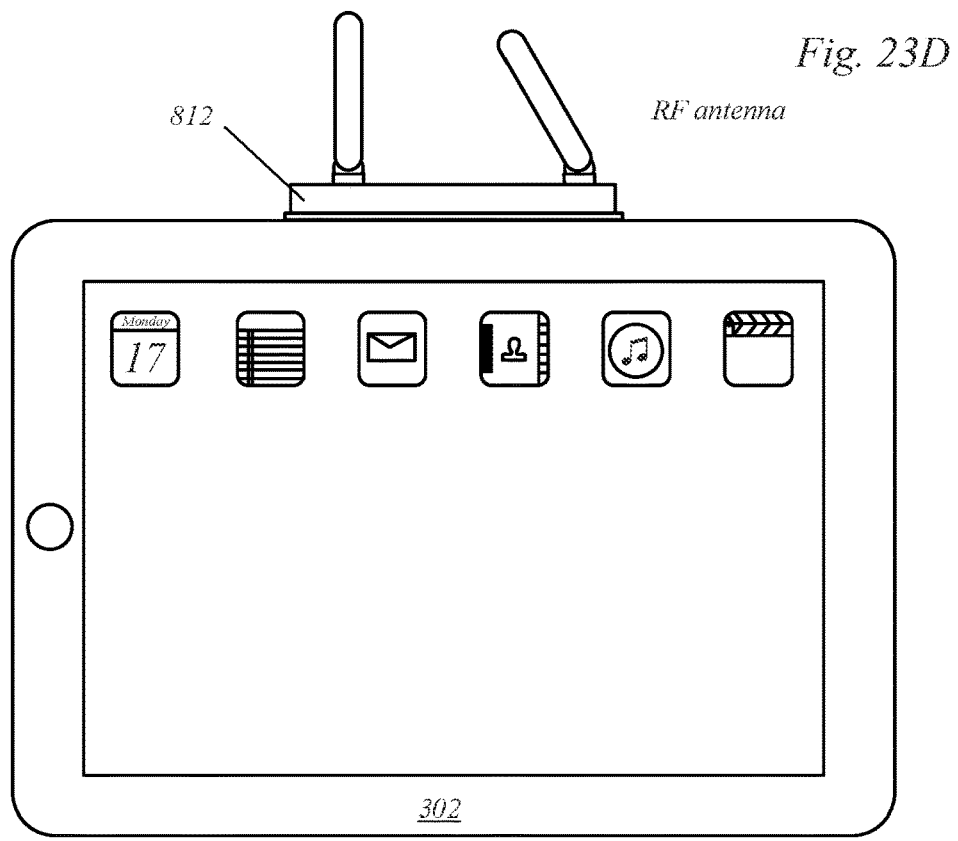
Figure 23C:
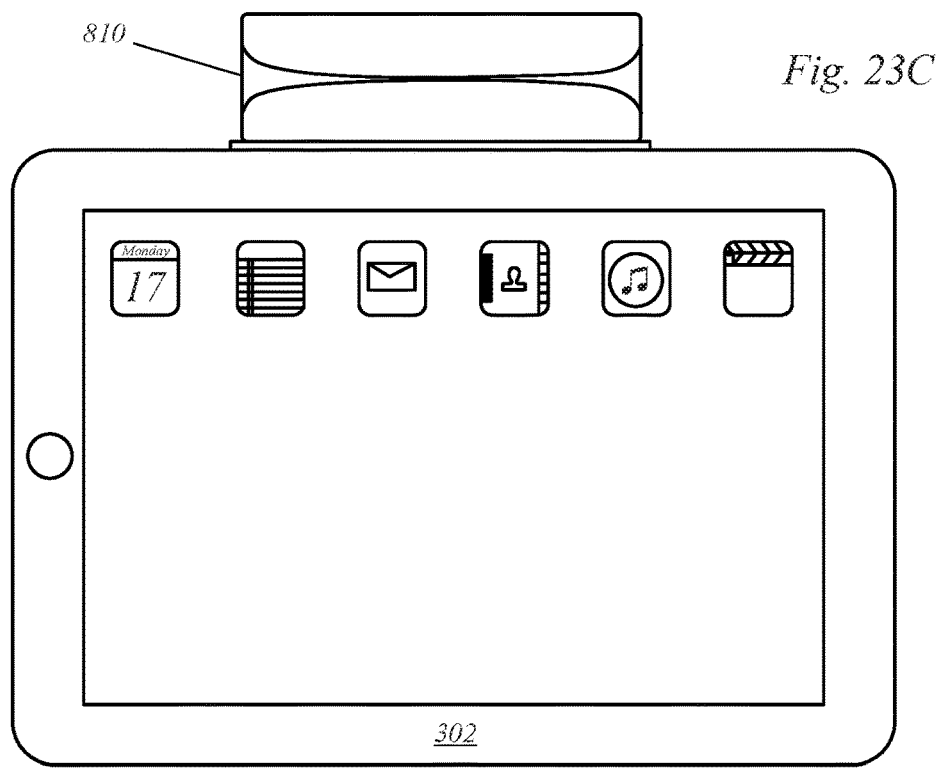

FIG. 23C shows card swipe 810 magnetically attached to tablet device 302. In this arrangement, a user can swipe a magnetically coded card, for example, and the information being readily made available for processing by tablet device

302. FIG. 23D shows RF antenna assembly 812 that can be used to supplement RF reception and transmission of tablet device 302.

Figure 23F:
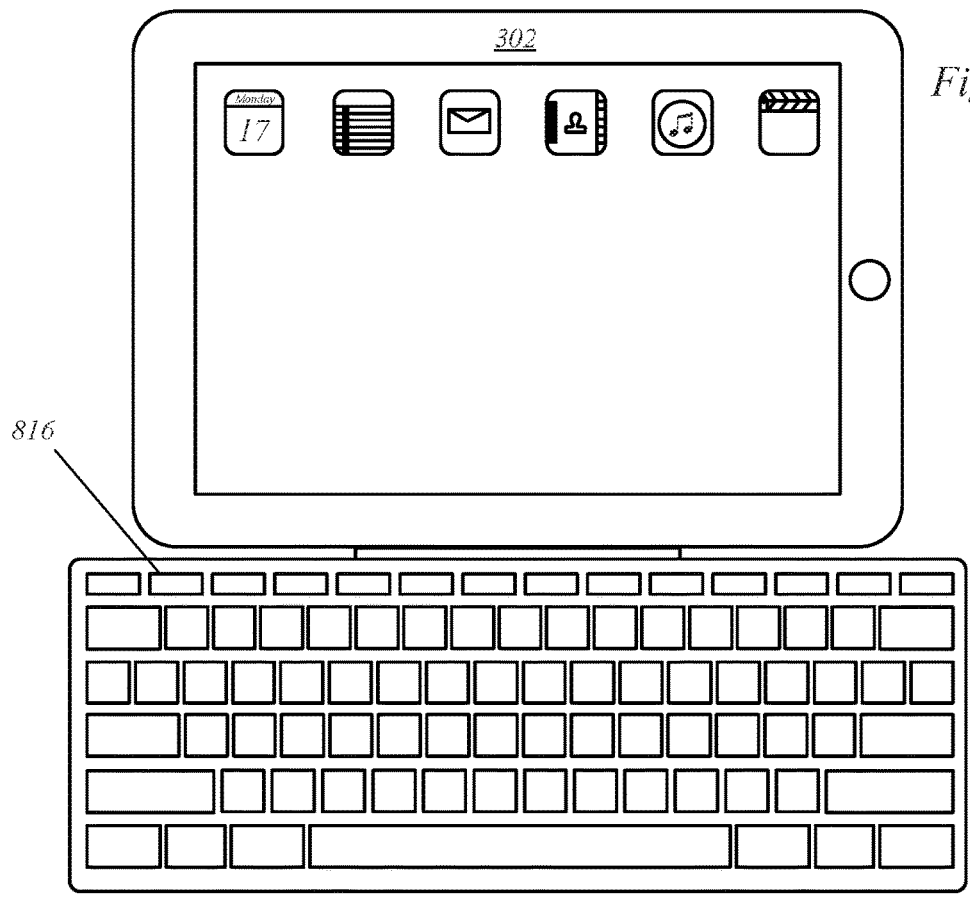
Figure 23E:
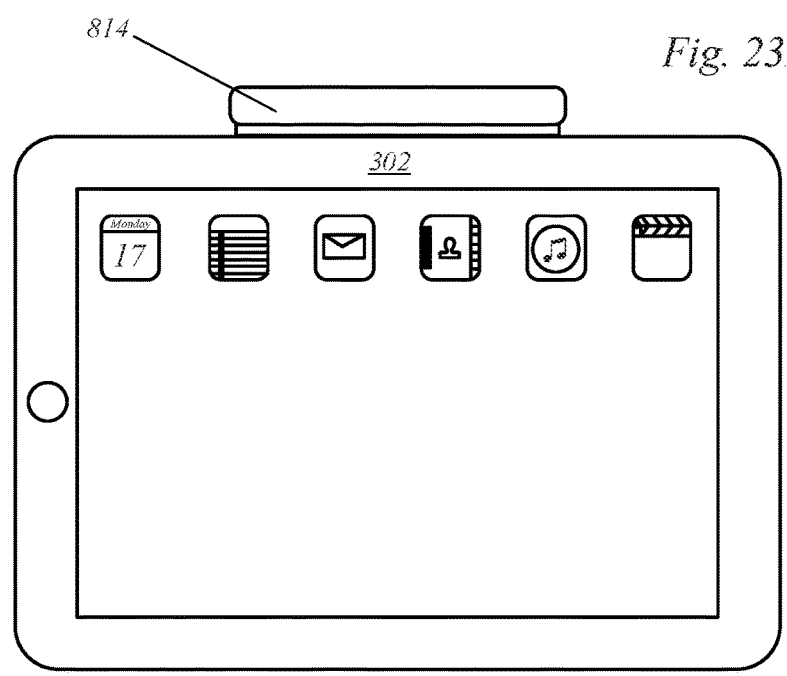

FIG. 23E shows memory module 814 magnetically attached to tablet device 302 arranged to provide additional memory resources to tablet device 302. FIG. 23F shows keyboard 816 magnetically attached to tablet device 302. Keyboard 816 can communicate with tablet device 302 wirelessly or by a wired connection.

Figure 23H:
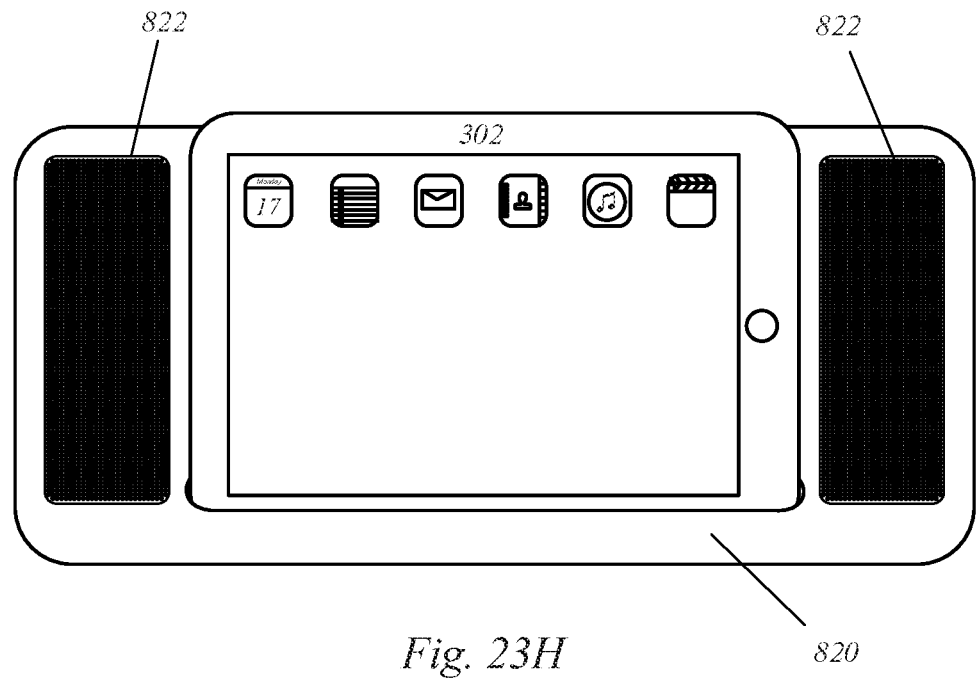
Figure 23G:
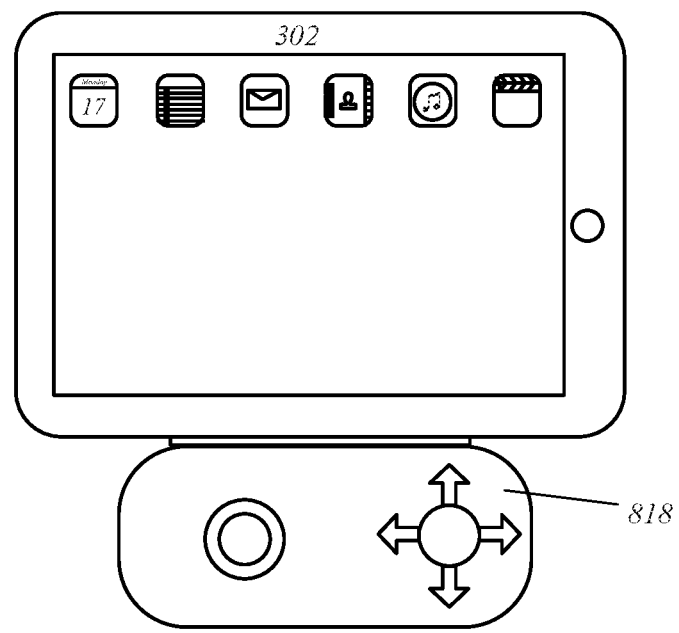

FIG. 23G shows game controller 818 magnetically connected to tablet device 302. In one embodiment, game controller 818 can provide information to tablet device 302. The information can include the game to be played, historical game information, player information and identification and so forth. FIG. 23H shows audio output module 820 having speakers 822 for broadcasting audio content provided by tablet device 302.

Figure 24:
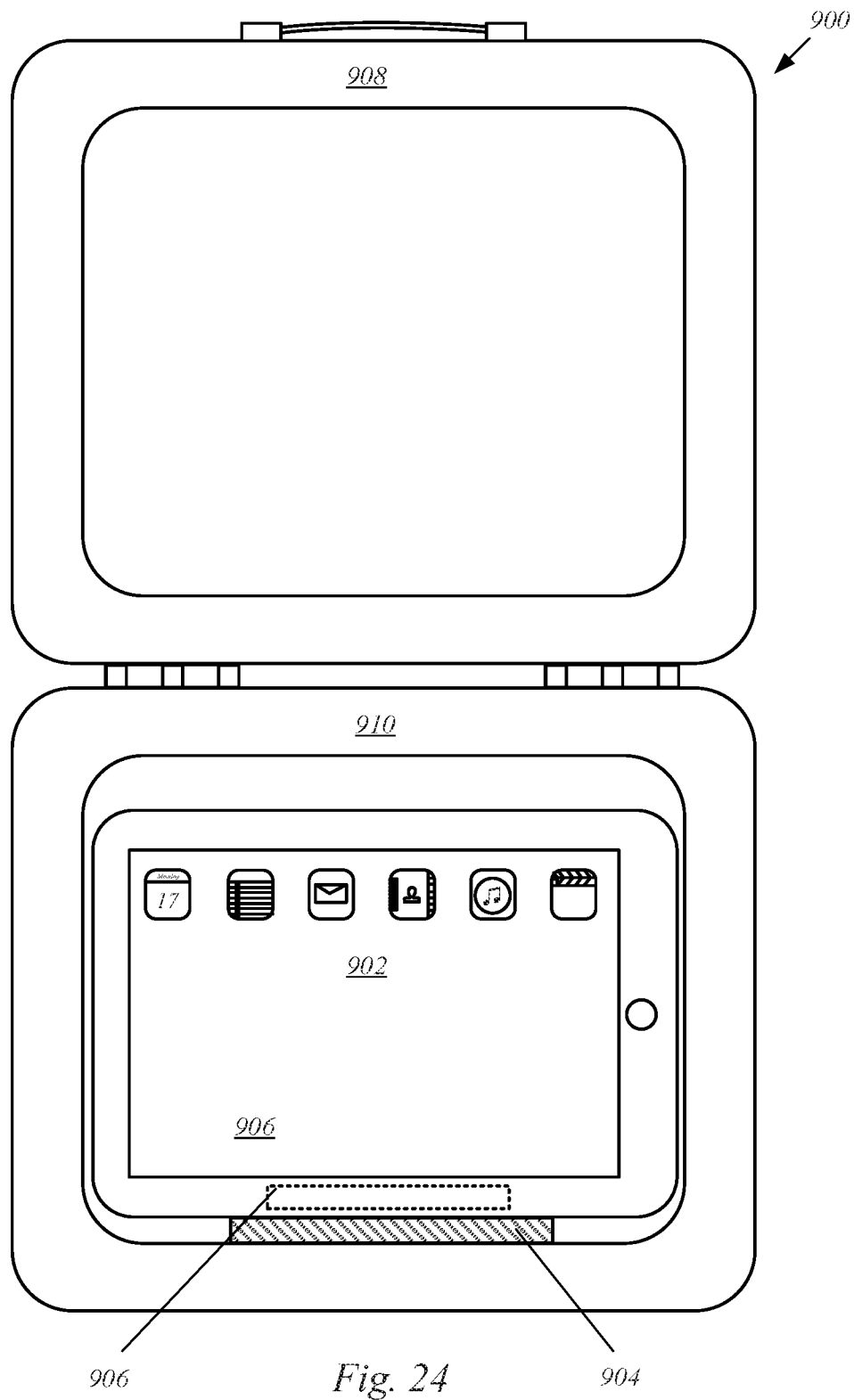
FIG. 24 shows a travel case in accordance with the described embodiments.

FIG. 24 shows travel case 900 that can be used to store and transport tablet device 902. Travel case 900 can include magnetic elements 904 arranged to activate magnetic attachment feature 906 in tablet device 902. In one embodiment, travel case 900 can have a clam shell type arrangement whereby cover 908 can, in a closed configuration, enclose tablet device 902 within a cavity formed by cover 908 and base 910. In one embodiment, tablet device 902 can be manually released by grasping and removing tablet device 902. In one embodiment, travel case 900 can include a releasing mechanism that can overcome the magnetic attraction between magnetic elements 904 and the magnetic attachment feature 906 in tablet device 902. In one embodiment, the releasing mechanism can be mechanical in nature. In one embodiment, the releasing mechanism can be electromechanical in nature in which an electromagnetic element in travel case 900 can be energized to overcome the magnetic attraction between magnetic elements 904 and magnetic attachment feature 906.

Figure 25A:
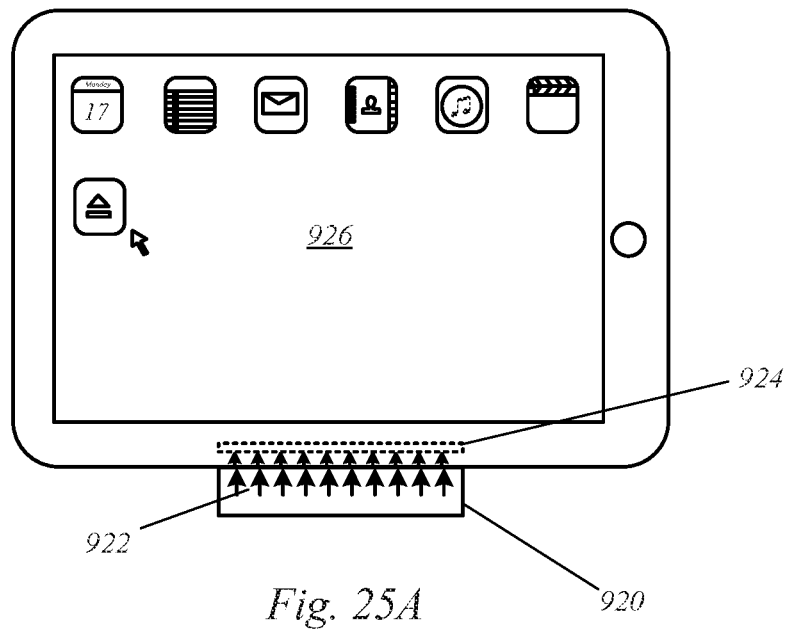
FIGS. 25A-25B show electromagnetic release mechanism.
Figure 25B:
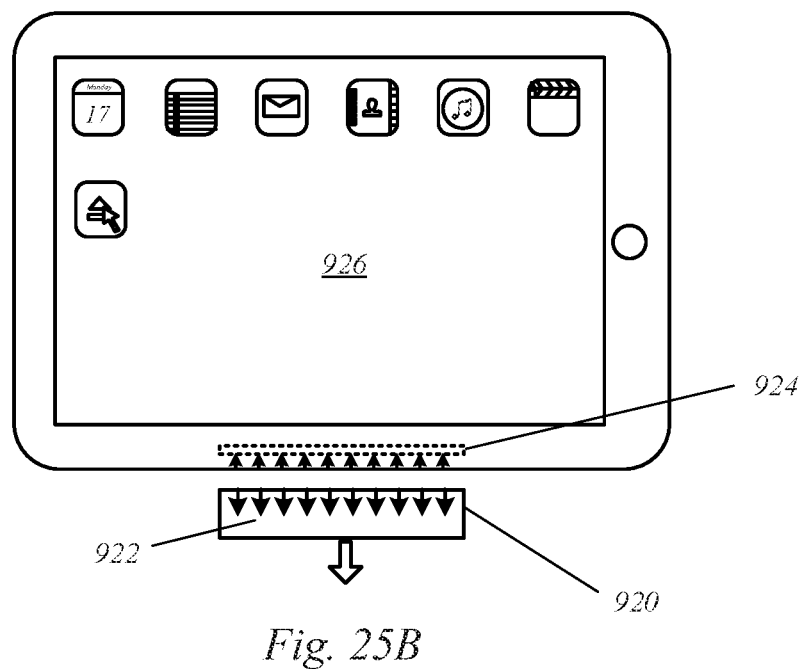

FIGS. 25A and 25B show representative magnetic attraction between magnetic elements 920 in object 922 and magnetic attachment feature 924 in an electronic device that can take the form of tablet device 926. As shown in FIG. 25A, magnetic elements 920 can include at least one electromagnetic element that can be used to provide electromotive force. The electromotive force can be used to overcome net magnetic attractive force $F_{net}$ between magnetic elements 920 and magnetic attachment feature 922. The electromotive force can cause object 922 to separate from the electronic device without the use of hands or other mechanical mechanism. The electromagnetic element can be remotely activated or can be activated using the electronic device. For example, when the electronic device takes the form of tablet device 930, home button 932 can be pressed thereby causing the activation of the electromagnetic element resulting in the magnetic attraction between magnetic attachment feature 922 and magnetic elements 920 being overcome allowing tablet device 930 to be removed from travel case 900.

Figure 26A:
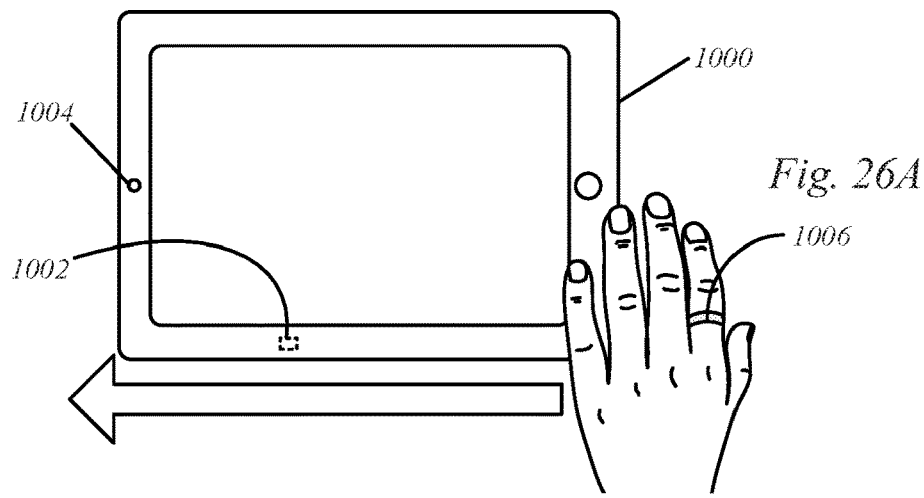
FIGS. 26A-26C show a hands free approach to altering an operating state of an electronic device.
Figure 26B:
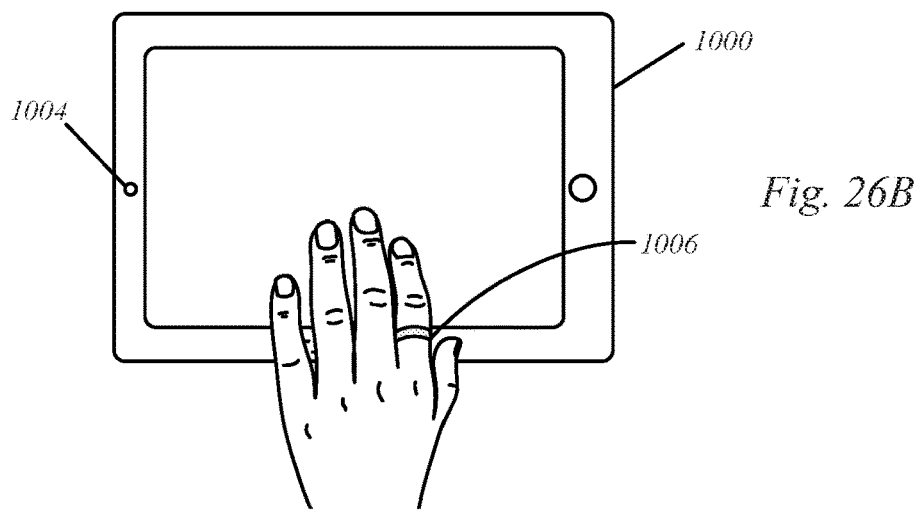
Figure 26C:
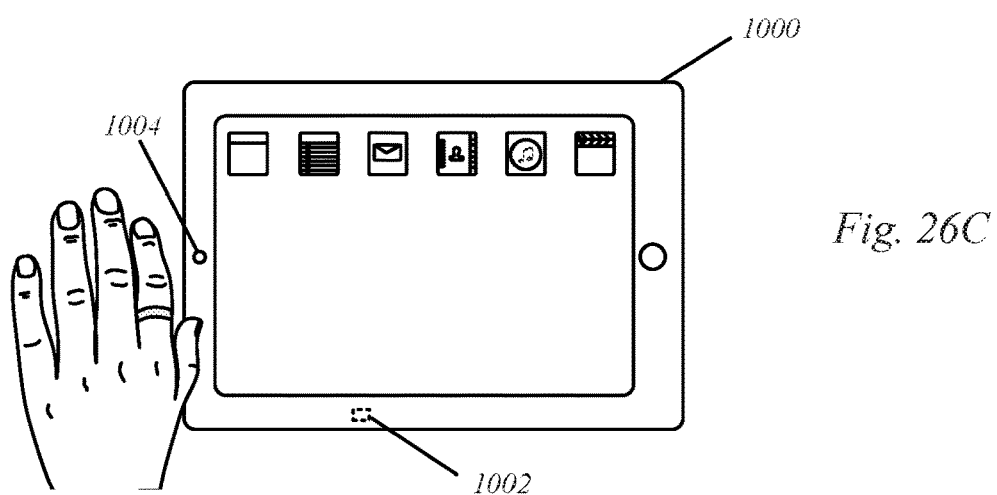

FIGS. 26A-26C graphically illustrate a mechanism whereby a magnetically sensitive circuit, such as a Hall Effect sensor can be used to alter an operating state of an electronic device. In particular, FIG. 26A shows tablet device 1000 in an OFF operating state. Tablet device 1000 can include a magnetically sensitive circuit, such as Hall Effect sensor 1002. In one embodiment, tablet device 1000 can also include light sensitive device 1004. In one embodiment, light sensitive device 1004 can take the form of an ambient light sensor (ALS). In one embodiment, light sensitive device 1004 can take the form of an image capture device such as a camera. It should be noted that light sensitive device 1004 can also take the form of any combination of devices incorporated which, for example, a sensor board that can includes both an ambient light sensor and a camera that can operate independent or in cooperation with each other.

In one embodiment, an operating state of tablet device 1000 can be altered by an external magnetic field H. In one embodiment, external magnetic field H can transient in nature by which it is meant that external magnetic field H can vary in time and/or magnetic field strength. In one situation, external magnetic field H can be generated by a magnetic element, such as magnetic ring 1006, that generates a substantially non-transient magnetic field that is nonetheless transient as perceived by magnetically sensitive device 1002. For example, by moving magnetic ring 1006 from left to right as shown in FIGS. 26A-26C, Hall Effect sensor 1002 can detect the external magnetic field H as being transient in nature in that the strength of external magnetic field H starts at an initial value and increases in value as magnetic ring 1006 approaches Hall Effect sensor 1002 and then decreases again as magnetic ring 1006 moves away from Hall Effect sensor 1002. The detection of the transient external magnetic field H provided by the movement of magnetic ring 1006 can result in Hall Effect sensor 1002 providing a signal to tablet device 1000. The signal can be interpreted by tablet device 1000 to change from a current operating state (such as OFF) to another operating state (such as ON) as shown in FIG. 26C. In one embodiment, the change in state of tablet device 1000 can be binary in nature in that by passing ring 1006 by Hall Effect sensor 1002 a second time, the signal provided by Hall Effect sensor 1002 can be interpreted by tablet device 1000 to change the current operating state from ON to OFF. In one embodiment, additional sensors (such as ALS, ambient light sensor or camera 1004) can be used in conjunction (or singly) to provide additional inputs that can be used to alter the operating state of tablet device 1000 in additional ways.

Figure 27A:
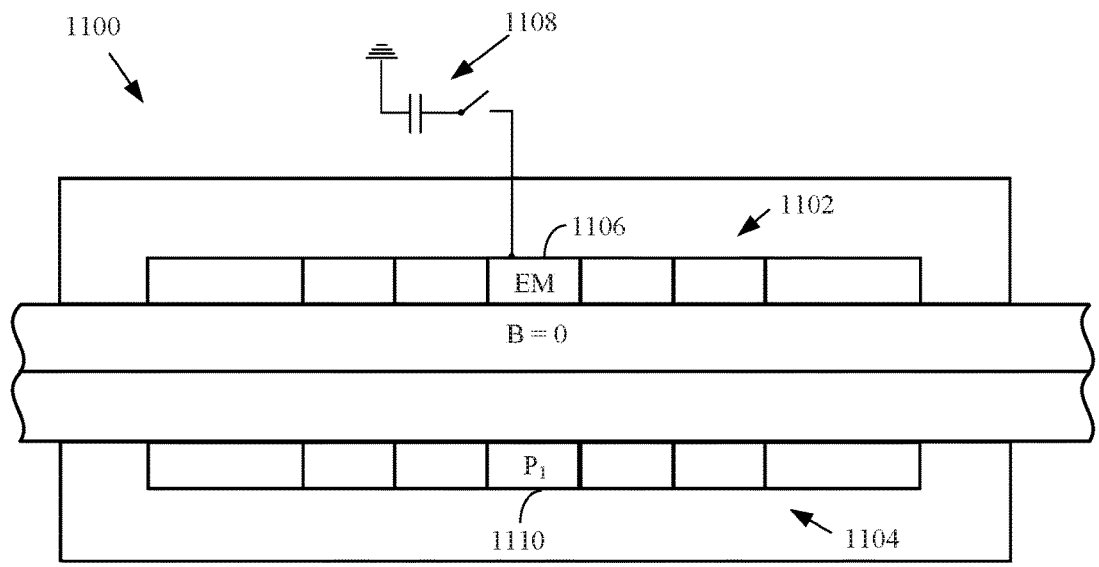
FIGS. 27A-27B show hands free ejection embodiment.
Figure 27B:
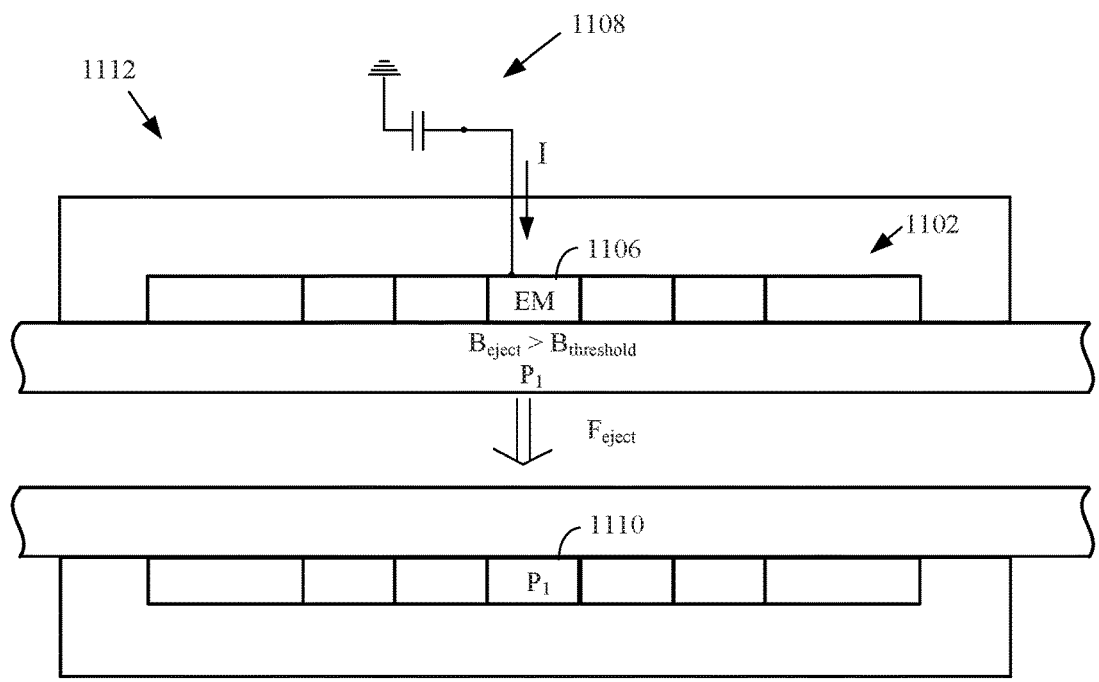

FIGS. 27A and 27B shows a representative embodiment of hands-free detaching of magnetically coupled objects. In particular, FIG. 27A shows magnetically attached configuration 1100 where first magnetic attachment feature 1102 is magnetically attached to second magnetic attachment feature 1104. In one embodiment first magnetic attachment feature 1102 can include element 1106 that is responsive to an externally applied voltage (or current), provided by, for example, voltage (or current) source 1108 to generate a magnetic field having polarity P1 so long as the externally applied voltage (or current) is available.

In one embodiment, when no voltage or current is applied, element 1106 provides substantially little or no magnetic flux and is therefore not capable of supporting a magnetic attachment based solely upon any intrinsic magnetic field. In one embodiment second magnetic attachment feature 1104 can include magnetic element 1110 aligned with and in proximity to magnetic element 1106 when first magnetic attachment feature 1102 is placed in proximity to second magnetic attachment feature 1104. In one embodiment, magnetic element 1110 can have an intrinsic polarity P1 that is the same as the polarity of element 1106 when the external current I or voltage V is applied as shown in FIG. 27B. In this way, a net repulsive magnetic force in the form of ejection force $F_{eject}$ can be generated between element 1106 and magnetic element 1110 during the duration of the availability of voltage V or current I. In this way, by properly adjusting the size, distance, magnetic properties, and electromagnetic properties, first magnetic attachment feature 1102 and second magnetic attachment feature 1104 can be detached from each other. For example, in t magnetically attached state 1100, applying voltage V or current I to magnetic element 1106 can create ejection force Feject that forces first magnetic attachment feature 1102 and second magnetic attachment feature 1104 to separate in separated state of 1112 automatically or at least without the need for manually detachment.

Figure 28A:
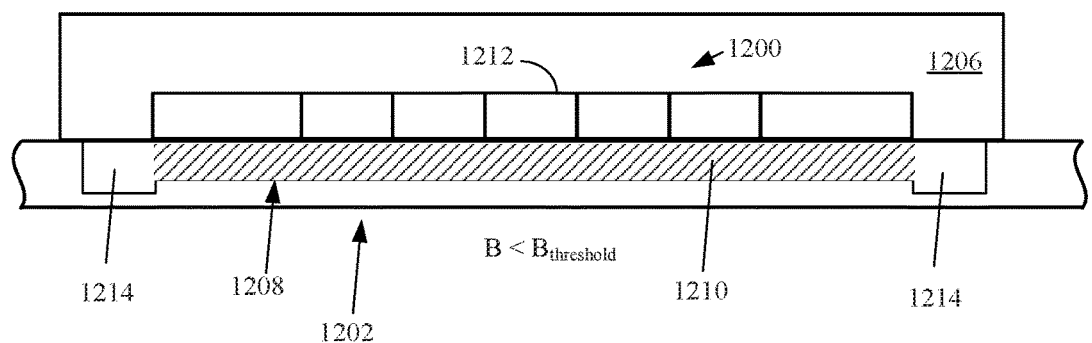
FIGS. 28A-28B show a magnetic window embodiment.
Figure 28B:
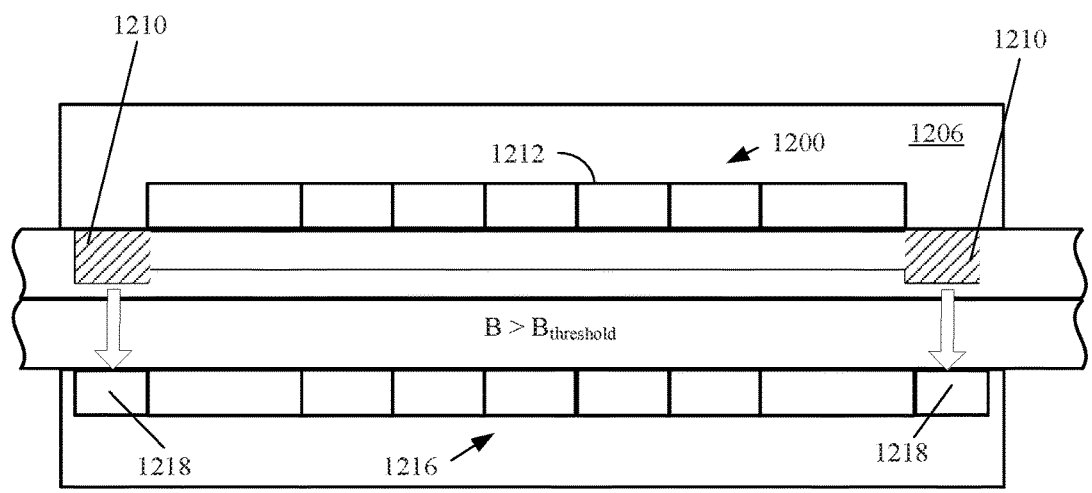

FIGS. 28A and 28B shows first magnetic attachment feature 1200 having magnetic window 1202 capable of selectively controlling magnetic flux leakage B at exterior surface 1204 of housing 1206. In one embodiment, magnetic window 1202 can be formed of channel 1208 arranged to accommodate magnetic fluid 1210. In one embodiment, magnetic fluid 1210 can take the form of a ferrofluid that is a liquid which becomes strongly magnetized in the presence of a magnetic field. Ferrofluids are colloidal in nature formed of a liquid having nanoscale ferromagnetic, or ferrimagnetic, particles suspended in a carrier fluid—usually an organic solvent or water. Each tiny particle is thoroughly coated with a surfactant to inhibit clumping. Large ferromagnetic particles can be ripped out of the homogeneous colloidal mixture, forming a separate clump of magnetic dust when exposed to strong magnetic fields. The magnetic attraction of nanoparticles is weak enough that the surfactant's van de Waals repulsion is sufficient to prevent magnetic clumping. Ferrofluids usually do not retain magnetization in the absence of an externally applied field.

Therefore, in the inactive state (i.e., Eq. (1) is satisfied), magnetic attachment feature 1200 can include magnetic elements 1212 embedded in or in close proximity to housing 1206 where magnetic fluid 1210 interacts with magnetic field generated by magnetic elements 1212. The magnetic nature of magnetic fluid 1210 prevents any flux leakage at exterior surface 1204 of housing 1206 thus providing a boundary condition required to satisfy Eq. (1). In this way, there is no requirement for moving magnetic elements 1212 in order to provide magnetic surface M1 at exterior surface 1204. In one embodiment, magnetic window 1202 can also include reservoirs 1214 (either one or a plurality) that provide sufficient volume to accommodate magnetic fluid 1210 as shown in FIG. 28B.

In one embodiment, second magnetic attachment feature 1216 can include a mechanism that can cause magnetic fluid 1210 to migrate out of channel 1208 into one or both reservoirs 1214 to expose magnetic elements 1212. By exposing magnetic elements 1212, magnetic surface M2 can be provided satisfying Eq. (2). In one embodiment, the mechanism used to migrate magnetic fluid 1210 can take the form of magnets 1218 having strong enough magnetic field strength to overcome the attraction of magnetic elements 1212. In this way, the placement of second magnetic attachment feature 1216 in proximity to first magnetic attachment feature 1200 can cause magnetic window 1202 to go from a closed state (consistent with Eq. (1)) to an open state (consistent with Eq. (2)).

Figure 29A:
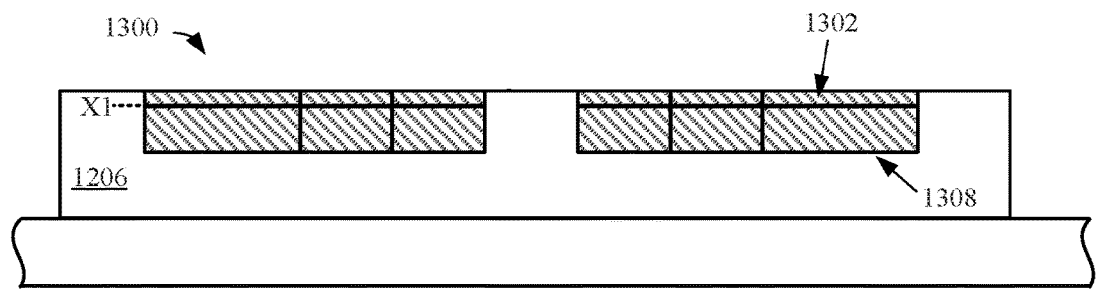
FIGS. 29A-29B shows another embodiment of a magnetic attachment feature.
Figure 29B:
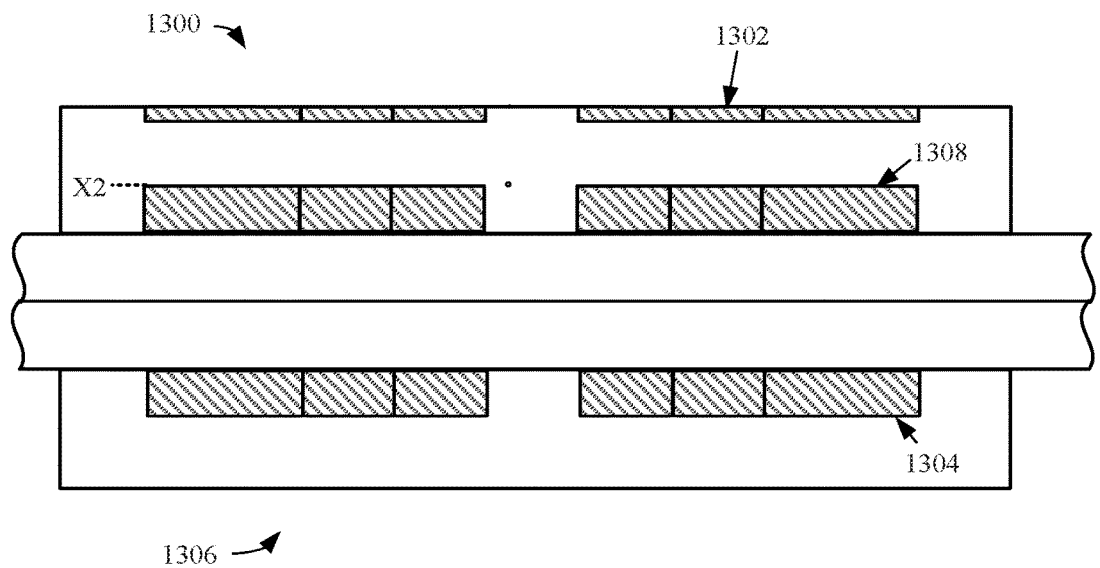

FIGS. 29A and 29B shows first magnetic attachment feature 1300 having a retaining mechanism in the form of retaining magnets 1302. By providing magnets 1302, valuable space can be preserved. Since the strength and size of magnets 1302 can be well defined, the size and strength of activating magnets 1304 in second magnetic attachment feature 1306 can also be well defined. For example, in order to activate first magnetic attachment feature (i.e., satisfying Eq. (2)), magnets 1308 must move from inactive position X1 (magnetically attached to magnets 1302) to active position X2. This can be accomplished by placing activating magnets 1304 in proximity to magnets 1308. In one embodiment, the intrinsic magnetic strength of magnets 1304 and 1308 can be adjusted to overcome the magnetic attraction between magnets 1302 and magnets 1308 causing magnets 1308 to detach from magnets 1302 and move towards magnets 1304 creating magnetic surface M2 in the process (i.e., satisfying Eq. (2)).

Figure 30A:
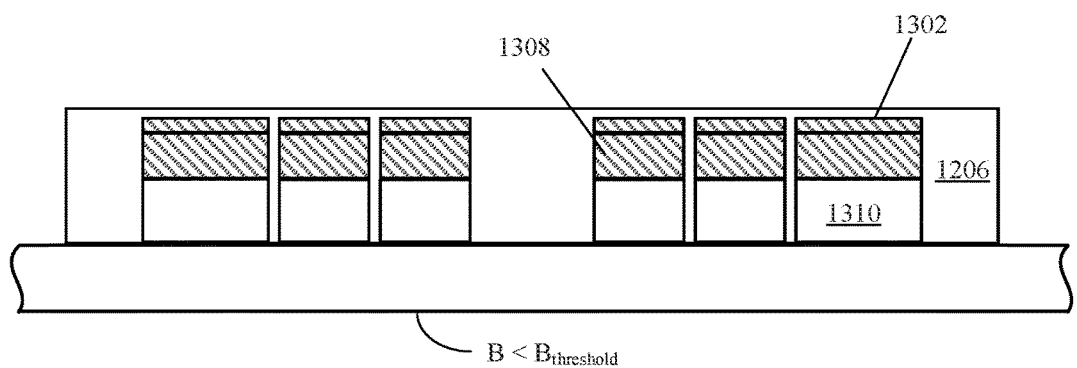
FIGS. 30A-30B show still another embodiment of the magnetic attachment feature of FIGS. 29A-29B.
Figure 30B:
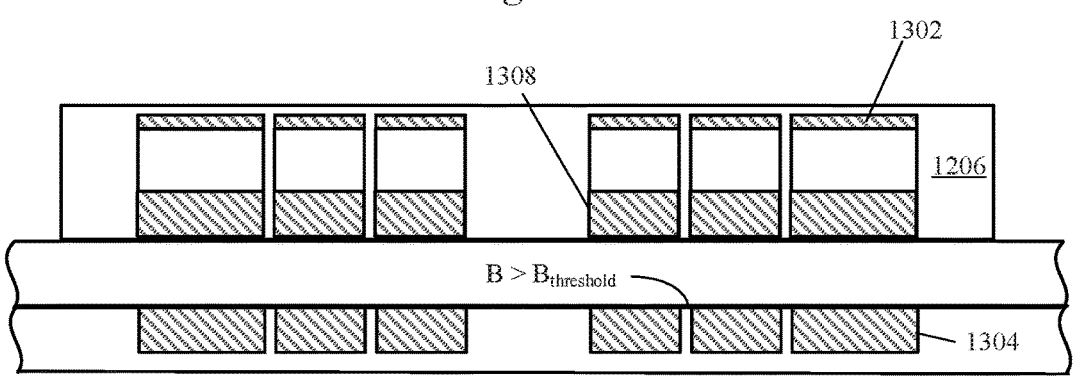

FIGS. 30A and 30B shows an embodiment of first magnetic attachment feature 1300 having channels 1310 sized to accommodate moving magnets 1308 and retaining magnets 1302. In one embodiment, moving magnets 1308 can travel within channel 1310 smoothly and with little resistance due to the presence of a lubricant (not shown) between moving magnets 1308 and interior surfaces of channels 1310.

Figure 31A:
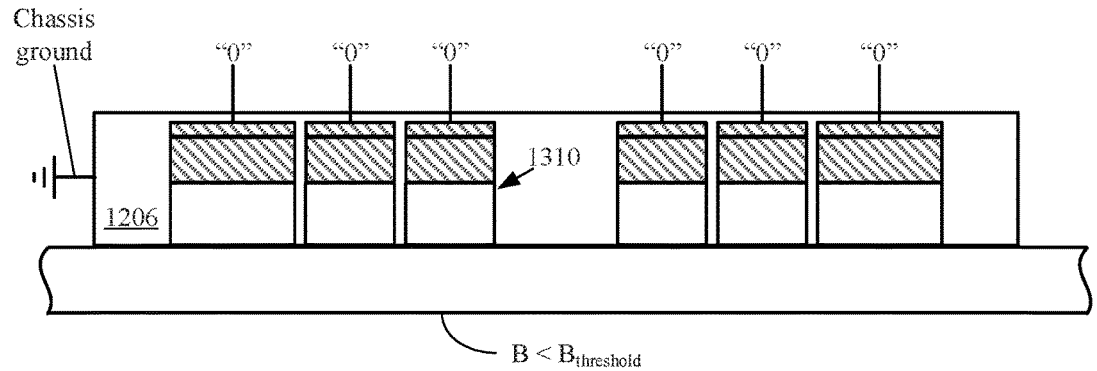
FIGS. 31A-31C show the magnetic attachment feature of FIGS. 30A-30B arranged to provide magnetic attachment information.
Figure 31B:
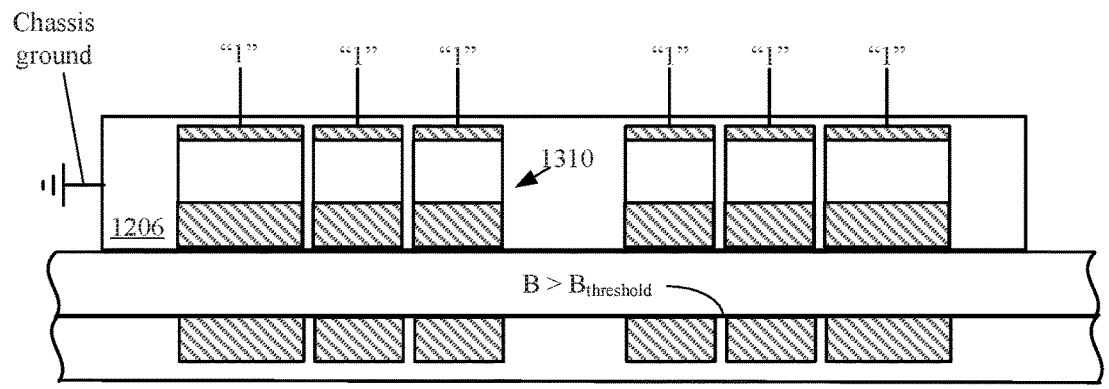
Figure 31C:
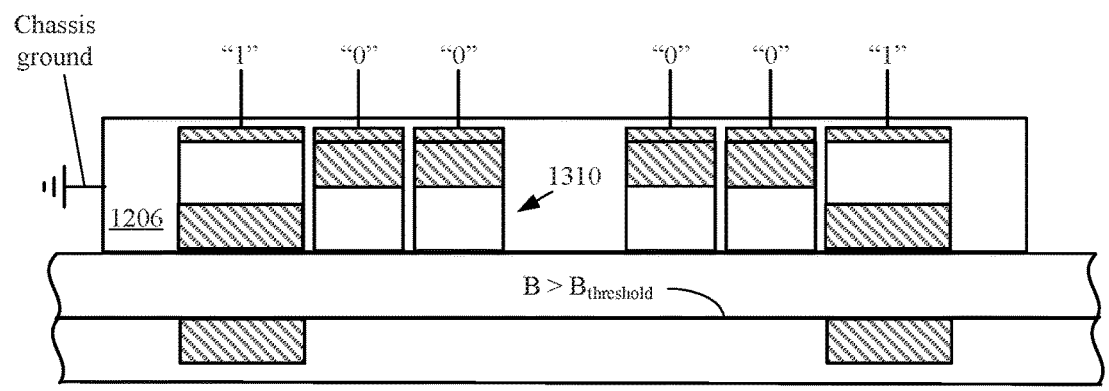

FIGS. 31A-31C show another embodiment of first magnetic attachment feature 1300 shown in FIGS. 30A-30B arranged to provide information based upon an attachment configuration. In one embodiment, all or at least some of magnets 1302 are electrically isolated from chassis ground formed by the metal of housing 1206. In one embodiment, all or at least some of magnets 1302 can be coupled to a sensing circuit arranged to sense if magnet 1308 is attached to magnet 1302. In those cases where the sensing circuit senses that magnet 1308 is attached to magnet 1302, then a first logic value ("0" or "1", whichever is deemed appropriate) can be provided. Conversely, when the sensing circuit senses that magnet 1308 is not attached to magnet 1302, then a second logic value ("1" or "0") different from the first logic value can be provided. In one embodiment, information in the form of the first and second logic values can be used to identify a magnetic attachment state. In one embodiment, the attachment state can identify an object magnetically attached (see Table 1 shown in FIG. 32). In one embodiment, the attachment information corresponding to the attachment state can be used to alter an operating state of an electronic device, such as tablet device 1000. For example, using the information provided by Table 1, if the sense circuit senses data {1,0,0,0,0,1} corresponding to a stylus, then tablet device 1000 can alter a current operating state to one consistent with sensing a stylus upon a touch screen or display.

Figure 32A:
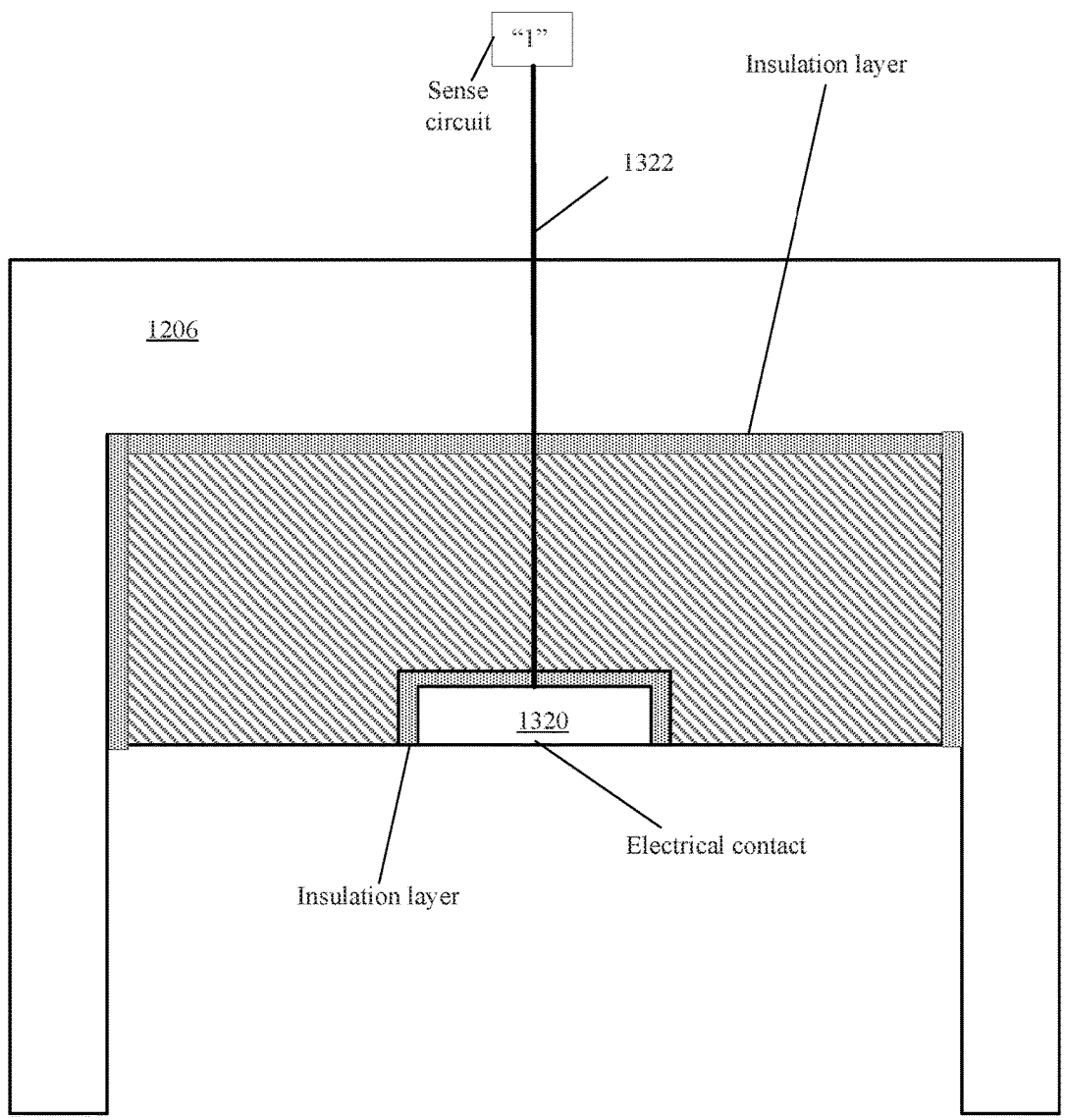
FIG. 32A shows an embodiment of a representative magnetic element of the magnetic attachment feature of FIGS. 31A-31C providing a first type information.
Figure 32B:
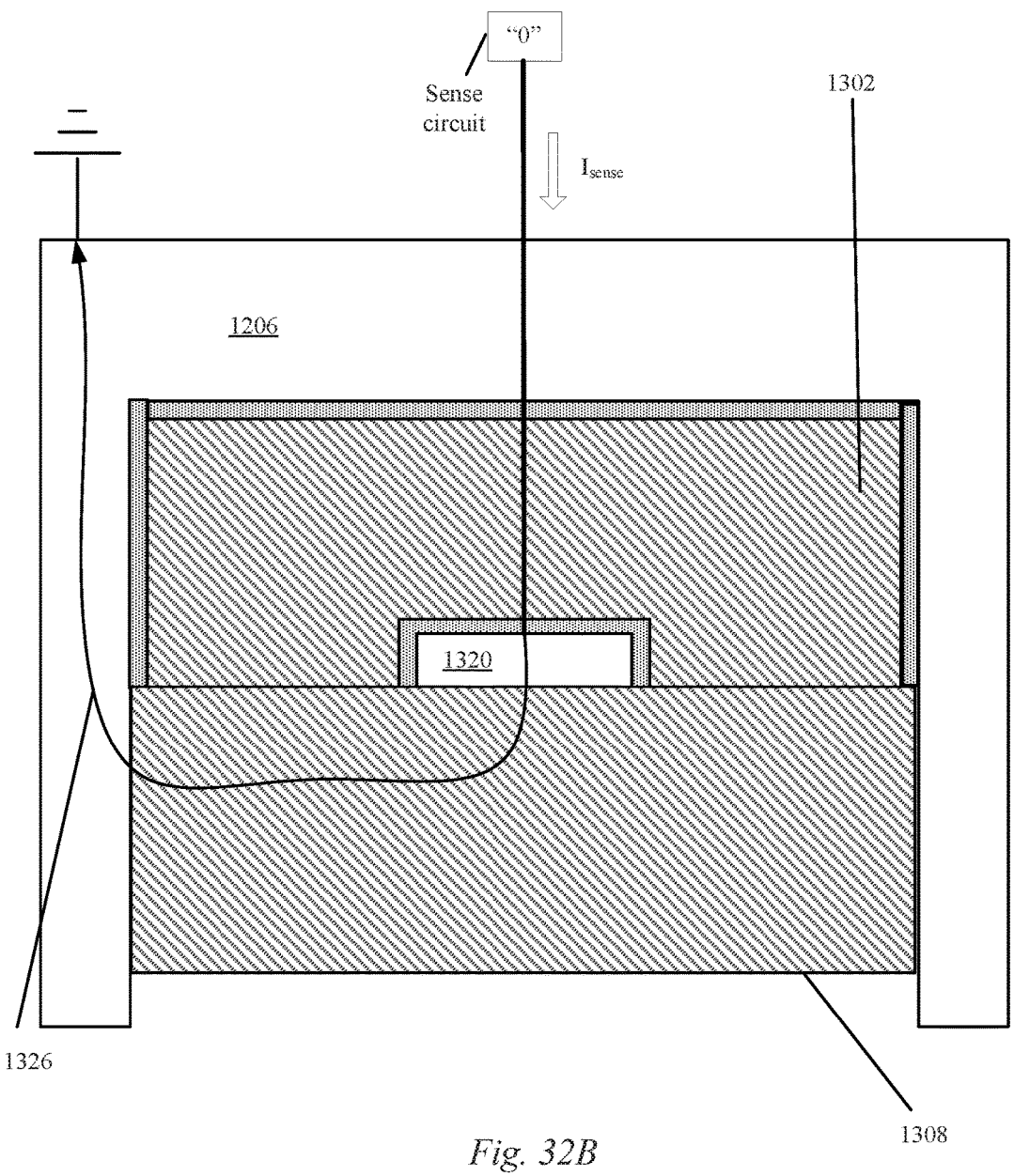
FIG. 32B shows an embodiment of the representative magnetic element of the magnetic attachment feature of FIGS. 31A-31C providing a second type information.
Figures 33, 34:
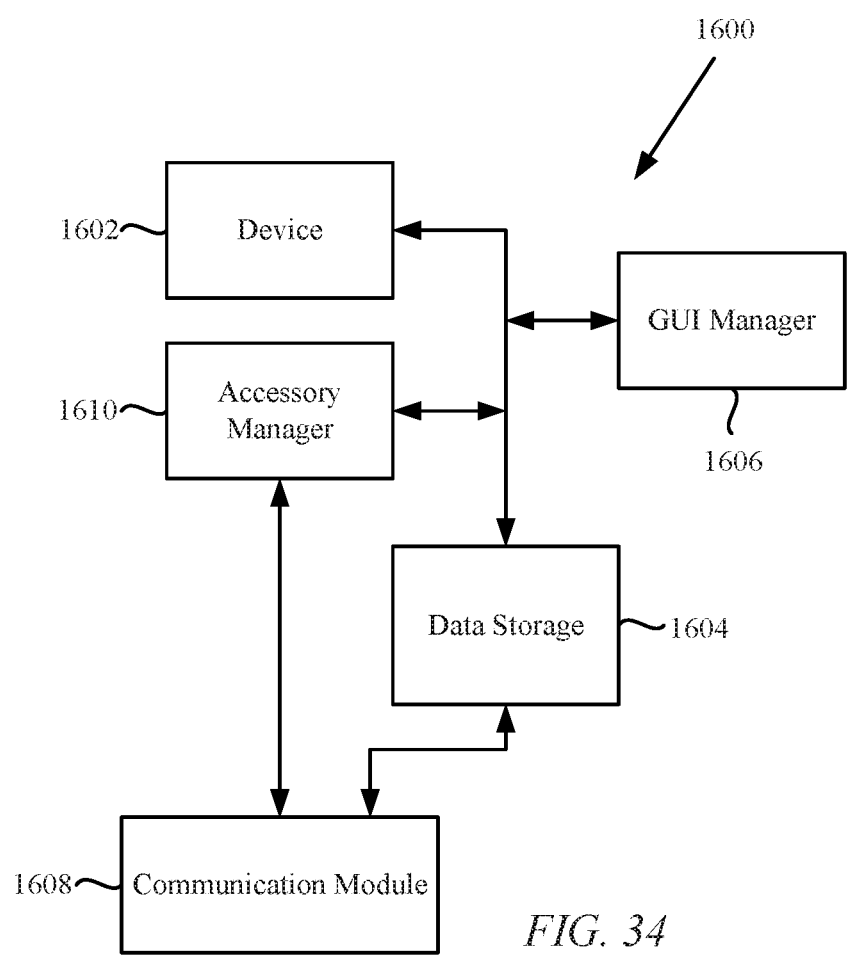
FIG. 33 shows a table of representative attachment status according to information provided by the magnetic attachment feature of FIGS. 31A-31B.
FIG. 34 is a block diagram of an arrangement of functional modules utilized by a portable media device.

FIGS. 32A and 32B show specific embodiments of first attachment feature 1300 shown in FIGS. 31A-31C. In one embodiment, retaining magnet 1302 can be electrically isolated from housing 102 and include electrical contact 1320 electrically connected by way of line 1322 to the sense circuit. As can be seen, when retaining magnet 1302 is not attached to moving magnet 1308, there is no electrical path between the sensing circuit and chassis ground, and therefore substantially no current flows corresponding to the second logic state. On the other hand, as shown in FIG. 32B, when moving magnet 1308 is in contact with retaining magnet 1302 and more particularly electrical contact 1320, current path 1326 is provided allowing current I to flow to/from chassis ground. FIG. 33 shows a table of representative operating magnetic codes and operating states.

FIG. 34 is a block diagram of an arrangement 1600 of functional modules utilized by an electronic device. The electronic device can, for example, be tablet device 1500. The arrangement 1600 includes an electronic device 1602 that is able to output media for a user of the portable media device but also store and retrieve data with respect to data storage 1604. The arrangement 1600 also includes a graphical user interface (GUI) manager 1606. The GUI manager 1606 operates to control information being provided to and displayed on a display device. The arrangement 1600 also includes a communication module 1608 that facilitates communication between the portable media device and an accessory device. Still further, the arrangement 1600 includes an accessory manager 1610 that operates to authenticate and acquire data from an accessory device that can be coupled to the portable media device.

Figure 35:
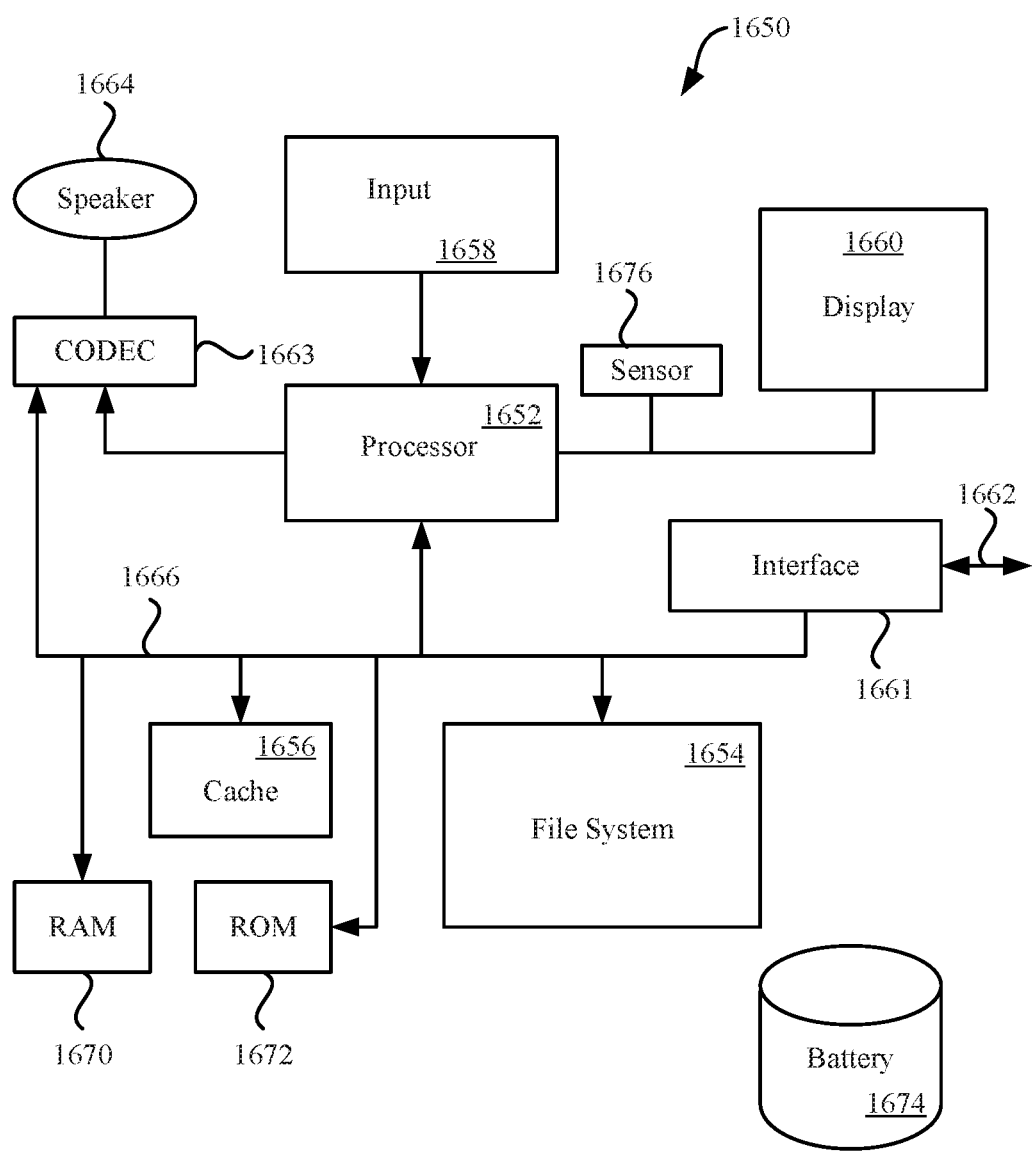
FIG. 35 is a block diagram of an electronic device suitable for use with the described embodiments.

FIG. 35 is a block diagram of an electronic device 1650 suitable for use with the described embodiments. The electronic device 1650 illustrates circuitry of a representative computing device. The electronic device 1650 includes a processor 1652 that pertains to a microprocessor or controller for controlling the overall operation of the electronic device 1650. The electronic device 1650 stores media data pertaining to media items in a file system 1654 and a cache 1656. The file system 1654 is, typically, a storage disk or a plurality of disks. The file system 1654 typically provides high capacity storage capability for the electronic device 1650. However, since the access time to the file system 1654 is relatively slow, the electronic device 1650 can also include a cache 1656. The cache 1656 is, for example, Random-Access Memory (RAM) provided by semiconductor memory. The relative access time to the cache 1656 is substantially shorter than for the file system 1654. However, the cache 1656 does not have the large storage capacity of the file system 1654. Further, the file system 1654, when active, consumes more power than does the cache 1656. The power consumption is often a concern when the electronic device 1650 is a portable media device that is powered by a battery 1674. The electronic device 1650 can also include a RAM 1670 and a Read-Only Memory (ROM) 1672. The ROM 1672 can store programs, utilities or processes to be executed in a non-volatile manner. The RAM 1670 provides volatile data storage, such as for the cache 1656.

The electronic device 1650 also includes a user input device 1658 that allows a user of the electronic device 1650 to interact with the electronic device 1650. For example, the user input device 1658 can take a variety of forms, such as a button, keypad, dial, touch screen, audio input interface, visual/image capture input interface, input in the form of sensor data, etc. Still further, the electronic device 1650 includes a display 1660 (screen display) that can be controlled by the processor 1652 to display information to the user. A data bus 1666 can facilitate data transfer between at least the file system 1654, the cache 1656, the processor 1652, and the CODEC 1663.

In one embodiment, the electronic device 1650 serves to store a plurality of media items (e.g., songs, podcasts, etc.) in the file system 1654. When a user desires to have the electronic device play a particular media item, a list of available media items is displayed on the display 1660. Then, using the user input device 1658, a user can select one of the available media items. The processor 1652, upon receiving a selection of a particular media item, supplies the media data (e.g., audio file) for the particular media item to a coder/decoder (CODEC) 1663. The CODEC 1663 then produces analog output signals for a speaker 1664. The speaker 1664 can be a speaker internal to the electronic device 1650 or external to the electronic device 1650. For example, headphones or earphones that connect to the electronic device 1650 would be considered an external speaker.

The electronic device 1650 also includes a network/bus interface 1661 that couples to a data link 1662. The data link 1662 allows the electronic device 1650 to couple to a host computer or to accessory devices. The data link 1662 can be provided over a wired connection or a wireless connection. In the case of a wireless connection, the network/bus interface 1661 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 1676 can take the form of circuitry for detecting any number of stimuli. For example, sensor 1676 can include a Hall Effect sensor responsive to external magnetic field, an audio sensor, a light sensor such as a photometer, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. An accessory device for a portable electronic device, the portable electronic device including a display, the accessory device comprising:
   an enclosure assembly for carrying the portable electronic device, the enclosure assembly including:
      a magnetic hinge assembly that includes a magnetic element, wherein the enclosure assembly is capable of magnetically attaching to the housing of the portable electronic device by way of the magnetic element; and
   a touch sensitive input device that is pivotally attached to the enclosure assembly by way of a hinge, wherein the touch sensitive input device is capable of receiving a user input, and in response, providing a corresponding signal to the portable electronic device that includes instructions for altering an operating state of the portable electronic device.

2. The accessory device of claim 1, wherein the touch sensitive input device is included in a flap portion, and the flap portion is pivotally attached to the enclosure assembly.

3. The accessory device of claim 2, wherein the touch sensitive input device is capable of independently rotating relative to the enclosure assembly by way of the hinge such that the touch sensitive input device is capable of being presented at an angle that is different from the display of the portable electronic device.

4. The accessory device of claim 3, wherein the touch sensitive input device is capable of being presented at an angle that is substantially similar to the display of the portable electronic device.

5. The accessory device of claim 1, further comprising:
a segmented cover that is pivotally attached to the enclosure assembly by way of the hinge, wherein the segmented cover is capable of folding to form a support structure that is sufficient to support the portable electronic device.

6. The accessory device of claim 1, wherein the corresponding signal is provided by at least one of wired or wireless communication to the portable electronic device.

7. The accessory device of claim 1, wherein the touch sensitive input device includes a keyboard.

8. An accessory device for supporting a portable electronic device, the portable electronic device including a housing having walls that carry a display, the accessory device comprising:
a hinge assembly including a magnetic element, wherein the hinge assembly is capable of magnetically attaching to at least one of the walls of the portable electronic device by using the magnetic element;
a flap portion pivotally attached to the hinge assembly, the flap portion including a touch input device; and
a segmented cover pivotally attached to the hinge assembly, wherein the segmented cover is capable of rotating relative to the flap portion such that the segmented cover defines a support structure capable of supporting the portable electronic device while the display of the portable electronic device is oriented at an angle relative to the flap portion.

9. The accessory device of claim 8, wherein the touch input device is capable of establishing wired or wireless communication with the portable electronic device.

10. The accessory device of claim 8, wherein the flap portion is formed of a flexible material.

11. The accessory device of claim 8, wherein the touch input device is a keyboard or an input pad.

12. The accessory device of claim 8, wherein the support structure is triangular in shape.

13. The accessory device of claim 8, wherein the angle between the display and the flap portion is about 75 degrees.

14. The accessory device of claim 8, further comprising:
an intervening layer capable of preventing direct contact between the hinge assembly and the housing of the portable electronic device.

15. An accessory device for use with a portable electronic device having a display, the accessory device comprising:
a first segment having an input device;
a hinge assembly; and
a second segment that is pivotally coupled to the first segment by the hinge assembly, wherein the second segment is capable of securing the portable electronic device, and the second segment is capable of rotating relative to the first segment such as to define:
(i) a closed configuration that comprises the first segment overlaying the second segment and the display of the portable electronic device, and
(ii) a support configuration that comprises the second segment supporting the portable electronic device at an obtuse angle relative to the first segment.

16. The accessory device of claim 15, wherein the input device is a keyboard or an input pad.

17. The accessory device of claim 15, wherein the second segment includes multiple segmented portions.

18. The accessory device of claim 15, wherein the input device is capable of establishing wired or wireless communication with the portable electronic device.

19. The accessory device of claim 15, wherein the second segment is formed of flexible material.

20. The accessory device of claim 19, wherein the flexible material is fabric.

* * * * *